United States Patent
Beser et al.

(10) Patent No.: US 6,523,068 B1
(45) Date of Patent: Feb. 18, 2003

(54) METHOD FOR ENCAPSULATING AND TRANSMITTING A MESSAGE INCLUDES PRIVATE AND FORWARDING NETWORK ADDRESSES WITH PAYLOAD TO AN END OF A TUNNELING ASSOCIATION

(75) Inventors: Nurettin B. Beser, Evanston, IL (US); Michael Borella, Naperville, IL (US)

(73) Assignee: 3COM Corporation, Santa Clara, CA (US)

( * ) Notice: Subject to any disclaimer, the term of this patent is extended or adjusted under 35 U.S.C. 154(b) by 0 days.

(21) Appl. No.: 09/385,118

(22) Filed: Aug. 27, 1999

(51) Int. Cl.$^7$ .................. G06F 15/16; G06F 15/173
(52) U.S. Cl. .................. 709/238; 709/245; 370/392
(58) Field of Search ................... 709/238, 245; 370/328, 352, 392, 390, 232

(56) References Cited

U.S. PATENT DOCUMENTS

| | | | |
|---|---|---|---|
| 5,159,592 A | | 10/1992 | Perkins |
| 5,227,778 A | | 7/1993 | Vacon et al. |
| 5,550,984 A | | 8/1996 | Gelb |
| 5,636,216 A | | 6/1997 | Fox et al. |
| 5,708,655 A | | 1/1998 | Toth et al. |
| 5,793,763 A | | 8/1998 | Mayes et al. |
| 5,812,819 A | | 9/1998 | Rodwin et al. |
| 5,867,660 A | | 2/1999 | Schmidt et al. |
| 5,872,847 A | | 2/1999 | Boyle et al. |
| 6,061,346 A | * | 5/2000 | Nordman .................. 370/352 |
| 6,119,171 A | * | 9/2000 | Alkhatib .................. 370/390 |
| 6,188,671 B1 | * | 2/2001 | Chase et al. ............... 370/232 |
| 6,339,595 B1 | * | 1/2002 | Rekhter et al. ............. 370/392 |
| 6,452,920 B1 | * | 9/2002 | Comstock ................. 370/328 |

OTHER PUBLICATIONS

"Internet Engineering Task Force", Request for Comments 791, Internet Protocol, Sep. 1981, pp. i to 45.

"Internet Engineering Task Force", Request for Comments 1853, IP in IP Tunneling, Oct. 1995, pp. 1 to 8.

"Internet Engineering Task Force", Request for Comments 1701, Generic Routing Encapsulation (GRE), Oct. 1994, pp. 1 to 8.

"Internet Engineering Task Force", Request for Comments 1241, A Scheme for an Internet Encapsulation Protocol, Jul. 1991, pp. 1 to 17.

"ITU–T Recommendation H.323", Series H: Audiovisual and Multimedia Systems (Systems and Terminal Equipment for audiovisual Services), Telecommunication Standardization Sector of ITU, International Telecommunication Union, Feb. 1998, 125 pages.

(List continued on next page.)

*Primary Examiner*—Le Hien Luu
(74) *Attorney, Agent, or Firm*—McDonnell Boehnen Hulbert & Berghoff

(57) ABSTRACT

Methods for processing a media flow at an end of a tunneling association in a data network. One method includes receiving a data packet on a public network, such as the Internet, and recognizing that it encapsulates another data packet for a virtual connection to an application. The virtual connection is addressed by private network addresses. Another method includes constructing a data packet for a virtual connection to the application and encapsulating it for transmission on the public network. The methods provide for hiding the identity of the originating and terminating ends of the tunneling association from the other users of the public network. Hiding the identities may prevent interception of media flow between the ends of the tunneling association or eavesdropping on Voice-over-Internet-Protocol calls. The methods increase the security of communication on the data network without imposing a computational burden on the devices in the data network.

28 Claims, 31 Drawing Sheets

OTHER PUBLICATIONS

"ITU–T Recommendation H.225.0", Series H: Audiovisual and Multimedia Systems (Transmission Multiplexing and Synchronization), Telecommunication Standardization Sector of ITU, International Telecommunication Union, Feb. 1998, 157 pages.

"Internet Engineering Task Force", Request for Comments 2663, IP Network Address Translator (NAT) Terminology and Considerations, Aug. 1999, pp. 1 to 30.

"Internet Engineering Task Force", Request for Comments 1631, The IP Network Address Translator (NAT), May 1994, pp. 1 to 10.

"Internet Engineering Task Force", Internet Draft, Negotiatied Address Reuse (NAR), May 1998, pp. 1 to 22.

"Internet Engineering Task Force", Internet–Draft, NAT Bypass for End 2 End 'Sensitive' Applications, Jan. 1998, pp. 1 to5.

"Internet Engineering Task Force", Internet–Draft, Network Address Translation—Protocol Translation (NAT–PT), Jan. 1999, pp. 1 to 15.

"Internet Engineering Task Force", Internet–Draft, IP Host Network Address (and Port) Translation, Nov. 1998, pp. 1 to 14.

"Internet Engineering Task Force", Internet Draft, Distributed Network Address Translation, Oct. 1998, pp. 1 to 24.

"Internet Engineering Task Force", Internet–Draft, DNS Extensions to Network Address Translators (DNS_ALG), Oct. 1998, pp. 1 to 27.

"Internet Engineering Task Force", Internet–Draft, Security for IP Network Address Translator (NAT) Domains, Nov. 1998, pp. 1 to 11.

"Internet Engineering Task Force", Internet–Draft, The IP Network Address Translator (NAT), Feb. 1998, pp. 1 to 24.

"Internet Engineering Task Force", Internet–Draft, Traditional IP Network Address Translator (Traditional NAT), Oct. 1998, pp. 1 to 17.

"Internet Engineering Task Force", Internet–Draft, IP Network Address Translator (NAT) Terminology and Considerations, Oct. 1998, pp. 1 to 28.

"Internet Engineering Task Force", Intenet Draft, A Multihoming solution using NATs, Nov. 1998, pp. 1 to 32.

"Internet Engineering Task Force", Internet Draft, Network Address Translation Issues with IPsec, Feb. 1998, pp. 1 to 12.

"Internet Engineering Task Force", Internet Draft, IP Security, Nov. 1997, pp. 1 to 12.

"Internet Engineering Task Force", Internet Draft, Architectural Implications of NAT, Oct. 1998, pp. 1 to 14.

"Internet Engineering Task Force", Internet Draft, IP Relocation Through Twice Network Address Translators (RAT), Feb. 1999, pp. 1 to 20.

"Internet Engineering Task Force", Internet Draft, Reverse Twice Network Address Translators (RAT), Dec. 1998, pp. 1 to 24.

"Internet Engineering Task Force", Internet Draft, Implications of NAts on the TCP/IP Architecture, Feb. 1999, pp. 1 to 7.

"Internet Engineering Task Force", Internet Draft, Mobile IP Extension for Private Internets Support, Feb. 1999, pp. 1 to 24.

* cited by examiner

METHOD FOR ENCAPSULATING AND TRANSMITTING A MESSAGE INCLUDES PRIVATE AND FORWARDING NETWORK ADDRESSES WITH PAYLOAD TO AN END OF A TUNNELING ASSOCIATION

FIELD OF INVENTION

The present invention relates to communications in data networks. More specifically, it relates to a method for processing a media flow through a tunneling association in a data network.

BACKGROUND OF THE INVENTION

Computer users are becoming increasingly concerned about the privacy of their communications over the Internet. Privacy concerns are an important factor in the continued growth and acceptance of the Internet by society. As the use of the Internet increases, more and more sensitive information is being transmitted over this global network. Companies who cannot afford a private network often transfer sensitive corporate information over the Internet. Also, private citizens are increasingly relying on the Internet for banking and commercial transactions and frequently have to transfer private or personal information over the Internet, such as credit card numbers, social security numbers, or medical information.

Unfortunately, the Internet is not a very secure network. Information is transmitted over the Internet inside Internet Protocol ("IP") packets. These packets typically pass through several routers between transmission by a source computer and reception by a destination computer. At each leg of their journey the packets can be intercepted and inspected. Moreover, the Internet Protocol that is used on global computer networks (such as the Internet) and on many private networks (such as intranets) is not a highly secure protocol. For example, because IP packets include a source address in a header, a hacker or cracker may intercept all IP packets from a particular source IP address. Consequently, the hacker may be able to accumulate all transmissions from the source.

Typically, it is easy to map users to source IP addresses. A determined hacker may extract the source IP address from an IP packet and deduce that they are coming from a computer whose IP address is already known. Knowing the location of the source, the hacker may then be able to deduce the identity of the user who sent the IP packet. Even if the hacker cannot exactly identify the user or computer, he may glean sufficient information as to its approximate physical or virtual location. In globally addressed IP subnets it is easy to determine the location or organization of the source computer. For example, an appropriate Domain Name Server ("DNS") inquiry may correlate the IP address with a domain name, and domain names are typically descriptive of the user, location, or the user's organization.

Of course, the sender may encrypt the information inside the IP packets before transmission, e.g. with IP Security ("IPSec"). However, accumulating all the packets from one source address may provide the hacker with sufficient information to decrypt the message. Moreover, encryption at the source and decryption at the destination may be infeasible for certain data formats. For example, streaming data flows, such as multimedia or Voice-over-Internet-Protocol ("VoIP"), may require a great deal of computing power to encrypt or decrypt the IP packets on the fly. The increased strain on computer power may result in jitter, delay, or the loss of some packets. The expense of added computer power might also dampen the customer's desire to invest in VoIP equipment.

Nonetheless, even if the information inside the IP packets could be concealed, the hacker is still capable of reading the source address of the packets. Armed with the source IP address, the hacker may have the capability of tracing any VoIP call and eavesdropping on all calls from that source. One method of thwarting the hacker is to establish a Virtual Private Network ("VPN") by initiating a tunneling connection between edge routers on the public network. For example, tunneling packets between two end-points over a public network is accomplished by encapsulating the IP packet to be tunneled within the payload field for another packet that is transmitted on the public network. The tunneled IP packets, however, may need to be encrypted before the encapsulation in order to hide the source IP address. Once again, due to computer power limitations, this form of tunneling may be inappropriate for the transmission of multimedia or VoIP packets.

Another method for tunneling is network address translation (see e.g., "The IP Network Address Translator", by P. Srisuresh and K. Egevang, Internet Engineering Task Force ("IETF"), Internet Draft <draft-rfced-info-srisuresh-05.txt>, February 1998). However, this type of address translation is also computationally expensive, causes security problems by preventing certain types of encryption from being used, or breaks a number of existing applications in a network that cannot provide network address translation (e.g., File Transfer Protocol ("FTP")). What is more, network address translation interferes with the end-to-end routing principal of the Internet that recommends that packets flow end-to-end between network devices without changing the contents of any packet along a transmission route (see e.g., "Routing in the Internet," by C. Huitema, Prentice Hall, 1995, ISBN 0-131-321-927). Once again, due to computer power limitations, this form of tunneling may be inappropriate for the transmission of multimedia or VoIP packets.

It is therefore desirable to process a media flow through a tunneling association that hides the identity of the originating and terminating ends of the tunneling association from other users of a public network. Hiding the identities may prevent a hacker from intercepting all media flow between the ends.

SUMMARY OF THE INVENTION

In accordance with preferred embodiments of the present invention, some of the problems associated with processing a media flow through a tunneling association are overcome. A method and system for processing a media flow through a network device is provided. An aspect of the invention includes a method for processing the media flow at an end of a tunneling association through the network device. One method includes receiving a first message on the network device on a public network associated with a first layer of a protocol stack for the network device. The first message includes a first payload. A determination is made as to whether the first payload includes an indicator that the first payload is associated with a second layer of the protocol stack, and if so, a private network address is obtained from the first payload in the second layer of the protocol stack. The first payload includes the private network address and a second payload. A determination is made as to whether the private network address is recorded on the network device, and if so, a forwarding network address is associated with the private network address. The forwarding network address is associated with a third layer of the protocol stack and is associated with the end of the tunneling association. The third layer is requested to encapsulate and transmit a second message to the end of the tunneling association. The second message includes the forwarding network address and the second payload.

Another method includes receiving a first message in a first layer of a protocol stack for the network device from the end of the tunneling association. The first message includes a first payload. A determination is made as to whether the first payload includes an indicator that the first payload is associated with a second layer of the protocol stack, and if so, a private network address is obtained from the first payload in the second layer of the protocol stack. The first payload includes the private network address and a second payload. A determination is made as to whether the private network address is recorded on the network device, and if so, a public network address is associated with the private network address. The public network address is associated with a third layer of the protocol stack. The third layer is requested to encapsulate and transmit a second message on a public network associated with the third layer. The second message includes the public network address, the private network address, and the second payload.

For example, the method and system of the present invention may provide for the processing of a Voice-over-Internet-Protocol media flow between an originating telephony device and a terminating telephony device. The method and system described herein may help ensure that the addresses of the ends of the tunneling association are hidden on the public network and may increase the security of communication without an increased computational burden.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein.

DETAILED DESCRIPTION OF PREFERRED EMBODIMENTS

Figure 1:
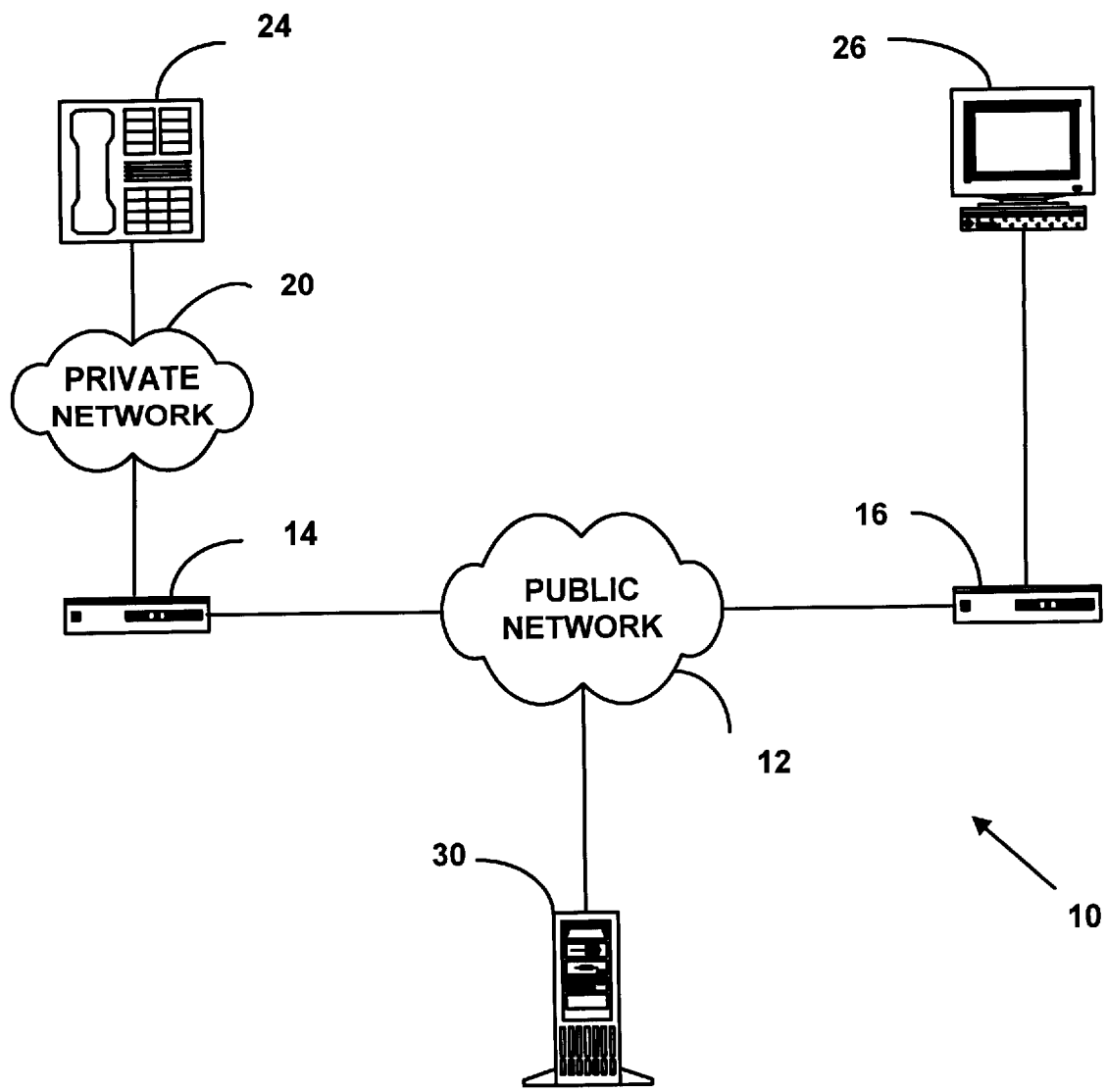
FIG. 1 is a block diagram illustrating a network system.

FIG. 1 is a block diagram illustrating an exemplary data network 10 for an illustrative embodiment of the present invention. The data network 10 includes a public network 12 (e.g. the Internet or a campus network), a first network device 14, and a second network device 16. The public network 12 is public in the sense that it may be accessible by many users who may monitor communications on it. Additionally, there may be present multiple private networks 20. Also, a trusted-third-party network device 30 is connected to the public network 12. Data packets may be transferred to/from the first network device 14, the second network device 16, and the trusted-third-party network device 30 over the public network 12. For example, the three devices may be assigned public network addresses on the Internet. The first network device 14 and the second network device 16 may be modified routers or modified gateways. The trusted-third-party may be a back-end service, a domain name server, or the owner/manager of database or directory services. Moreover, the trusted-third-party network device 30 may not be located in one physical location but may be distributed over several locations and the information may be replicated over the several locations. However, other data network types and network devices can also be used and the present invention is not limited to the data network an network devices described for an illustrative embodiment.

In one exemplary preferred embodiment of the present invention, the first network device 14 and/or the second network device 16 is an edge router. An edge router routes data packets between one or more networks such as a backbone network (e.g. public network 12) and Local Area Networks (e.g. private network 20). Edge routers include those provided by 3Com Corporation of Santa Clara, Calif. Lucent Technologies of Murray Hill, N.J., Livingston Enterprises, Inc. of Pleasanton, Calif., Ascend Communications of Alameda, Calif., Cisco Systems of San Jose, Calif., and others.

In another exemplary preferred embodiment of the present invention, the first or second network device (14 or 16) is a cable modem ("CM") or cable modem termination system ("CMTS"). Cable modems and cable modem termination systems offer customers higher-speed connectivity to the Internet, an intranet, Local Area Networks ("LANs") and other computer networks via cable television networks. CMs and CMTSs include those provided by 3Com Corporation of Santa Clara, Calif., Motorola Corporation of Arlington Heights, Ill., Hewlett-Packard Co. of Palo Alto, Calif., Bay Networks of Santa Clara, Calif., Scientific-Atlanta of Norcross, Ga., General Instruments of Horsham, Pa., and others.

The data network also includes network devices (24, 26) that are originating and terminating ends of data flow. In another exemplary preferred embodiment of the present invention, these network devices (24, 26) are telephony devices or multimedia devices. Multimedia devices include Web-TV sets and decoders, interactive video-game players, or personal computers running multimedia applications. Telephony devices include VoIP devices (portable or stationary) or personal computers running facsimile or audio applications. However, the ends of the data flow may be other types of network devices and the present invention is not restricted to telephony or multimedia devices.

Network devices and routers for preferred embodiments of the present invention include network devices that can interact with network system 10 based on standards proposed by the Institute of Electrical and Electronic Engineers ("IEEE"), International Telecommunications Union-Telecommunication Standardization Sector ("ITU"), Internet Engineering Task Force ("IETF"), or Wireless Application Protocol ("WAP") Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." IETF standards can be found at the URL "www.ietf.org." The WAP standards can be found at the URL "www.wapforum.org."

It will be appreciated that the configuration and devices of FIG. 1 are for illustrative purposes only and the present invention is not restricted to network devices such as edge routers, cable modems, cable modem termination systems, domain name servers, and telephony or multimedia devices. Many other network devices are possible. Moreover, the configuration of data network 10 is not restricted to one public network 12 and one private network 20 as shown in FIG. 1. Many different configurations of the data network 10 with multiple public networks and/or multiple private networks at various positions in the data network 10 are possible.

An operating environment for network devices and modified routers of the present invention include a processing system with at least one high speed Central Processing Unit ("CPU") and a memory. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed" or "CPU executed."

It will be appreciated that acts and symbolically represented operations or instructions include the manipulation of electrical signals or biological signals by the CPU. An electrical system or biological system represents data bits which cause a resulting transformation or reduction of the electrical signals or biological signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM")) mass storage system readable by the CPU. The computer readable medium includes cooperating or interconnected computer readable medium, which exist exclusively on the processing system or be distributed among multiple interconnected processing systems that may be local or remote to the processing system.

Network Device Protocol Stack

Figure 2:
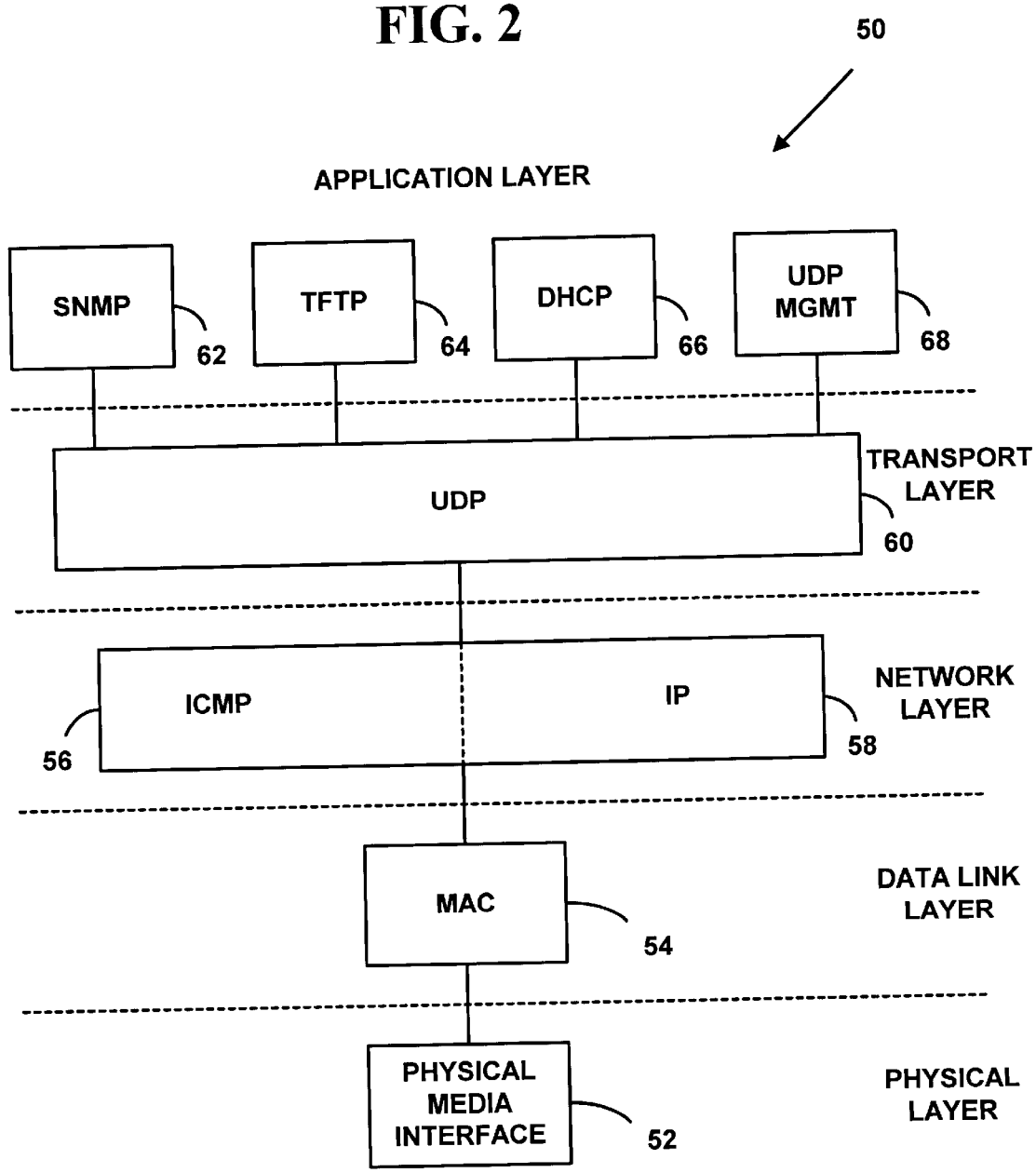
FIG. 2 is a block diagram illustrating a protocol stack for a network device.

FIG. 2 is a block diagram illustrating a protocol stack 50 for network devices in data network 10. As is known in the art, the Open System Interconnection ("OSI") model is used to describe computer networks. The OSI model consists of seven layers including from lowest-to-highest, a physical, data-link, network, transport, session, presentation and application layer. The physical layer transmits bits over a communication link. The data link layer transmits error free frames of data. The network layer transmits and routes data packets.

The lowest layer of the protocol stack is the physical layer. The physical layer includes the physical media interfaces 52 that place signals on transmission media such as wires, coaxial cable, optical fiber, or transmit them as electromagnetic waves. The physical media interfaces 52 also read signals from the transmission media and present them to the data-link layer.

In the data-link layer is a Medium Access Control ("MAC") layer 54. As is known in the art, the MAC layer 54 controls access to a transmission medium via the physical layer. For more information on the MAC layer protocol 54 see IEEE 802.3 for Ethernet and IEEE 802.14 for cable modems. However, other MAC layer protocols 54 could also be used and the present invention is not limited to IEEE 802.3 or IEEE 802.14.

Above both the data-link layer is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. For more information on the IP 58 see RFC-791 incorporated herein by reference.

The Internet Control Message Protocol ("ICMP") layer 56 is used for network management. The main functions of the ICMP layer 56, hereinafter ICMP 56, include error reporting, reachability testing (e.g., "pinging") congestion control, route-change notification, performance, subnet addressing and others. Since the IP 58 is an unacknowledged protocol, datagrams may be discarded and the ICMP 56 is used for error reporting. For more information on the ICMP 56 see RFC-792 incorporated herein by reference.

Above the IP 58 and the ICMP 56 is a transport layer with a User Datagram Protocol layer 60 ("UDP"). The UDP layer 60, hereinafter UDP 60, roughly corresponds to OSI layer 4, the transport layer, but is typically not defined as part of the OSI model. As is known in the art, the UDP 60 provides a connectionless mode of communications with datagrams. For more information on the UDP 60 see RFC-768 incorporated herein by reference. The transport layer may also include a Transmission Control Protocol ("TCP") layer (not illustrated in FIG. 2). For more information on TCP see RFC-793 incorporated herein by reference.

Above the transport layer is an application layer where the application programs that carry out desired functionality for a network device reside. For example, the application programs for the network device 26 may include printer application programs, while application programs for the network device 24 may include facsimile application programs.

In the application layer are typically a Simple Network Management Protocol ("SNMP") layer 62, a Trivial File Protocol ("TFTP") layer 64, a Dynamic Host Configuration Protocol ("DHCP") layer 66 and a UDP manager 68. The SNMP layer 62 is used to support network management functions. For more information on the SNMP layer 62 see RFC-1157 incorporated herein by reference. The TFTP layer 64 is a file transfer protocol used to download files and configuration information. For more information on the TFTP layer 64 see RFC-1350 incorporated herein by reference. The DHCP layer 66 is a protocol for passing configuration information to hosts on an IP 58 network. For more information on the DHCP layer 66 see RFC-1541 incorporated herein by reference. The UDP manager 68 distinguishes and routes packets to an appropriate service. More or fewer protocol layers can also be used in the protocol stack 50.

One service that can be performed in the application layer is that of initiating and maintaining a virtual tunnel. Virtual tunneling techniques are known to those skilled in the art. Examples of virtual tunneling include Internet Encapsulation Protocol tunneling, Generic Route Encapsulation ("GRE"), and IP in IP tunneling. All three tunneling techniques are based on encapsulating a data packet of one protocol inside a data packet of another protocol. For more information on Internet Encapsulation Protocol tunneling see RFC-1241, on GRE see RFC-1701, and on IP in IP tunneling see RFC-1853, all of which are incorporated herein by reference. Another example of a virtual tunnel service is the Host Application Based Integrated Total Address Translation ("HABITAT") system by the 3Com Corporation of Santa Clara, Calif.

Internet Protocol Data Packets

Figure 3:
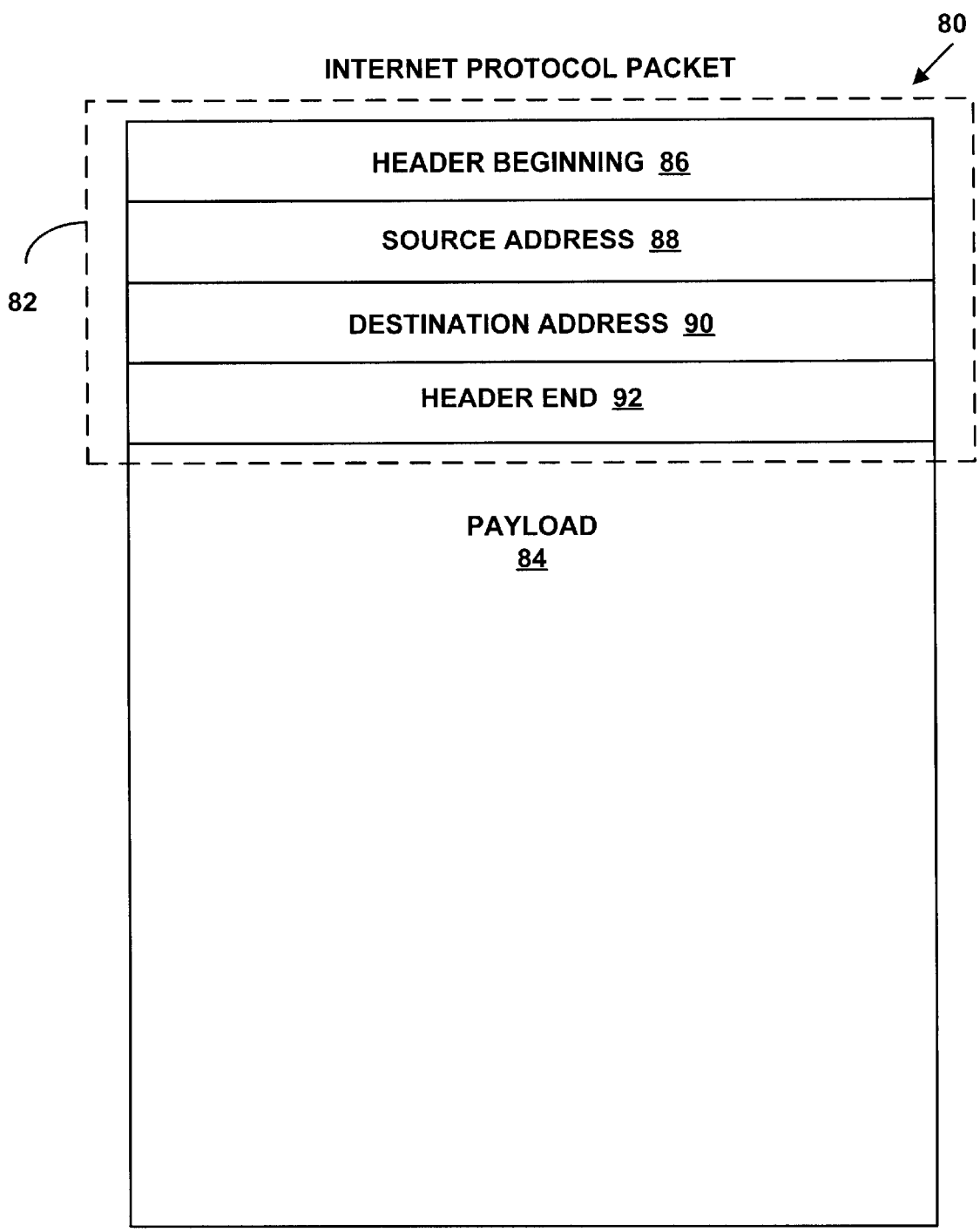
FIG. 3 is a block diagram illustrating the structure of an Internet Protocol packet.

The IP 58 layer transmits and routes IP 58 packets. FIG. 3 is a block diagram illustrating the structure of an IP 58 packet. The IP 58 packet 80 includes a header field 82 and a payload field 84. The payload field 84 of the IP 58 packet 80 typically comprises the data that is sent from one network device to another. However, the payload field 84 may also comprise network so management messages, such as ICMP 56 messages, or data packets of another protocol such as UDP 60, SNMP 62, TFTP 64, or DHCP 66. The header field 82 includes header beginning fields 86, a source address field 88, a destination address field 90, and header end fields 92. The header beginning fields 86 may include control information fields such as a version field, a header length field, a type of service field, a total length field, an identification field, a fragment offset field, a time-to-live field, a protocol field, a header checksum field, and other fields known to those skilled in the art. The header end fields 92 may include an options field and other fields known to those skilled in the art. For more information on the structure of an IP 58 packet 80 see RFC-791 incorporated herein by reference.

As is known in the art, the transfer of data from a transmitting network device to a receiving network device using the Internet Protocol is as follows: The data is broken into multiple UDP 60 datagrams in the transport layer of the protocol stack 50 of the transmitting network device. Each UDP 60 datagram is passed to the IP 58 layer for encapsulation. In the IP 58 layer, an IP 58 packet 80 is constructed with the payload field 84 consisting of the UDP 60 datagram. The IP 58 address of the transmitting network device is placed in the source address field 88 and the IP 58 address of the receiving network device is placed in the destination address field 90. The complete IP 58 packet is passed to the data-link layer where it is encapsulated in a MAC 54 frame. The physical layer receives the MAC 54 frame from the data-link layer and transmits it over a physical medium associated with its hardware.

On the receiving network device, the receiver on its physical layer is monitoring the physical media for activity. When activity is detected, the physical layer of the protocol stack 50 for the receiving network device examines the activity to discern whether the activity contains a MAC 54 frame. If so, the MAC 54 frame is passed up to the MAC 54 layer which ascertains whether the MAC 54 frame contains the MAC 54 address of the receiving network device in the destination address field of the MAC 54 header. If so, the MAC 54 header and trailer are removed and the IP 58 packet is passed to the network layer. The IP 58 layer examines the IP 58 packet and ascertains whether the IP 58 destination address field 90 contains the IP 58 address assigned to the receiving network device. If so, the IP 58 header field 82 is stripped off and the data in the payload field 84, i.e. the transmitted UDP 60 datagram, is passed to the transport layer of the protocol stack. The UDP 60 layer collects the UDP 60 datagrams and reconstitutes the original data.

Initiating a Tunneling Association

Figure 4:
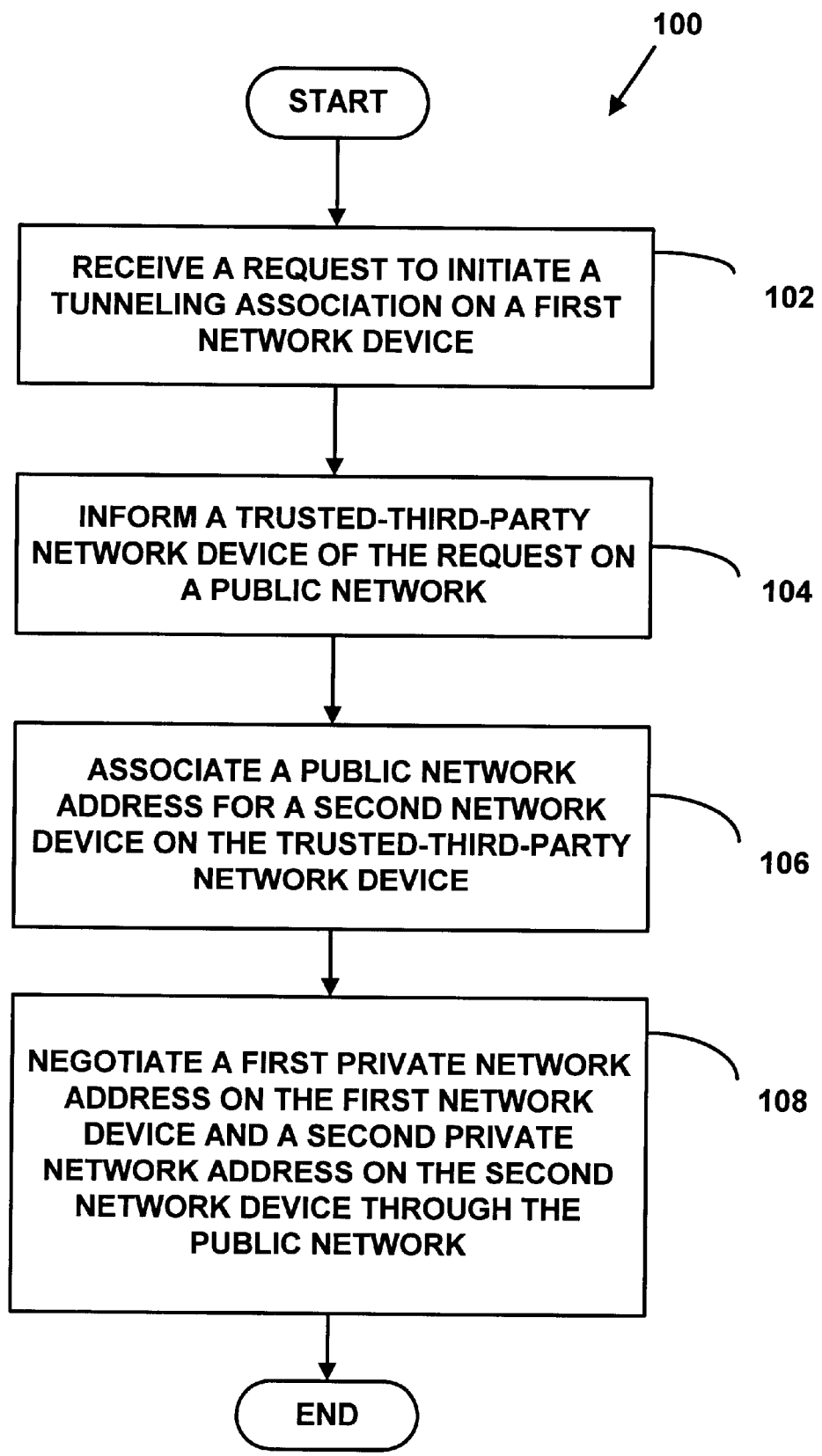
FIG. 4 is a flow diagram illustrating a method for initiating a tunneling association.

FIG. 4 is a flow diagram illustrating a Method 100 for initiating a tunneling association between an originating end and a terminating end of the tunneling association. Further details on a preferred method for initiating a tunneling association is described in our co-pending patent application filed concurrently, Ser. No. 09/384,120, "Method for Initiating a Tunneling Association in a Data Network" which is fully incorporated herein by reference. The Method 100 includes receiving a request to initiate the tunneling connection on a first network device at Step 102. The first network device is associated with the originating end of the tunneling association. The request includes a unique identifier for the terminating end of the tunneling association. At Step 104, a trusted-third-party network device is informed of the request on a public network. A public network address for a second network device is associated with the unique identifier on the trusted-third-party network device at Step 106. The second network device is associated with the terminating end of the tunneling association. At Step 108, a first private network address on the first network device and a second private network address on the second network device are negotiated through the public network. The first private network address is assigned to the originating end of the tunneling association and the second private network address is assigned to the terminating end of the tunneling association. Method 100 may result in the establishment of a virtual tunneling association between the originating end and the terminating end of the tunneling association without revealing the identities of both ends of the tunneling association on the public network.

At Step 102 of Method 100, the first network device receives a request to initiate the tunneling connection. In one embodiment of the present invention, the request is received in a higher layer of a protocol stack for the first network device. For example, with reference to FIG. 2, the request may be received in the transport layer or the application layer of the protocol stack 50. In another exemplary preferred embodiment, the higher layer of the protocol stack that receives the request is the application layer. As discussed below, the application layer may have an interface to the originating end of the tunneling association and the request takes the form of an event on the interface. Alternatively, the request may take the form of a datagram that is passed up from the transport layer. In yet another exemplary preferred embodiment, the request includes an indicator that the request datagram is associated with this higher layer. For example, the indicator may be a distinctive sequence of bits in a datagram that has been passed up from the network and transport layers. By methods known to those skilled in the art, the distinctive sequence of bits indicates to the tunneling application that it should examine the request message for its content and not ignore the datagram. However, the higher layer may be other than the transport or application layers, the protocol stack may be other than the OSI model of FIG. 2, and it should be understood that the present invention is not limited to these embodiments.

At Step 104 of Method 100, the trusted-third-party network device is informed of the request. In one exemplary preferred embodiment, the trusted-third-party network device is informed in a higher layer of a protocol stack for the trusted-third-party network device. For example, with reference to FIG. 2, the information may be received in the transport layer of the protocol stack 50 of the trusted-third-party network device. In another exemplary preferred embodiment, the higher layer of the protocol stack that receives the information is the application layer. An informing message may take the form of a datagram that is passed up from the transport layer. In yet another exemplary preferred embodiment, the informing message includes an indicator that the information datagram is associated with this higher layer. For example, the indicator may be a distinctive sequence of bits at the beginning of a datagram that has been passed up from the data-link, network, and transport layers. By methods known to those skilled in the art, the distinctive sequence of bits indicates to the tunneling application that it should examine the informing message for its content and not ignore the datagram. However, the higher layer may be other than the transport or application layers, the protocol stack may be other than the OSI model of FIG. 2, and it should be understood that the present invention is not limited to these embodiments.

At Step 106 of Method 100, a public network address for a second network device is associated with the unique identifier. In yet another exemplary preferred embodiment of the present invention, the public network address is associated with a lower layer of a protocol stack for the second network device. For example, with reference to FIG. 2, the public network address may be associated with the network or data-link of the protocol stack 50. In yet another exemplary preferred embodiment of the present invention, the lower layer is an IP 58 layer and the public network address is a globally addressable public IP 58 address. The second network device is accessible on the public network 12 by transmitting an IP 58 packet with the public IP 58 address for the second network device in the destination address field 90 (FIG. 3). Alternatively, the lower layer is a data-link layer such as a MAC 54 layer and the public network address is a MAC 54 address. However it should be understood that the lower layer of the protocol stack for the second network device may be other than the IP 58 or MAC 54 layer and that the present invention is not limited to these embodiments.

At Step 108 of Method 100, a first private network address and a second private network address are negotiated on the first network device and the second network device. In one exemplary preferred embodiment, the negotiation is carried out through the trusted-third-party network device, although it should be understood that the negotiation may occur without the involvement of the trusted-third-party network device and that the present invention is not limited by negotiation through the trusted-third-party network device. In general, the negotiation is carried out on a lower layer of a protocol stack for the network devices (14, 16, 30) that is associated with the public network. In another exemplary preferred embodiment of the present invention, these private network addresses are associated with higher layers of the protocol stacks for their respective network devices. For example, with reference to FIG. 2, the private network addresses may be associated with the transport layers or the application layers of the protocol stacks 50. In yet another exemplary preferred embodiment, the higher layers of the protocol stacks are application layers and the lower layers of the protocol stacks are IP 58 layers. A tunneling application in the application layer recognizes the private network addresses as being associated with the ends of the tunneling association. The private network addresses may be included as the payload in data packets and are passed up to the application layer from the transport layer. In yet another exemplary preferred embodiment of the present invention the private network addresses take the form of private Internet Protocol addresses. Many other formats for the private network addresses are possible but the choice of private Internet Protocol addresses may provide the advantage that the format and the application code are already familiar to those skilled in the art. However, the higher layers may be other than the transport or application layers, the protocol stacks may be other than the OSI model of FIG. 2, and it should be understood that the present invention is not limited to these embodiments.

Exemplary Initiation of a VoIP Association

Figure 5:
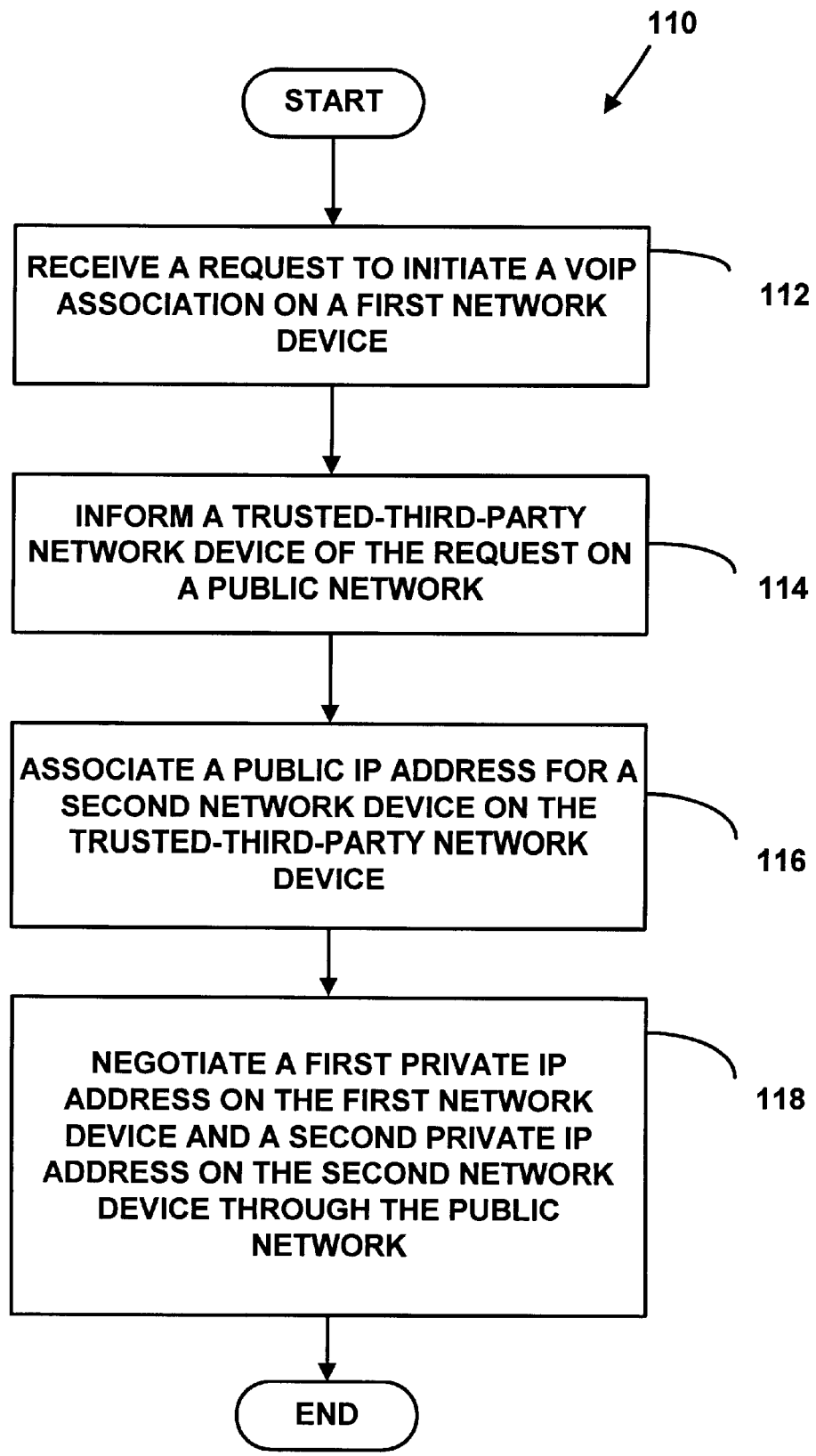
FIG. 5 is a flow diagram illustrating a method for initiating a Voice-over-Internet-Protocol association.

FIG. 5 is a flow diagram illustrating a Method 110 for initiating a VoIP association between an originating telephony device 24 and a terminating telephony device 26. VoIP is described in ITU standard H.323. As is known in the art, H.323 is a protocol used for multimedia communications including voice. Method 110 includes receiving a request to initiate the VoIP association on a first network device 14 at Step 112. The first network device 14 is associated with the originating telephony device 24, and the request includes a unique identifier for the terminating telephony device 26. In one exemplary preferred embodiment of the present invention, the first network device 14 is any of a CM or a CMTS in a data-over-cable network. The CM or CMTS is assigned a globally addressable public IP 58 address which appears in an IP 58 packet header field 82 sent to/from the CM or CMTS. If the CM or CMTS transmits an IP 58 packet to another network device on the public network 12 (e.g. the Internet) the public IP 58 address will appear in the header field 82 in the source address field 88. Similarly, if the CM or to CMTS receives an IP 58 packet from the public network 12, the public IP 58 address appears as the destination address field 90 in the header field 82 of the IP 58 packet. In another exemplary preferred embodiment, the first network device 14 is a set-top box adapted to connect to the originating telephony device 24.

The request to initiate the VoIP association is received on the first network device 14. For example, if the originating telephony device 24 is a phone that is physically connected to the first network device 14 the request may include an electrical signal measured by an interface to an application on the first network device 14 as a result of the phone going "off-hook". The electrical signal may be the presence of a certain voltage level or the presence of a certain current flow through a loop by methods known to those skilled in the telephony arts. Alternatively, if the originating telephony device 24 is a data network device on a local area network or private network 20 which includes the first network device 14, the request may include an IP 58, ICMP 56, or MAC 54 message that indicates the initiation of a VoIP association.

Moreover, the request includes a unique identifier for the terminating telephony device 26. In another exemplary preferred embodiment of the present invention, the unique identifier is any of a dial-up number, an electronic mail address, or a domain name. For example, if the originating telephony device 24 is a phone that is physically connected to the first network device 14, a user may simply be required to lift a telephone handset from its cradle and dial a conventional E.164 dial-up telephone number. E.164 is an ITU recommendation for the assignment of telephone numbers on a worldwide basis. In this case, the request may be an "off-hook" electrical signal followed by a series of Dual Tone Multi-Frequency ("DTMF") tones that represent a dial-up number for the terminating telephony device 26 on an application interface go for the first network device. Alternatively, the dial-up number may be included as a string of characters in the payload of a data packet sent from the originating telephony device 24 to the first network device 14. Other possibilities are that the unique identifier is an electronic mail address or a domain name and may be used to initiate the VoIP association. For example, the user of the terminating telephony device 26 may have moved from one office to another office while still retaining the same electronic mail address. Rather than identifying the terminating user by the number assigned to a physical device in the office, it may be more appropriate to identify the user by the static electronic mail address. Similarly, a company may move premises while still retaining the same domain name and it may be more appropriate to identify the user by the static domain name. There are many other possibilities for the unique identifier, e.g. employee number, social security number, driver's license number, or even a previously assigned public IP 58 address. The electronic mail address, domain name, or other possible unique identifier may be included in the payload of an IP 58 or MAC 54 packet. It should be understood that many other choices of the request and unique identifier are possible and that the above-mentioned forms of the request and unique identifier do not limit the present invention.

At Step 114, a trusted-third-party network device 30 is informed of the request on the public network 12. The informing step may include one or multiple transfer of IP 58 packets across the public network 12. The public network 12 may include the Internet. For each transfer of a packet from the first network device 14 to the trusted-third-party network device 30, the first network device 14 constructs an IP 58 packet. The header 82 of the IP 58 packet includes the public network 12 address of the trusted-third-party network device 30 in the destination address field 90 and the public network 12 address of the first network device 14 in the source address field 88. At least one of the IP 58 packets includes the unique identifier for the terminating telephony device 26 that had been included in the request message. The IP 58 packets may require encryption or authentication to ensure that the unique identifier cannot be read on the public network 12.

A public IP 58 address for a second network device 16 is associated with the unique identifier for the terminating telephony device 26 at Step 116. The second network device 16 is associated with the terminating telephony device 26. This association of the public IP 58 address for the second network device 16 with the unique identifier is made on the trusted-third-party network device 30. In one exemplary preferred embodiment, the trusted-third-party network device 30 is a back-end service, a domain name server, or the owner/manager of database or directory services and may be distributed over several physical locations. In another exemplary preferred embodiment, the second network device 16 is any of a CM or CMTS in a data-over-cable network. The CM or CMTS is assigned a globally addressable public IP 58 address which appears in an IP 58 packet header field 82 sent to/from the CM or CMTS. In yet another exemplary preferred embodiment, the second network device 16 is a set-top box adapted to connect to the terminating telephony device 26.

For example, the trusted-third-party network device 30 may be a directory service, owned and operated by a telephone company, that retains a list of E.164 numbers of its subscribers. Associated with a E.164 number in the directory database is the IP 58 address of a particular second network device 16. The database entry may also include a public IP 58 addresses for the terminating telephony device 26. Many data structures that are known to those skilled in the art are possible for the association of the unique identifiers and IP 58 addresses for the second to network devices 16. However, it should be understood that the present invention is not restricted to E.164 telephone numbers and directory services and many more unique identifiers and trusted-third-party network devices are possible.

At Step 118, a first private IP 58 address on the first network device 14 and a second private IP 58 address on the second network device are negotiated through the public network 12. Private IP 58 addresses are addresses that are reserved for use in private networks that are isolated from a public network such as the Internet. Private IP 58 addresses are not globally routable. As is known in the art, private IP 58 addresses typically include IP 58 addresses beginning with 10.0.0.0, 172.16.0.0, and 192.168.0.0. These private IP 58 addresses are assigned to the telephony devices (24, 26), viz., the first private IP 58 address is assigned to the originating telephony device 24 and the second private IP 58 address is assigned to the terminating telephony device 26. The assignment of private IP 58 addresses is discussed below. The negotiation ensures that neither the private nor any public IP 58 addresses for the ends of the VoIP association appear in the source 88 or destination 90 address fields of the IP 58 packets that comprise the negotiation. The IP 58 packets of the negotiation step 118 will only have source 88 or destination 90 address fields containing the IP 58 addresses of the first 14, second 16, or trusted-third-party 30 network device. In this manner the identities of the originating 24 and terminating 26 telephony devices are inside the payload fields 84 of the IP 58 packets and may be hidden from hackers on the public network 12. The negotiation may occur through the trusted-third-party network device 30 to further ensure the anonymity of the telephony devices (24, 26).

Figure 6:
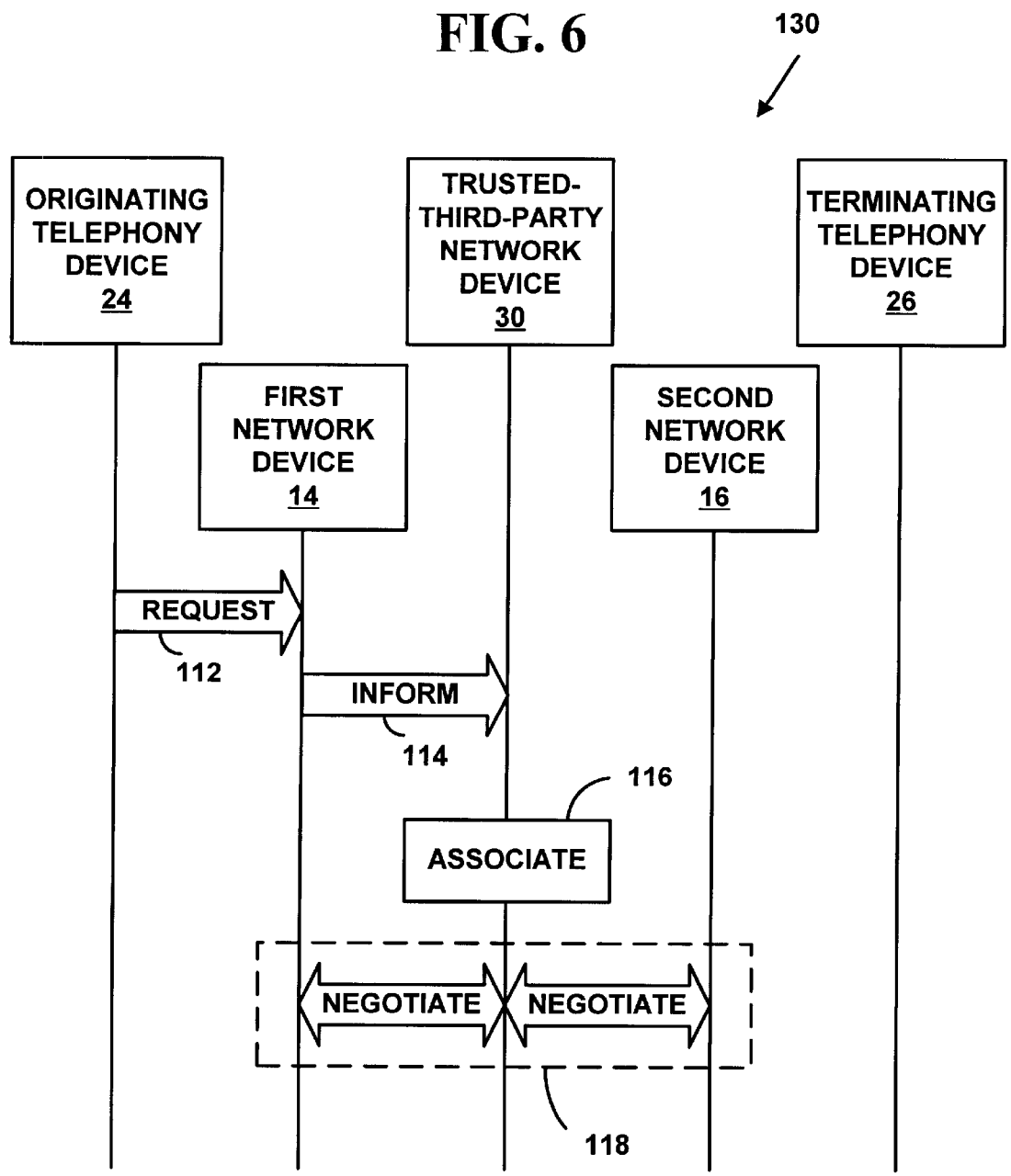
FIG. 6 is a block diagram illustrating the message flow of the method illustrated in FIG. 5.

FIG. 6 is a block diagram illustrating a message flow 130 of the Method 110 illustrated in FIG. 5. Method Steps 112, 114, 116, and 118 of Method 110 (FIG. 5) are illustrated in FIG. 6. It should be understood that the message flow 130 may include more or fewer messages, that the steps of Method 110 and the message flow 130 may occur in a different order, and that the present invention is not restricted to the order of the message flow illustrated in FIG. 6.

Once negotiated, on the first network device 14 is recorded the first private IP 58 address for the originating telephony device 24, and on the second network device 16 is recorded the second private IP 58 address for the terminating telephony device 26. These IP 58 addresses may be stored in network address tables on the respective network devices, and may be associated with physical or local network addresses for the respective ends of the VoIP association by methods known to those skilled in the art.

Exemplary Negotiation of Private Network Addresses

Figure 7:
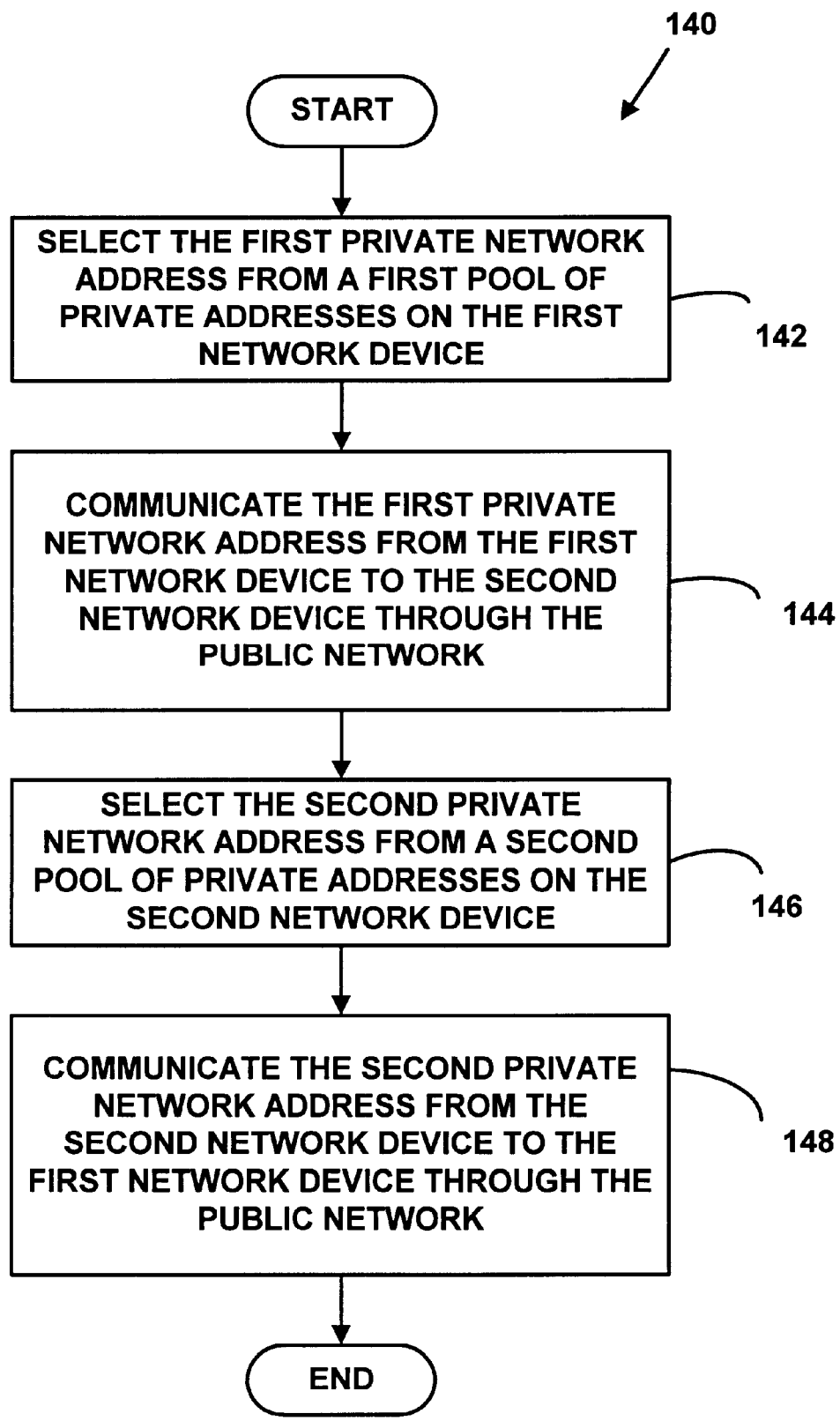
FIG. 7 is a flow diagram illustrating a method for negotiating private network addresses.

The negotiating Step 108 of Method 100 (FIG. 4) distributes the first and second private network addresses to the first 14 and second 16 network devices. FIG. 7 is a flow diagram illustrating a Method 140 for negotiating private network addresses at Step 108 of FIG. 4. With reference to FIG. 7, the Method 140 includes selecting the first private network address from a first pool of private addresses on the first network device at Step 142. At Step 144, the first private network address is communicated from the first network device to the second network device through the public network. The second private network address is selected from a second pool of private addresses on the second network device at Step 146. The second private network address is a different address than the first private network address. At Step 148, the second private network address is communicated from the second network device to the first network device through the public network.

Figure 8:
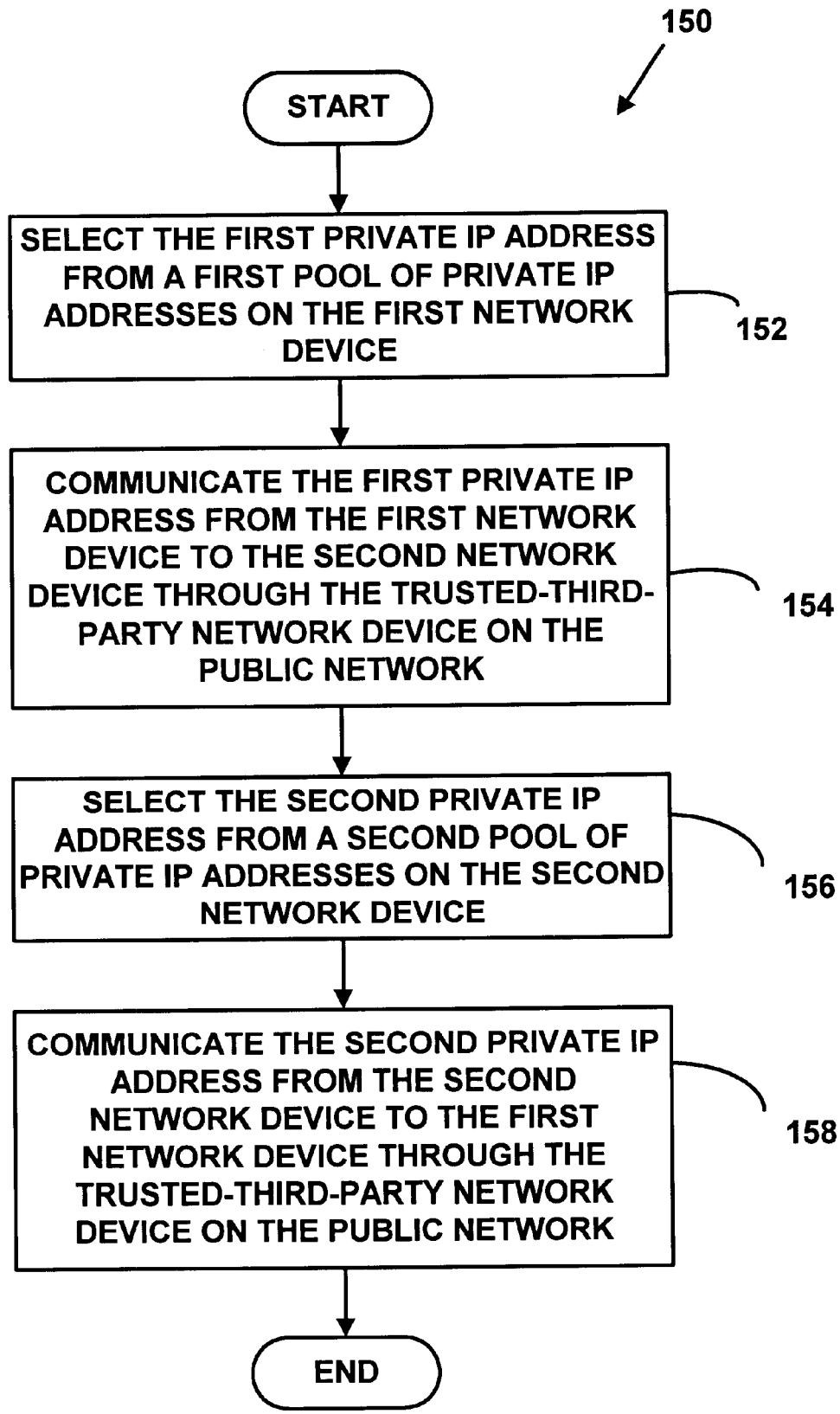
FIG. 8 is a flow diagram illustrating a method for negotiating private Internet Protocol addresses.
Figure 9:
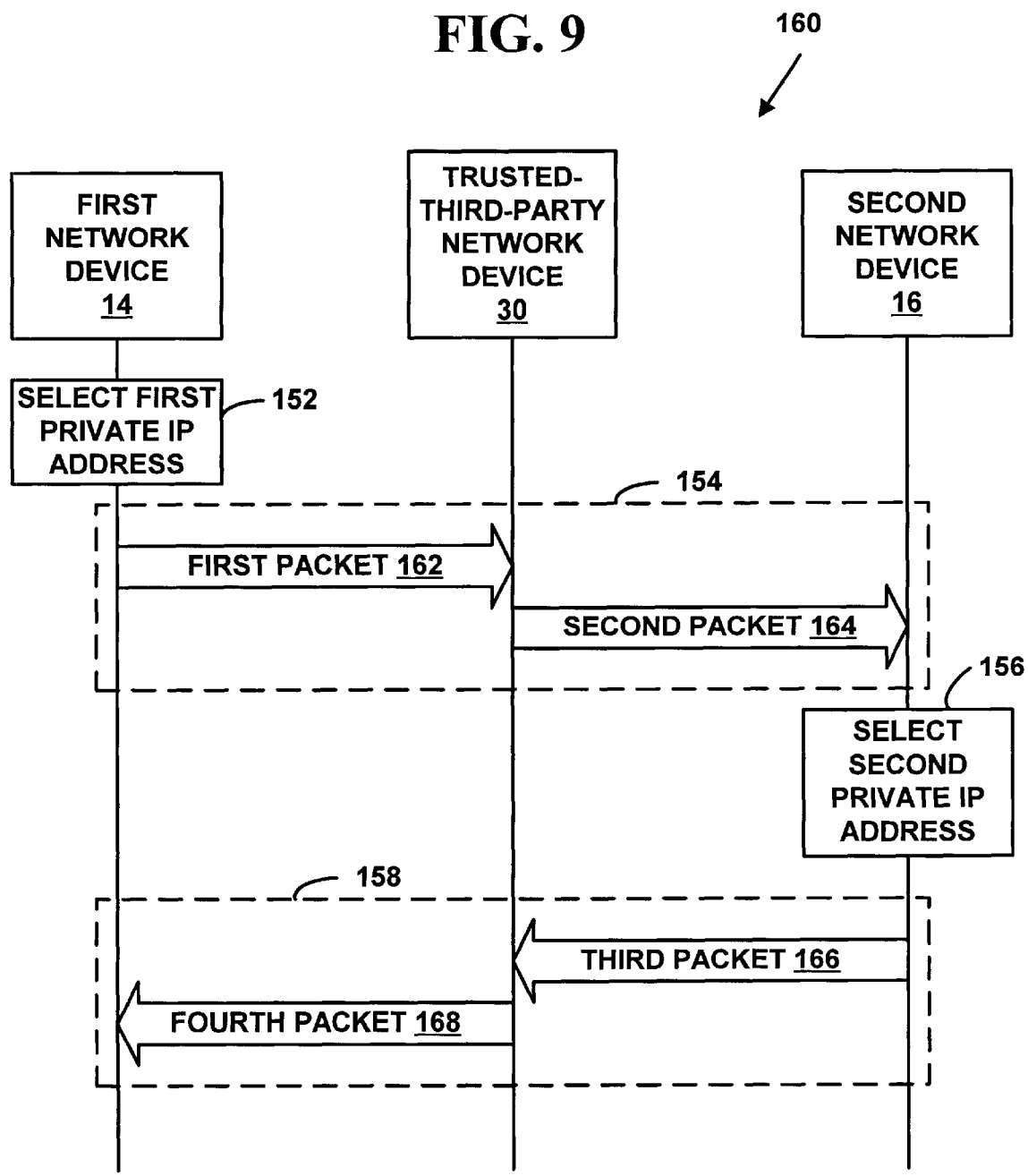
FIG. 9 is a block diagram illustrating the message flow of the method illustrated in FIG. 8.

In one exemplary preferred embodiment of the present invention, the private network addresses are private IP 58 addresses and the communication between the first, second, and trusted-third-party network devices are IP 58 messages. FIG. 8 is a flow diagram illustrating a Method 150 for negotiating private IP 58 addresses. FIG. 9 is a block diagram illustrating a message flow 160 of the Method 150 illustrated in FIG. 8. Method Steps 152, 154, 156, and 158 of Method 150 (FIG. 8) are illustrated in FIG. 9. With reference to FIG. 8, the Method 150 includes selecting the first private IP 58 address from a first pool of private IP 58 addresses on the first network device 14 at Step 152. Once selected, the first private IP 58 address is removed from the first pool so that it cannot be selected for other tunneling associations through the first 14 or second 16 network device. The first pool includes private IP 58 addresses that have not been assigned to originating or terminating ends of tunneling associations through the first network device 14. The selected first private IP 58 address is assigned to the originating end of the tunneling association 24 on the first network device 14. The assignment of the private IP 58 addresses on the first 14 and second 16 network devices is discussed below.

At Step 154, the first private IP 58 address is communicated from the first network device 14 to the second network device 16 through the trusted-third-party network device 30 on the public network 12. With reference to FIG. 9, the first network device 14 constructs a first IP 58 packet 162 including the public IP 58 address of the first network device 14 in the source address field 88 and the public IP 58 address of the trusted-third-party network device 30 in the destination address field 90. Included in the payload field 84 of the first IP 58 packet 162 is the first private IP 58 address. Also included in the payload field 84 of the first IP 58 packet 162 is an identifier for the tunneling association, e.g. the unique identifier from the requesting Step 102 or the informing Step 104 of Method 100 (FIG. 4). The first IP 58 packet 162 is sent to the trusted-third-party network device 30 on the public network 12. The trusted-third-party network device 30 receives the first IP 58 packet 162, examines the payload 84, and determines that it includes the first private IP 58 address that has been assigned to the originating end of the tunneling association 24.

The trusted-third-party network device 30 has already determined that the terminating end of this tunneling association 26 is associated with the second network device 16 during the associating Step 106 of Method 100 (FIG. 4). The trusted-third-party network device 30 constructs a second IP 58 packet 164 with the public IP 58 address of the trusted-third-party network device 30 in the source address field 88 and the public IP 58 address of the second network device 16 in the destination address field 90. Included in the payload field 84 of the second IP 58 packet 164 are the first private IP 58 address and the public IP 58 address of the first network device 14. The second IP 58 packet 164 is sent to the second network device 16 on the public network 12. The second network device 16 receives the second IP 58 packet 164, examines the payload 84, and determines that it includes both the first private IP 58 address that has been assigned to the originating end of the tunneling association 24 and the public IP 58 address of the first network device 14.

The second private IP 58 address is selected from a second pool of private IP 58 addresses on the second network device 16 at Step 146. The second private IP 58 address is selected to be a different address than the first private IP 58 address that was received on the second network device 16 in the second IP 58 packet 164. Once selected, the first and second private IP 58 addresses are removed from the second pool so that they cannot be selected for other tunneling associations through the first 14 or second 16 network device. The second pool includes private IP 58 addresses that have not been assigned to originating or terminating ends of tunneling associations through the second network device 14. The selected second private IP 58 address is assigned to the terminating end of the tunneling association 26 on the second network device 16. The assignment of the private IP 58 addresses is discussed below.

At Step 158, the second private IP 58 address is communicated from the second network device 16 to the first network device 14 through the trusted-third-party network device 30 on the public network 12. The second network device 16 constructs a third IP 58 packet 166 including the public IP 58 address of the second network device 16 in the source address field 88 and the public IP 58 address of the trusted-third-party network device 30 in the destination address field 90. Included in the payload field 84 of the third IP 58 packet 166 is the second private IP 58 address. Also included in the payload field 84 of the third IP 58 packet 166 is an identifier for the tunneling association. For example, the identifier may be the first private IP 58 address, or the unique identifier from the requesting Step 102 or the informing Step 104 of Method 100 (FIG. 4). The third IP 58 packet 166 is sent to the trusted-third-party network device 30 on the public network 12. The trusted-third-party network device 30 receives the third IP 58 packet 166, examines the payload 84, and determines that it includes the second private IP 58 address that has been assigned to the terminating end of the tunneling association 26.

The trusted-third-party network device 30 constructs a fourth IP 58 packet 168 with the public IP 58 address of the trusted-third-party network device 30 in the source address field 88 and the public IP 58 address of the first network device 14 in the destination address field 90. Included in the payload field 84 of the fourth IP 58 packet 168 is the second private IP 58 address and the public IP 58 address of the second network device 16. The fourth IP 58 packet 168 is sent to the first network device 14 on the public network 12. The first network device 14 receives the fourth IP 58 packet 168, examines the payload 84, and determines that it includes both the second private IP 58 address that has been assigned to the terminating end of the tunneling association 26 and the public IP 58 address of the second network device 16.

The first 162, second 164, third 166, and fourth 168 IP 58 packets may also include indicators that the contents of the payload fields 84 are associated with higher layers of the protocol stacks 50 for the first 14, second 16, and trusted-third-party 30 network devices. In one exemplary preferred embodiment, the higher layers of the protocol stacks 50 are application layers. The contents of the payload fields 84 are received and decapsulated in lower layers of the protocol stacks 50, such as the IP 58 layers, passed up to the application layers of the protocol stacks 50, and examined in the application layers. For example, payloads are passed up from lower layers and the indicators direct the higher layers to examine the payloads. Additionally, the contents of the payload fields 84 can be constructed in the higher layers of the protocol stacks 50 which pass them down to the lower layers of the protocol stacks 50 for encapsulation and transmission on lower layers of the protocol stacks 50.

Following Method 160, the first network device 14 has obtained the public IP 58 address of the second network device 16, the first private IP 58 address, and the second private IP 58 address. Additionally, the second network device 16 has obtained the public IP 58 address of the first network device 14, the first private IP 58 address, and the second private IP 58 address. Both first 14 and second 16 network devices have obtained the private IP 58 addresses of the originating end of the tunneling association 24 that requested the initiation of the tunneling association and the terminating end of the tunneling association 26 that was associated with the unique identifier. It should be understood that the message flow 160 may include more or fewer messages and that the steps of Method 150 and the message flow 160 may occur in a different order. The present invention is not restricted to the order of the message flow illustrated in FIG. 9.

Figure 10:
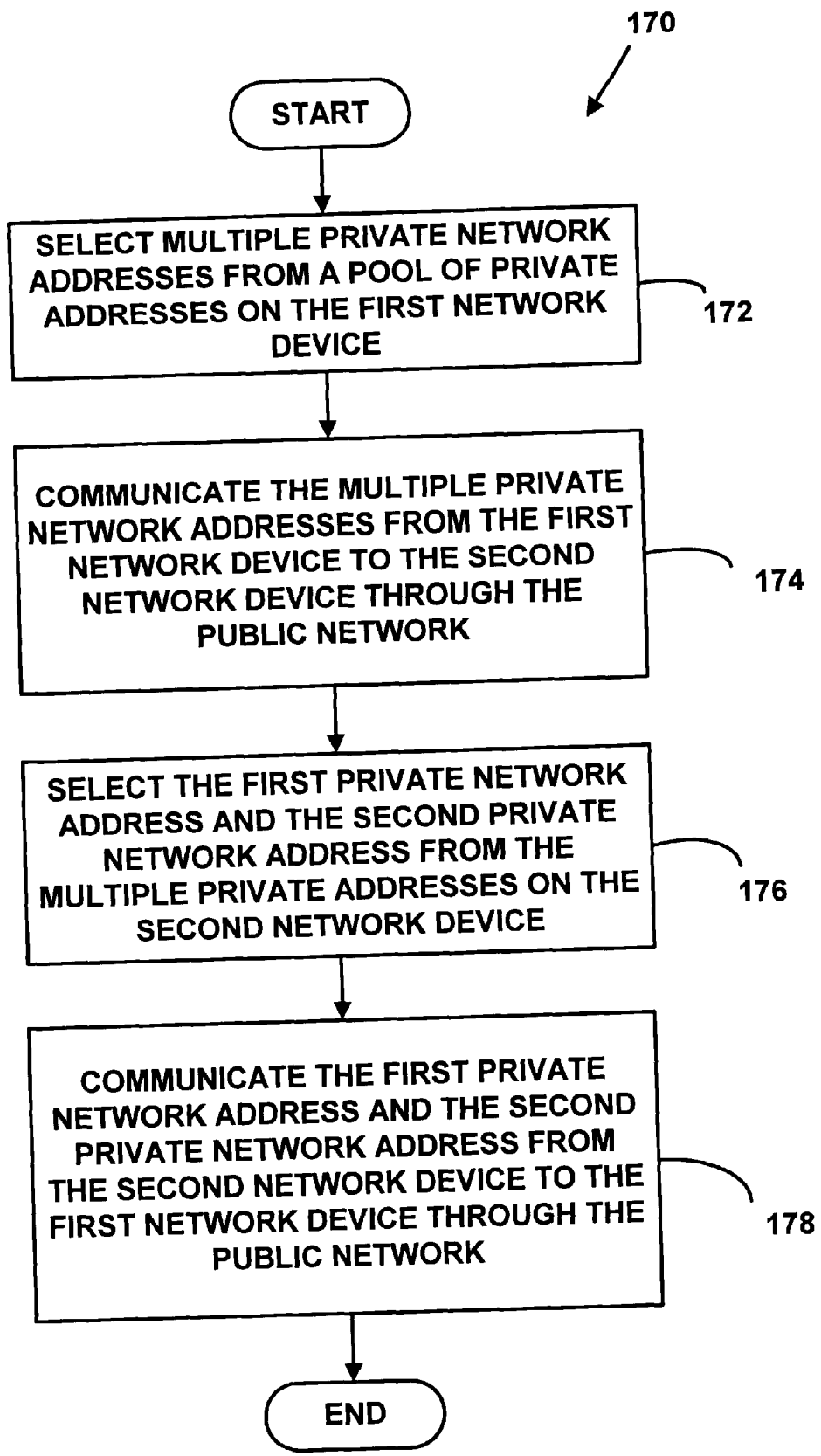
FIG. 10 is a flow diagram illustrating a method for negotiating private network addresses.

FIG. 10 is a flow diagram illustrating another Method 170 for negotiating private network addresses at Step 108 of FIG. 4. With reference to FIG. 10, the Method 170 includes selecting multiple private network addresses from a pool of private addresses on the first network device at Step 172. At Step 174, the multiple private network addresses are communicated from the first network device to the second network device through the trusted-third-party network device on the public network. The first and second private network addresses are selected from the multiple private network addresses on the second network device at Step 176. The second private network address is a different address than the first private network address. At Step 178, the first and second private network addresses are communicated from the second network device to the first network device through the trusted-third-party network device on the public network.

Figure 11:
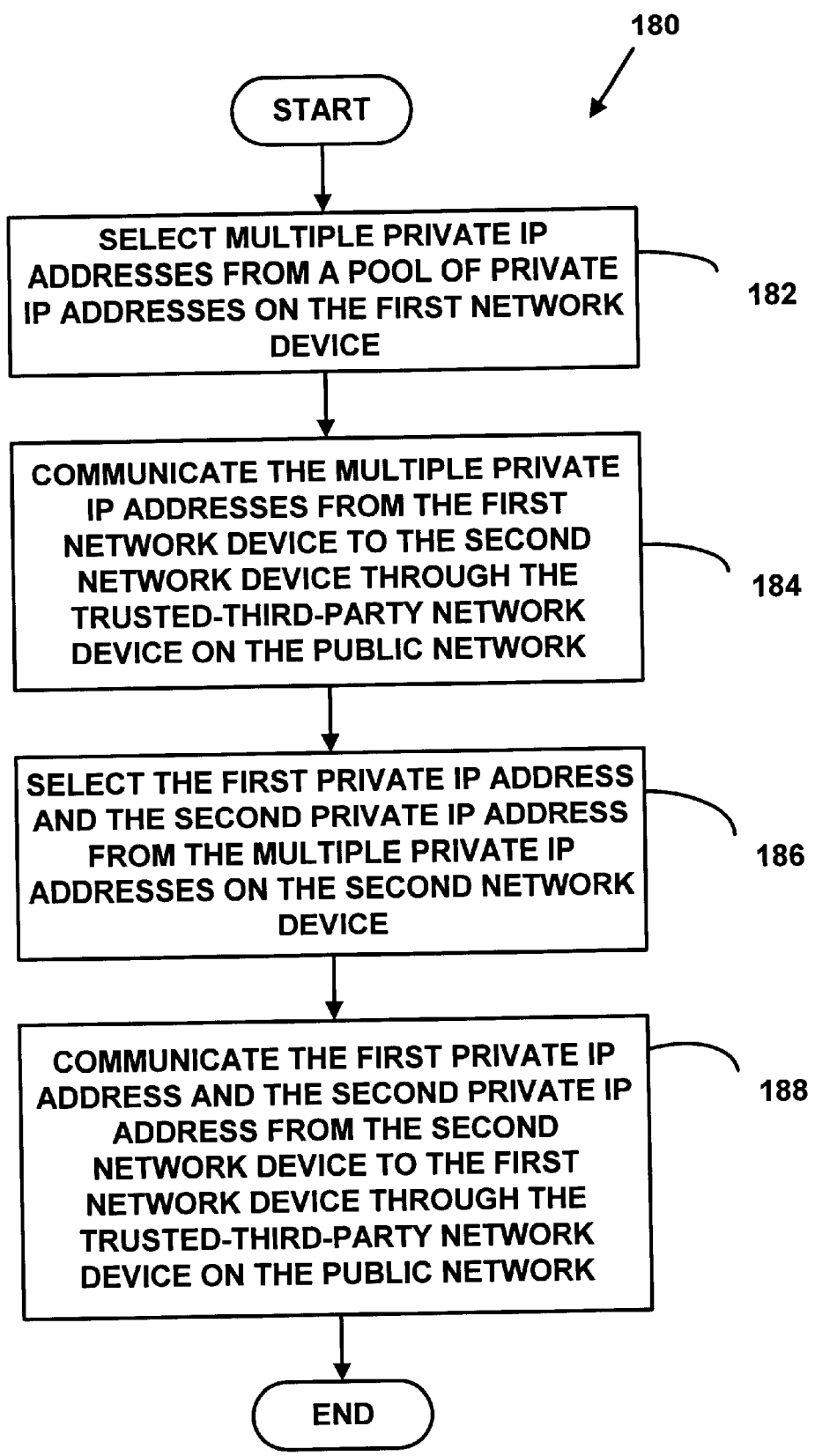
FIG. 11 is a flow diagram illustrating a method for negotiating private Internet Protocol addresses.
Figure 12:
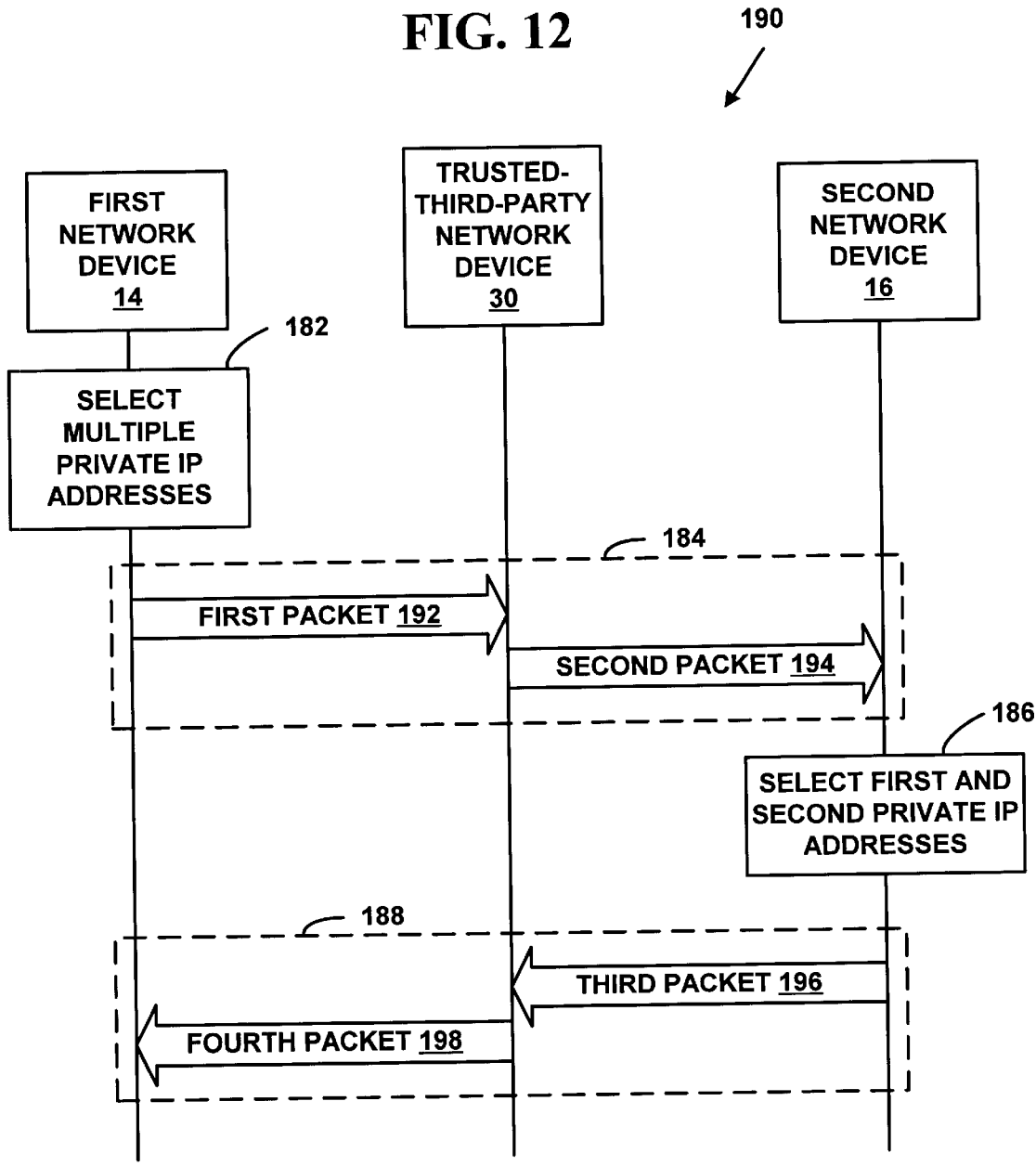
FIG. 12 is a block diagram illustrating the message flow of the method illustrated in FIG. 1.

In another exemplary preferred embodiment of the present invention, the private network addresses are private IP 58 addresses and the communication between the first, second, and trusted-third-party network devices are IP 58 messages. FIG. 11 is a flow diagram illustrating a Method 180 for negotiating private IP 58 addresses. FIG. 12 is a block diagram illustrating a message flow 190 of the Method 180 illustrated in FIG. 11. Method Steps 182, 184, 186, and 188 of Method 180 (FIG. 11) are illustrated in FIG. 12. With reference to FIG. 11, the Method 180 includes selecting multiple private IP 58 addresses from a pool of private IP 58 addresses on the first network device 14 at Step 182. The pool includes private IP 58 addresses that have not been assigned to originating or terminating ends of tunneling associations through the first network device 14.

At Step 184, the multiple private IP 58 addresses are communicated from the first network device 14 to the second network device 16 through the trusted-third-party network device 30 on the public network 12. With reference to FIG. 12, the first network device 14 constructs a first IP 58 packet 192 including the public IP 58 address of the first network device 14 in the source address field 88 and the public IP 58 address of the trusted-third-party network device 30 in the destination address field 90. Included in the payload field 84 of the first IP 58 packet 192 are the multiple private IP 58 addresses. Also included in the payload field 84 of the first IP 58 packet 192 is an identifier for the tunneling association, e.g. the unique identifier from the requesting Step 102 or the informing Step 104 of Method 100 (FIG. 4). The first IP 58 packet 192 is sent to the trusted-third-party network device 30 on the public network 12. The trusted-third-party network device 30 receives the first IP 58 packet 192, examines the payload 84, and determines that it includes the multiple private IP 58 addresses.

The trusted-third-party network device 30 has already determined that the terminating end of this tunneling association 26 is associated with the second network device 16 during the associating Step 106 of Method 100 (FIG. 4). The trusted-third-party network device 30 constructs a second IP 58 packet 194 with the public IP 58 address of the trusted-third-party network device 30 in the source address field 88 and the public IP 58 address of the second network device 16 in the destination address field 90. Included in the payload field 84 of the second IP 58 packet 194 are the multiple private IP 58 addresses and the public IP 58 address of the first network device 14. The second IP 58 packet 194 is sent to the second network device 16 on the public network 12. The second network device 16 receives the second IP 58 packet 194, examines the payload 84, and determines that it includes both the multiple private IP 58 addresses and the public IP 58 address of the first network device 14.

The first and second private IP 58 addresses are selected from the multiple private IP 58 addresses on the second network device 16 at Step 186. The second private IP 58 address is selected to be a different address than the first private IP 58 address. Once selected, the first and second private IP 58 addresses are removed from any private address pool on the second network device 16 so that they cannot be selected for other tunneling associations through the first 14 or second 16 network device. The pool on the second network device 16 may include private IP 58 addresses that have not been assigned to originating or terminating ends of tunneling associations through the second network device 14. The selected second private IP 58 address is assigned to the terminating end of the tunneling association 26 on the second network device 16. The assignment of the private IP 58 addresses is discussed below.

At Step 188, the first and second private IP 58 addresses are communicated from the second network device 16 to the first network device 14 through the trusted-third-party network device 30 on the public network 12. The second network device 16 constructs a third IP 58 packet 196 including the public IP 58 address of the second network device 16 in the source address field 88 and the public IP 58 address of the trusted-third-party network device 30 in the destination address field 90. Included in the payload field 84 of the third IP 58 packet 196 are the first and second private IP 58 addresses. Also included in the payload field 84 of the third IP 58 packet 196 is an identifier for the tunneling association, e.g. the unique identifier from the requesting Step 102 or the informing Step 104 of Method 100 (FIG. 4). The third IP 58 packet 196 is sent to the trusted-third-party network device 30 on the public network 12. The trusted third-party network device 30 receives the third IP 58 packet 196, examines the payload 84, and determines that it includes the first and second private IP 58 addresses, the second of which has been assigned to the terminating end of the tunneling association 26.

The trusted-third-party network device 30 constructs a fourth IP 58 packet 198 with the public IP 58 address of the trusted-third-party network device 30 in the source address field 88 and the public IP 58 address of the first network device 14 in the destination address field 90. Included in the payload field 84 of the fourth IP 58 packet 198 are the first and second private IP 58 addresses and the public IP 58 address of the second network device 16. The fourth IP 58 packet 198 is sent to the first network device 14 on the public network 12. The first network device 14 receives the fourth IP 58 packet 198, examines the payload 84, and determines that it includes the first and second private IP 58 addresses and the public IP 58 address of the second network device 16. The first and second private IP 58 addresses are removed from the pool of private IP addresses on the first network device 14 so that they cannot be selected for other tunneling associations through the first 14 or second 16 network device. The private IP address pool on the first network device 14 includes private IP 58 addresses that have not been assigned to originating or terminating ends of tunneling associations through the first 14 or second 16 network devices. The first private IP 58 address is assigned to the originating end of the tunneling association 24 on the first network device 14. The assignment of the private IP 58 addresses is discussed below.

The first 192, second 194, third 196, and fourth 198 IP 58 packets may also include indicators that the contents of the payload fields 84 are associated with higher layers of the protocol stacks 50 for the first 14, second 16, and trusted-third-party 30 network devices. In one exemplary preferred embodiment, the higher layers of the protocol stacks 50 are application layers. The contents of the payload fields 84 are received and decapsulated in lower layers of the protocol stacks 50, such as the IP 58 layers, passed up to the application layers of the protocol stacks 50, and examined in the application layers. For example, payloads are passed up from lower layers and the indicators direct the higher layers to examine the payloads. Additionally, the contents of the payload fields 84 can be constructed in the higher layers of the protocol stacks 50 which pass them down to the lower layers of the protocol stacks 50 for encapsulation and transmission on lower layers of the protocol stacks 50.

Following Method 190, the first network device 14 has obtained the public IP 58 address of the second network device 16, the first private IP 58 address, and the second private IP 58 address. Additionally, the second network device 16 has obtained the public IP 58 address of the first network device 14, the first private IP 58 address, and the second private IP 58 address. Both first 14 and second 16 network devices have obtained the private IP 58 addresses of the originating end of the tunneling association 24 that requested the initiation of the tunneling association and the terminating end of the tunneling association 26 that was associated with the unique identifier. It should be understood that the message flow 190 may include more or fewer messages and that the steps of Method 180 and the message flow 190 may occur in a different order. The present invention is not restricted to the order of the message flow illustrated in FIG. 12.

Figure 13:
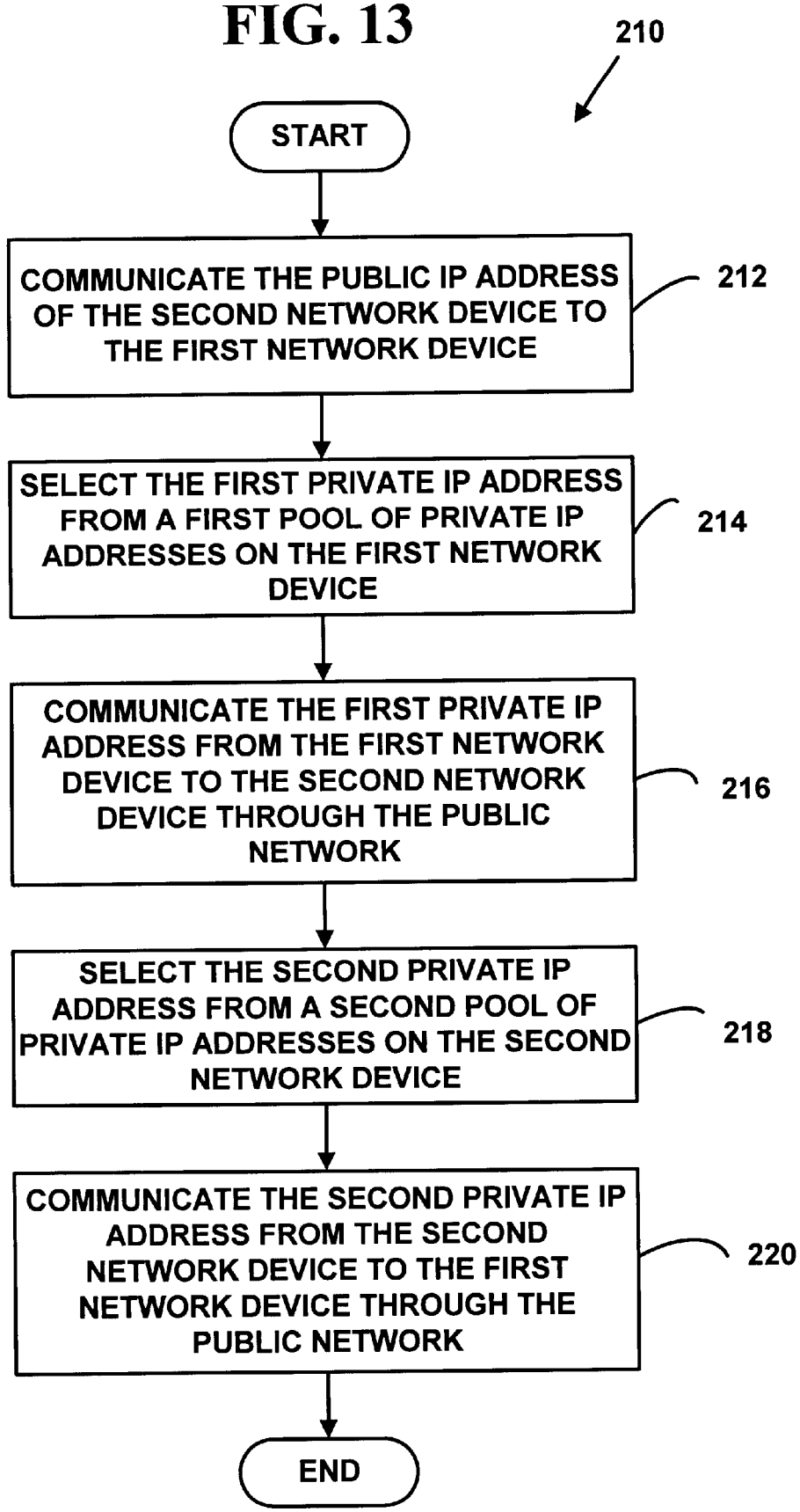
FIG. 13 is a flow diagram illustrating a method for negotiating private Internet Protocol addresses.
Figure 14:
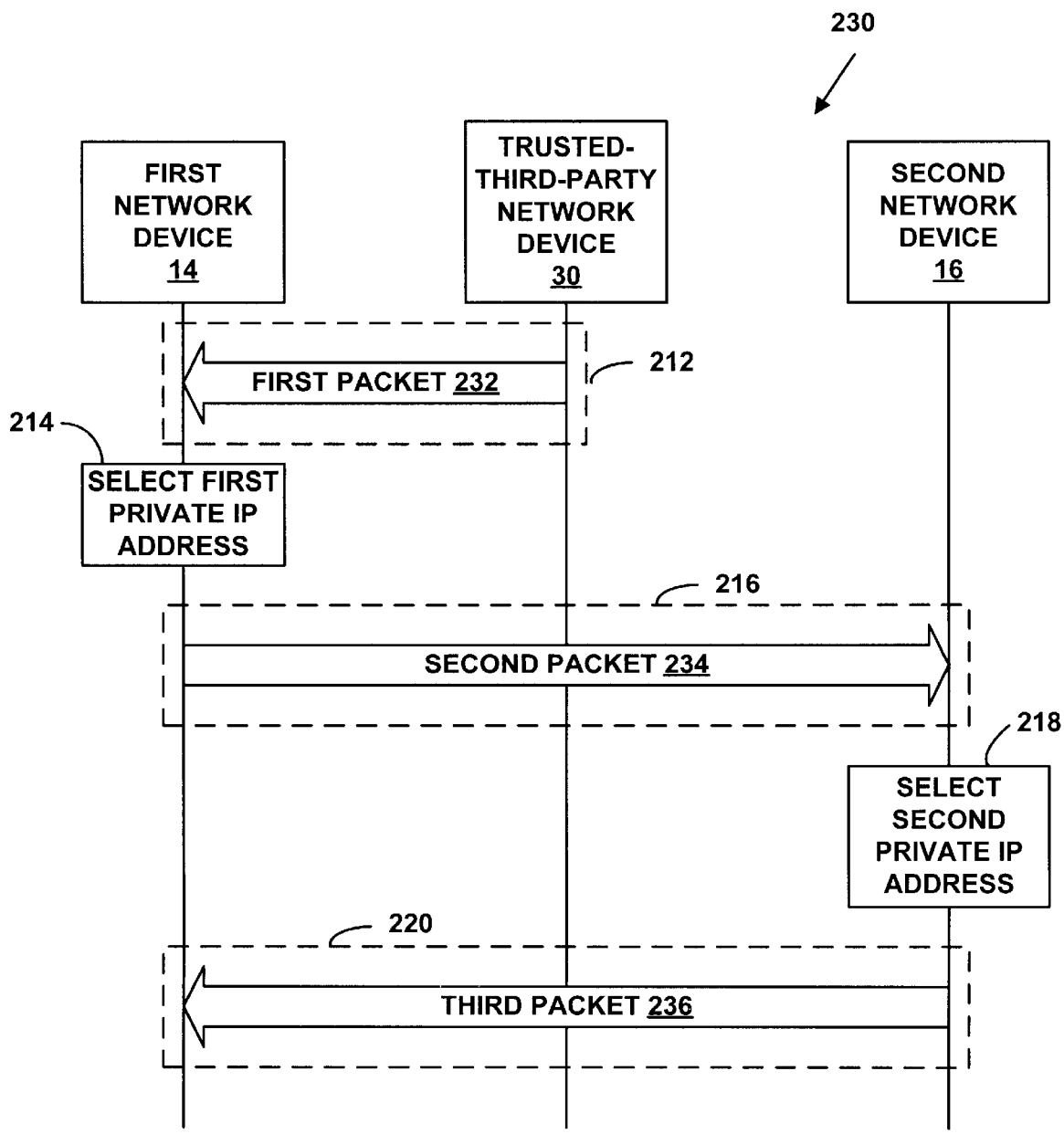
FIG. 14 is a block diagram illustrating the message flow of the method illustrated in FIG. 13.

Referring back to FIG. 7, the Method 140 for negotiating private network addresses selected the first and second private network addresses respectively on the first 14 and second 16 network devices. In yet another exemplary preferred embodiment of the present invention, the private network addresses are private IP 58 addresses and the communication between the first, second, and trusted-third-party network devices are IP 58 messages. FIG. 13 is a flow diagram illustrating another Method 210 of negotiating private IP addresses. FIG. 14 is a block diagram illustrating a message flow 230 of the Method 210 illustrated in FIG. 13. Method Steps 212, 214, 216, 218, and 220 of Method 210 (FIG. 13) are illustrated in FIG. 14. With reference to FIG. 13, the Method 210 includes communicating the public IP 58 address for the second network device 16 to the first network device 14 at Step 212. The trusted-third-party network device 30 has already determined that the terminating end of this tunneling association 26 is associated with the second network device 16 during the associating Step 106 of Method 100 (FIG. 4).

With reference to FIG. 14, the trusted-third-party network device 30 constructs a first IP 58 packet 232 with the public IP 58 address of the trusted-third-party network device 30 in the source address field 88 and the public IP 58 address of the first network device 14 in the destination address field 90. Included in the payload field 84 of the first IP 58 packet 232 is the public IP 58 address of the second network device 16 which the trusted-third-party network device 30 has associated with the unique identifier for the terminating end of the tunneling association. Also included in the payload field 84 of the first IP 58 packet 232 is an identifier for the tunneling association, e.g. the unique identifier from the requesting Step 102 or the informing Step 104 of Method 100 (FIG. 4). The first IP 58 packet 232 is sent to the first network device 14 on the public network 12. The first network device 14 receives the first IP 58 packet 232, examines the payload 84, and determines that it includes the public IP 58 address of the second network device 16 that is associated with the unique identifier it had sent in the informing Step 104 of Method 100 (FIG. 4). The first IP 58 packet 232 may require encryption or authentication to ensure that the public IP 58 address of the second network device 16 cannot be read on the public network 12.

The first private IP 58 address is selected from a first pool of private IP 58 addresses on the first network device 14 at Step 214. Once selected, the first private IP 58 address is removed from the first pool so that it cannot be selected for other tunneling associations through the first 14 or second 16 network device. The first pool includes private IP 58 addresses that have not been assigned to originating or terminating ends of tunneling associations through the first network device 14. The selected first private IP 58 address is assigned to the originating end of the tunneling association 24 on the first network device 14. The assignment of the private IP 58 addresses on the first 14 and second 16 network devices is discussed below.

At Step 216, the first private IP 58 address is communicated from the first network device 14 to the second network device 16 through the public network 12. With reference to FIG. 14, the first network device 14 constructs a second IP 58 packet 234 including the public IP 58 address of the first network device 14 in the source address field 88 and the public IP 58 address of the second network device 16 in the destination address field 90. Included in the payload field 84 of the second IP 58 packet 234 is the first private IP 58 address. The second IP 58 packet 234 is sent to the second network device 16 on the public network 12. The second network device 16 receives the second IP 58 packet 234, examines the payload 84, and determines that it includes the first private IP 58 address that has been assigned to the originating end of the tunneling association 24.

The second private IP 58 address is selected from a second pool of private IP 58 addresses on the second network device 16 at Step 218. The second private IP 58 address is selected to be a different address than the first private IP 58 address that was received on the second network device 16 in the second IP 58 packet 234. Once selected, the first and second private IP 58 addresses are removed from the second pool so that they cannot be selected for other tunneling associations through the first 14 or second 16 network device. The second pool includes private IP 58 addresses that have not been assigned to originating or terminating ends of tunneling associations through the second network device 14. The selected second private IP 58 address is assigned to the terminating end of the tunneling association 26 on the second network device 16. The assignment of the private IP 58 addresses is discussed below.

At Step 220, the second private IP 58 address is communicated from the second network device 16 to the first network device 14 through the public network 12. The second network device 16 constructs a third IP 58 packet 236 including the public IP 58 address of the second network device 16 in the source address field 88 and the public IP 58 address of the first network device 14 in the destination address field 90. Included in the payload field 84 of the third IP 58 packet 236 is the second private IP 58 address. Also included in the payload field 84 of the third IP 58 packet 236 is an identifier for the tunneling association. For example, the identifier may be the first private IP 58 address, or the unique identifier from the requesting Step 102 or the informing Step 104 of Method 100 (FIG. 4). The third IP 58 packet 236 is sent to the first network device 14 on the public network 12. The first network device 14 receives the third IP 58 packet 236, examines the payload 84, and determines that it includes the second private IP 58 address that has been assigned to the terminating end of the tunneling association 26.

The first 232, second 234, and third 236, IP 58 packets may also include indicators that the contents of the payload fields 84 are associated with higher layers of the protocol stacks 50 for the first 14, second 16, and trusted-third-party 30 network devices. In one exemplary preferred embodiment, the higher layers of the protocol stacks 50 are application layers. The contents of the payload fields 84 are received and decapsulated in lower layers of the protocol stacks 50, such as the IP 58 layers, passed up to the application layers of the protocol stacks 50, and examined in the application layers. For example, payloads are passed up from lower layers and the indicators direct the higher layers to examine the payloads. Additionally, the contents of the payload fields 84 can be constructed in the higher layers of the protocol stacks 50 which pass them down to the lower layers of the protocol stacks 50 for encapsulation and transmission on lower layers of the protocol stacks 50.

Following Method 210, the first network device 14 has obtained the public IP 58 address of the second network device 16, the first private IP 58 address, and the second private IP 58 address. Additionally, the second network device 16 has obtained the public IP 58 address of the first network device 14, the first private IP 58 address, and the second private IP 58 address. Both first 14 and second 16 network devices have obtained the private IP 58 addresses of the originating end of the tunneling association 24 that requested the initiation of the tunneling association and the terminating end of the tunneling association 26 that was associated with the unique identifier. It should be understood that the message flow 210 may include more or fewer messages and that the steps of Method 210 and the message flow 230 may occur in a different order. The present invention is not restricted to the order of the message flow illustrated in FIG. 14.

Figure 15:
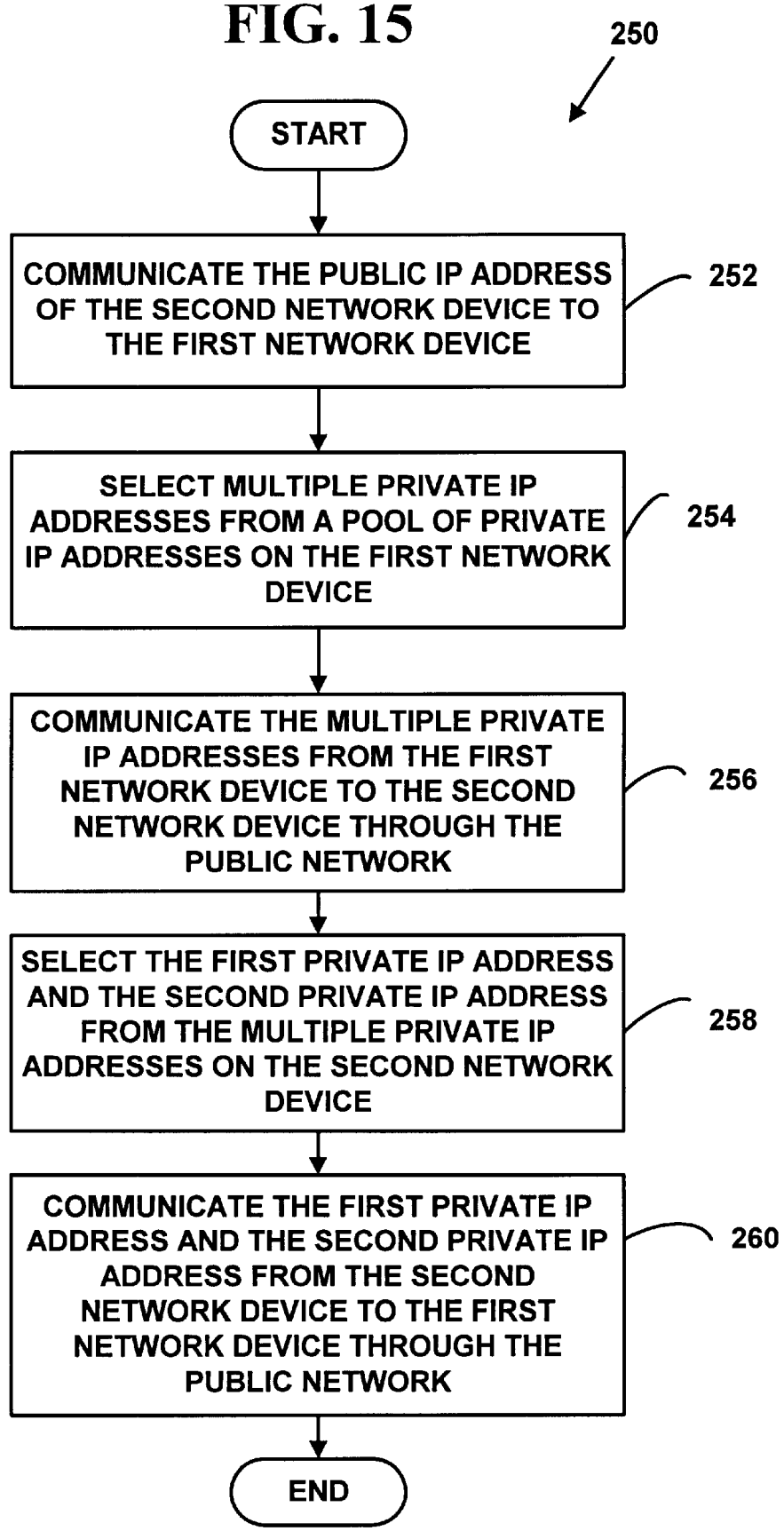
FIG. 15 is a flow diagram illustrating a method for negotiating private Internet Protocol addresses.
Figure 16:
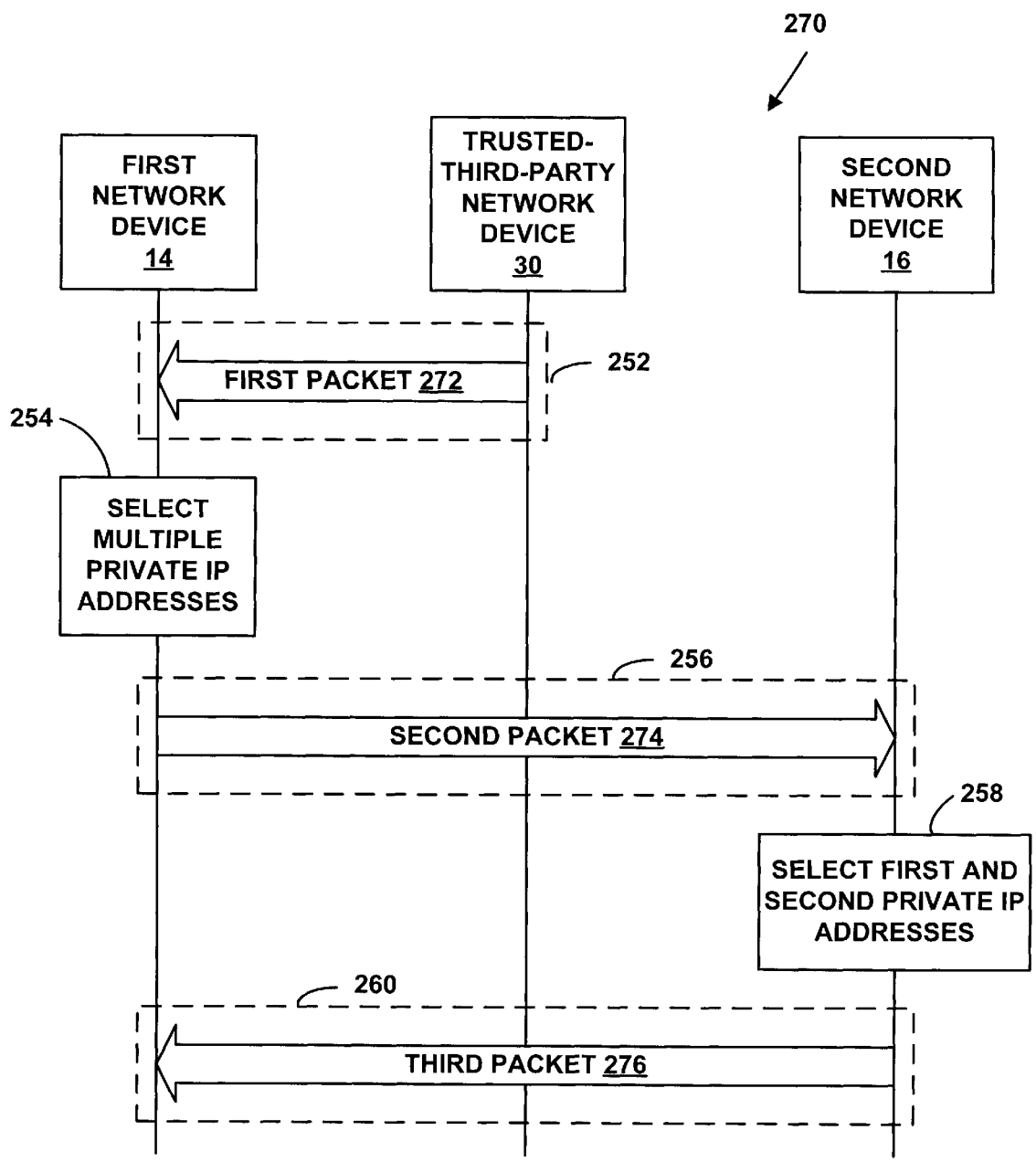
FIG. 16 is a block diagram illustrating the message flow of the method illustrated in FIG. 15.

Referring back to FIG. 10, the Method 170 for negotiating private network addresses selected the first and second private network addresses from multiple private addresses on the second network device 16. The multiple private addresses were selected from a pool on the first network device 14. In yet another exemplary preferred embodiment of the present invention, the private network addresses are private IP 58 addresses and the communication between the first, second, and trusted-third-party network devices are IP 58 messages. FIG. 15 is a flow diagram illustrating another Method 250 of negotiating private IP addresses. FIG. 16 is a block diagram illustrating a message flow 270 of the Method 250 illustrated in FIG. 15. Method Steps 252, 254, 256, 258, and 260 of Method 250 (FIG. 15) are illustrated in FIG. 16. With reference to FIG. 15, the Method 250 includes communicating the public IP 58 address for the second network device 16 to the first network device 14 at Step 252. The trusted-third-party network device 30 has already determined that the terminating end of this tunneling association 26 is associated with the second network device 16 during the associating Step 106 of Method 100 (FIG. 4).

With reference to FIG. 16, the trusted-third-party network device 30 constructs a first IP 58 packet 272 with the public IP 58 address of the trusted-third-party network device 30 in the source address field 88 and the public IP 58 address of the first network device 14 in the destination address field 90. Included in the payload field 84 of the first IP 58 packet 272 is the public IP 58 address of the second network device 16 which the trusted-third-party network device 30 has associated with the unique identifier for the terminating end of the tunneling association. Also included in the payload field 84 of the first IP 58 packet 272 is an identifier for the tunneling association, e.g. the unique identifier from the requesting Step 102 or the informing Step 104 of Method 100 (FIG. 4). The first IP 58 packet 272 is sent to the first network device 14 on the public network 12. The first network device 14 receives the first IP 58 packet 272, examines the payload 84, and determines that it includes the public 1P 58 address of the second network device 16 that is associated with the unique identifier it had sent in the request to initiate the tunneling association. The first IP 58 packet 272 may require encryption or authentication to ensure that the public IP 58 address of the second network device 16 cannot be read on the public network 12.

Multiple private IP 58 addresses are selected from a pool of private IP 58 addresses on the first network device 14 at Step 254. The pool includes private IP 58 addresses that have not been assigned to originating or terminating ends of tunneling associations through the first network device 14.

At Step 256, the multiple private IP 58 addresses are communicated from the first network device 14 to the second network device 16 through the public network 12.

With reference to FIG. 16, the first network device 14 constructs a second IP 58 packet 274 including the public IP 58 address of the first network device 14 in the source address field 88 and the public IP 58 address of the second network device 16 in the destination address field 90. Included in the payload field 84 of the second IP 58 packet 274 are the multiple private IP 58 addresses. The second IP 58 packet 274 is sent to the second network device 16 on the public network 12. The second network device 16 receives the second IP 58 packet 274, examines the payload 84, and determines that it includes the multiple private IP 58 addresses.

The first and second private IP 58 addresses are selected from the multiple private IP 58 addresses on the second network device 16 at Step 258. The second private IP 58 address is selected to be a different address than the first private IP 58 address. Once selected, the first and second private IP 58 addresses are removed from any private address pool on the second network device 16 so that they cannot be selected for other tunneling associations through the first 14 or second 16 network device. The pool on the second network device 16 may include private IP 58 addresses that have not been assigned to originating or terminating ends of tunneling associations through the second network device 14. The selected second private IP 58 address is assigned to the terminating end of the tunneling association 26 on the second network device 16. The assignment of the private IP 58 addresses is discussed below.

At Step 260, the first and second private IP 58 addresses are communicated from the second network device 16 to the first network device 14 through the public network 12. The second network device 16 constructs a third IP 58 packet 276 including the public IP 58 address of the second network device 16 in the source address field 88 and the public IP 58 address of the first network device 14 in the destination address field 90. Included in the payload field 84 of the third IP 58 packet 276 are the first and second private IP 58 addresses. Also included in the payload field 84 of the third IP 58 packet 276 is an identifier for the tunneling association. For example, the identifier may be the first or second private IP 58 address, or the unique identifier from the requesting Step 102 or the informing Step 104 of Method 100 (FIG. 4). The third IP 58 packet 276 is sent to the first network device 14 on the public network 12. The first network device 14 receives the third IP 58 packet 276, examines the payload 84, and determines that it the first and second private IP 58 addresses, the second of which has been assigned to the terminating end of the tunneling association 26.

The first 272, second 274, and third 276, IP 58 packets may also include indicators that the contents of the payload fields 84 are associated with higher layers of the protocol stacks 50 for the first 14, second 16, and trusted-third-party 30 network devices. In one exemplary preferred embodiment, the higher layers of the protocol stacks 50 are application layers. The contents of the payload fields 84 are received and decapsulated in lower layers of the protocol stacks 50, such as the IP 58 layers, passed up to the application layers of the protocol stacks 50, and examined in the application layers. For example, payloads are passed up from lower layers and the indicators direct the higher layers to examine the payloads. Additionally, the contents of the payload fields 84 can be constructed in the higher layers of the protocol stacks 50 which pass them down to the lower layers of the protocol stacks 50 for encapsulation and transmission on lower layers of the protocol stacks 50.

Following Method 250, the first network device 14 has obtained the public IP 58 address of the second network device 16, the first private IP 58 address, and the second private IP 58 address. Additionally, the second network device 16 has obtained the public IP 58 address of the first network device 14, the first private IP 58 address, and the second private IP 58 address. Both first 14 and second 16 network devices have obtained the private IP 58 addresses of the originating end of the tunneling association 24 that requested the initiation of the tunneling association and the terminating end of the tunneling association 26 that was associated with the unique identifier. It should be understood that the message flow 270 may include more or fewer messages and that the steps of Method 250 and the message flow 270 may occur in a different order. The present invention is not restricted to the order of the message flow illustrated in FIG. 16.

Exemplary Network Address Tables in the Application Layers

Following the above methods, the first network device 14 has the following network addresses: the public network address of the second network device 16, and the private network addresses assigned to the originating 24 and terminating 26 ends of the tunneling association. Similarly, the second network device 16 has the following network addresses: the public network address of the first network device 14, and the private network addresses assigned to the originating 24 and terminating 26 ends of the tunneling association.

The assignment of private network addresses to the ends of the tunneling association may also include transmitting the private network addresses to the network devices at the ends of the tunneling association where the private network addresses are stored on these end devices. For example, the originating network device 24 may store the private network addresses for the originating and terminating ends of the tunneling association on the originating network device 24. In this manner, any packet sent from the originating network device 24 to the first network device 14 may include the private network addresses of the originating and terminating ends of the tunneling association. Similarly, any packet sent from the terminating network device 26 to the second network device 16 may include the private network addresses of the originating and terminating ends of the tunneling association.

The network addresses are stored in network address tables respectively associated with the first 14 and second 16 network devices. The assignment of private network addresses to the ends of the tunneling association on the network devices, referred to above, includes the recording of the private network addresses in the network address tables. These network address tables allow for the translation from the private network addresses to the public network addresses. For example, the transmission of a packet from the originating network device 24 to the terminating network device 26, without revealing the identity of either end on the public network 12, requires that the packet is received on the first network device 14. The first network device 14 recognizes that the packet has come from the originating network device 24 and is destined for the terminating network device 26 by determining that the packet includes a private network address for the terminating network device 26. The first network device 14 examines the entry in its network address table that contains the private network address for the terminating network device 26 and determines that this private network address is associated with the public network address for the second network device 16. In this manner, the first network device 14 knows where to route the packet on the public network 12 by translating the private network address for the terminating network device 26 to the public network address for the second network device 16.

Additionally, the network address tables may allow for the translation from the private network addresses to forwarding network addresses. The forwarding network addresses are typically local area network addresses used for the routing of packets from the network devices to the ends of the tunneling association. In one exemplary preferred embodiment of the present invention, the forwarding network addresses are the MAC 54 addresses for the originating 24 and terminating 26 network devices. For example, the second network device 16 receives a packet from the public network 12 and recognizes it, from an indicator included in the packet or otherwise, that the payload should be passed up to a higher layer of the protocol stack 50 for examination. Upon examination, the second network device 16 recognizes that the packet is destined for the terminating end of the tunneling association 26 by determining that the packet includes the private network address for the terminating end 26. The second network device 16 examines the entry in its network address table that contains the private network address for the terminating end 26 and determines that this private network address is associated with the MAC 54 address for the terminating network device 26. In this manner, the second network device 16 knows where to route the packet on the local physical network by translating the private network address for the terminating end 26 to the physical network address for the terminating network device 26.

Figure 17:
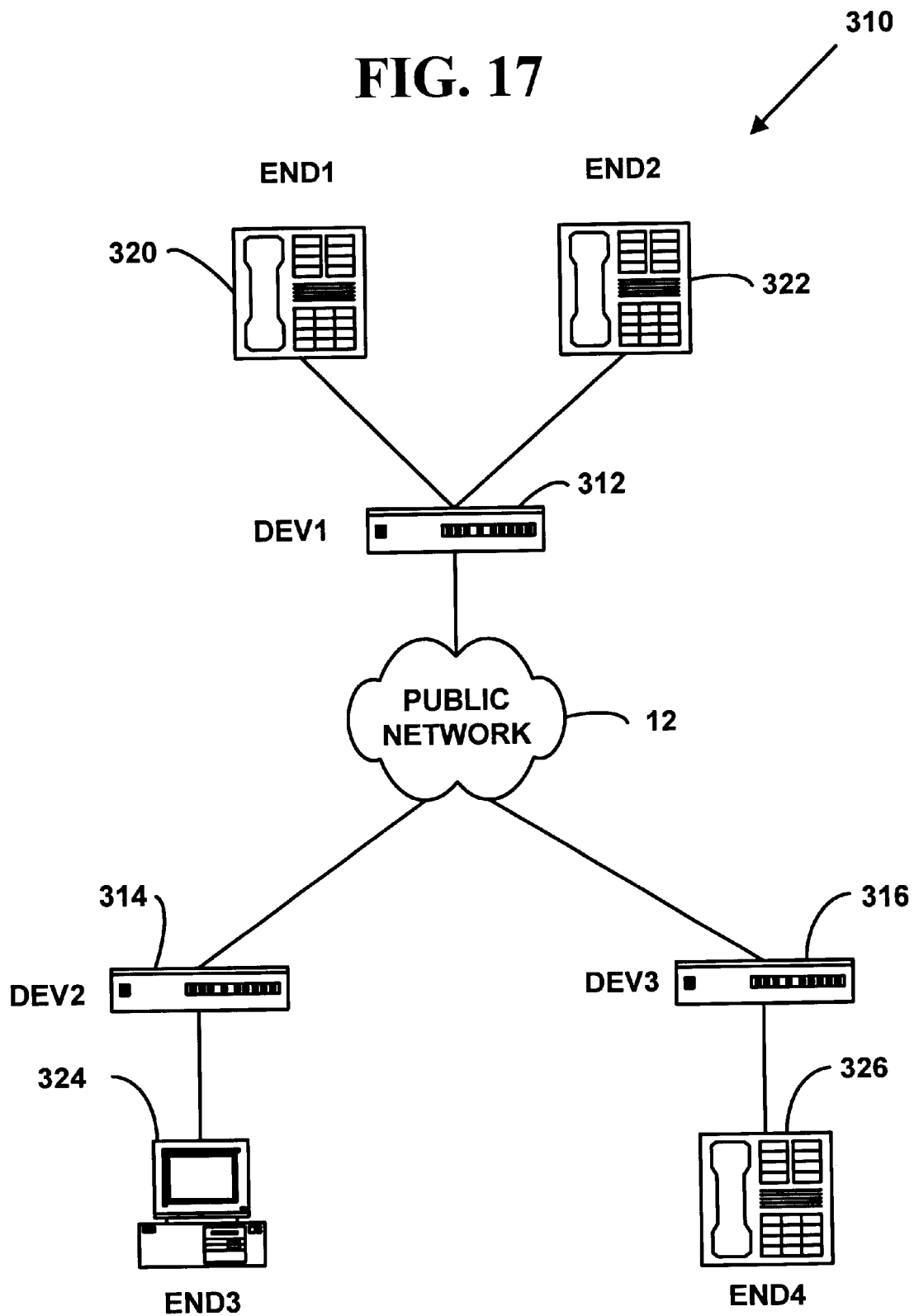
FIG. 17 is a block diagram illustrating a configuration of network devices.

Examples of network address tables can be made with reference to FIG. 17. FIG. 17 illustrates an exemplary configuration 310 of network devices. In this exemplary configuration, edge devices DEV1 312, DEV2 314, and DEV3 316 are connected to public network 12. End devices END1 320 and END2 322 are connected to edge device DEV1 312. End device END3 324 is connected to edge device DEV2 314. End device END4 326 is connected to edge device DEV3 316. Examples of the public IP 58 addresses for the edge devices are presented in Table 1.

TABLE 1

| Edge device | Public IP 58 address |
| --- | --- |
| DEV1 312 | 217.164.193.87 |
| DEV3 314 | 135.232.86.143 |
| DEV3 316 | 102.46.198.222 |

These public IP 58 addresses are globally routable through the public network 12. The end devices have MAC 54 addresses that are unique to the hardware on each end device. Examples of the MAC 54 addresses of the end devices are presented in Table 2.

TABLE 2

| End device | MAC 54 address |
| --- | --- |
| END1 320 | 00:b1:44:a2:10:03 |
| END2 322 | 00:c0:50:4c:29:17 |
| END3 324 | 00:40:2c:03:98:05 |
| END4 326 | 00:c2:7b:6e:11:5b |

As an example of a media flow, we suppose that END1 320 has established a tunneling association with END3 324 through edge devices DEV1 312 and DEV2 314, and that END2 322 has established a tunneling association with END4 326 through edge devices DEV1 312 and DEV3 316. The tunneling associations have been initiated by the Method 100 (FIG. 4) described above. Examples of the private IP 58 addresses that have been assigned to the ends of each tunneling association are presented in Table 3.

TABLE 3

| End device | Private IP 58 address |
| --- | --- |
| END1 320 | 10.0.189.23 |
| END2 322 | 10.0.189.156 |
| END3 324 | 10.0.45.63 |
| END4 326 | 10.0.196.104 |

The entries in the network address tables for each edge device associate the private addresses, the public network addresses, and the forwarding (MAC 54) addresses. For example, the network address table on edge device DEV1 312 is illustrated in Table 4a.

TABLE 4a

| MAC 54 address | First private IP 58 address | Second private IP 58 address | Public IP 58 Address |
| --- | --- | --- | --- |
| 00:b1:44:a2:10:03 [END1] | 10.0.189.23 [END1] | 10.0.45.63 [END3] | 135.232.86.143 [DEV2] |
| 00:c0:50:4c:29:17 [END2] | 10.0.189.156 [END2] | 10.0.196.104 [END4] | 102.46.198.222 [DEV3] |

The first entry in the network address table for DEV1 312 associates the MAC 54 address and the private IP 58 address for END1 320 with the private IP 58 address for END3 324 and the public IP 58 address for DEV2 314 at the other end of the END1/END3 tunneling association. The first private IP 58 address column records the private IP 58 addresses of the end devices that are associated with this edge device. In this case, the end devices are END1 320 and END2 322 that are associated with the edge device DEV1 312. The second private IP 58 address column records the private IP 58 addresses that are assigned to the end devices at the other ends of the tunneling associations.

An outgoing message from END1 320 is associated with the private IP 58 address for END1 320 at the transmitting end of the tunneling association between END1 320 and END3 324. The network address table associates this private IP 58 address with the private IP 58 address for END3 324 at the receiving end of this tunneling association. Moreover, in the same entry, the network address table associates the tunneling association END1/END3 with the public IP 58 address of the edge device DEV2 314 that is associated with END3 324. In this manner packets from END1 320 are routed on the public network 12 to DEV2 314. At the receiving end of this tunneling association, the network address table on DEV2 314 routes the packet to END3 324. For example, the network address table on DEV2 314 is illustrated in Table 4b.

TABLE 4b

| MAC 54 address | First private IP 58 address | Second private IP 58 address | Public IP 58 Address |
| --- | --- | --- | --- |
| 00:40:2c:03:98:05 [END3] | 10.0.45.63 [END3] | 10.0.189.23 [END1] | 217.164.193.87 [DEV1] |

The entry in the network address table associates the MAC 54 address and the private IP 58 address for END3 324 with the private IP 58 address for END1 320 and the public IP 58 address for DEV1 312 at the other end of the END1/END3 tunneling association. The incoming packet is received on DEV2 314 and passed up to the higher layer, e.g. the application layer, for examination. DEV2 314 recognizes that the private IP 58 address for END3 324 is recorded in its network address table (Table 4b) and is associated with the MAC 54 address for END3 324. In this manner packets received from the public network 12 are routed to END3 324.

Similarly, the network address table on DEV3 316 is illustrated in Table 4c.

TABLE 4c

| MAC 54 address | First private IP 58 address | Second private IP 58 address | Public IP 58 Address |
|---|---|---|---|
| 00:c2:7b:6e:11:5b [END4] | 10.0.196.104 [END4] | 10.0.189.156 [END2] | 217.164.193.87 [DEV1] |

The entry in the network address table associates the MAC 54 address and the private IP 58 address for END4 326 with the private IP 58 address for END2 322 and the public IP 58 address for DEV1 312 at the other end of the END2/END4 tunneling association.

An outgoing message from END4 326 is associated with the private IP 58 address for END4 326 at the transmitting end of the tunneling association between END2 322 and END4 326. The network address table (Table 4c) associates this private IP 58 address with the private IP 58 address for END2 322 at the receiving end of this tunneling association. Moreover, in the same entry, the network address table associates the tunneling association END2/END4 with the public IP 58 address of the edge device DEV1 312 that is associated with END2 322. In this manner packets from END4 326 are routed on the public network 12 to DEV1 312. At the receiving end of this tunneling association, the network address table (Table 4a) on DEV1 312 routes the packet to END2 322. The incoming packet is received on DEV1 312 and passed up to the higher layer, e.g. the application layer, for examination. DEV1 312 recognizes that the private IP 58 address for END2 322 is recorded in its network address table (the second entry in Table 4a) and is associated with the MAC 54 address for END2 322. In this manner packets received from the public network 12 are routed to END2 322.

The entries in the network address tables, however, need not be in the particular order depicted in the above illustrations and need not be stored is a tabular form as depicted in Tables 4a–4c. Other orderings of the entries and ways of associating each member of the entries may be possible. Moreover, the network address tables need not be maintained in the application layer of the protocol stack 50 for the network devices.

A Method of Processing a Media Flow

Figure 18A:
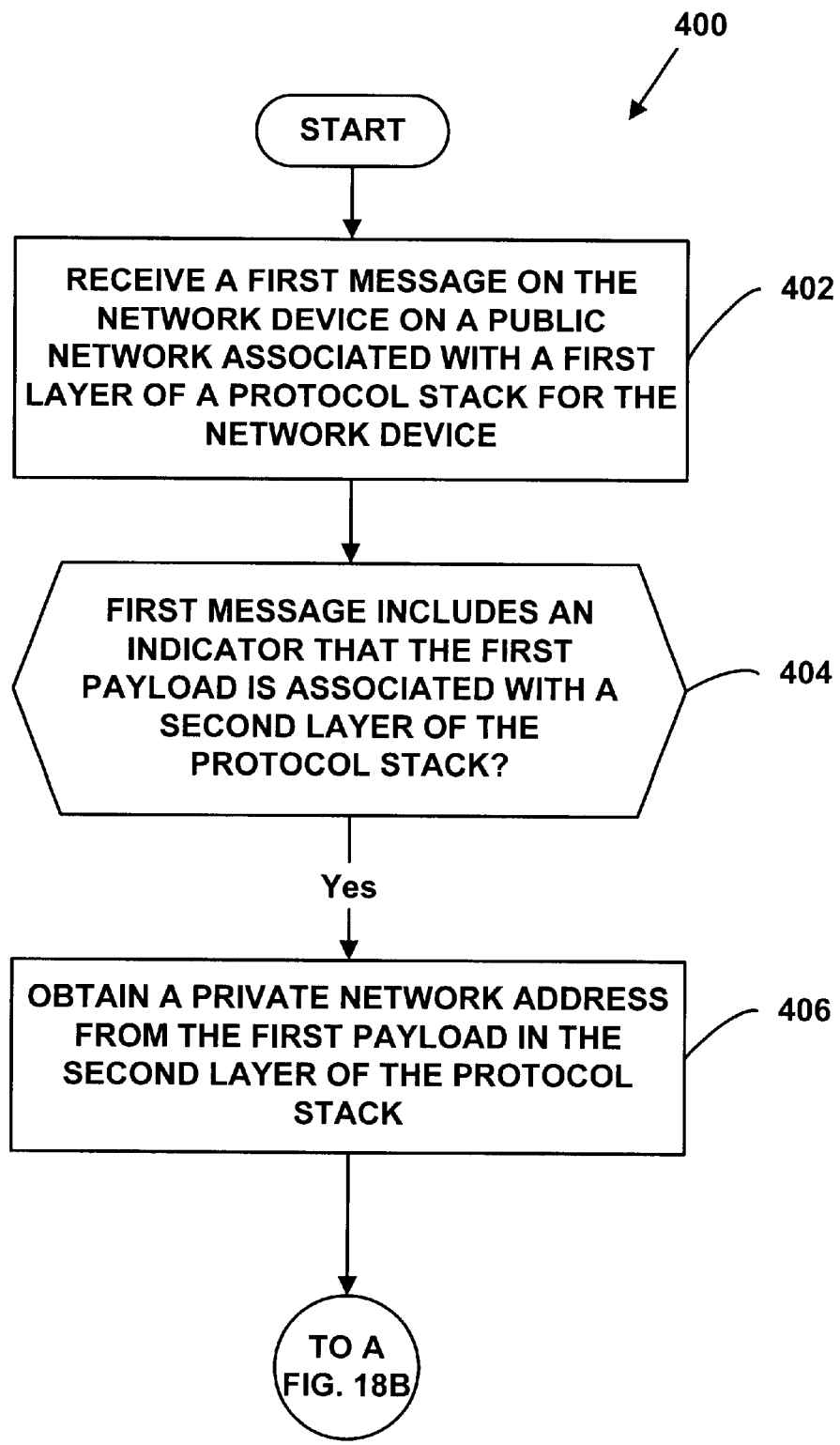
FIG. 18 is a flow diagram illustrating a method for processing a media flow at an end of a tunneling association.
Figure 18B:
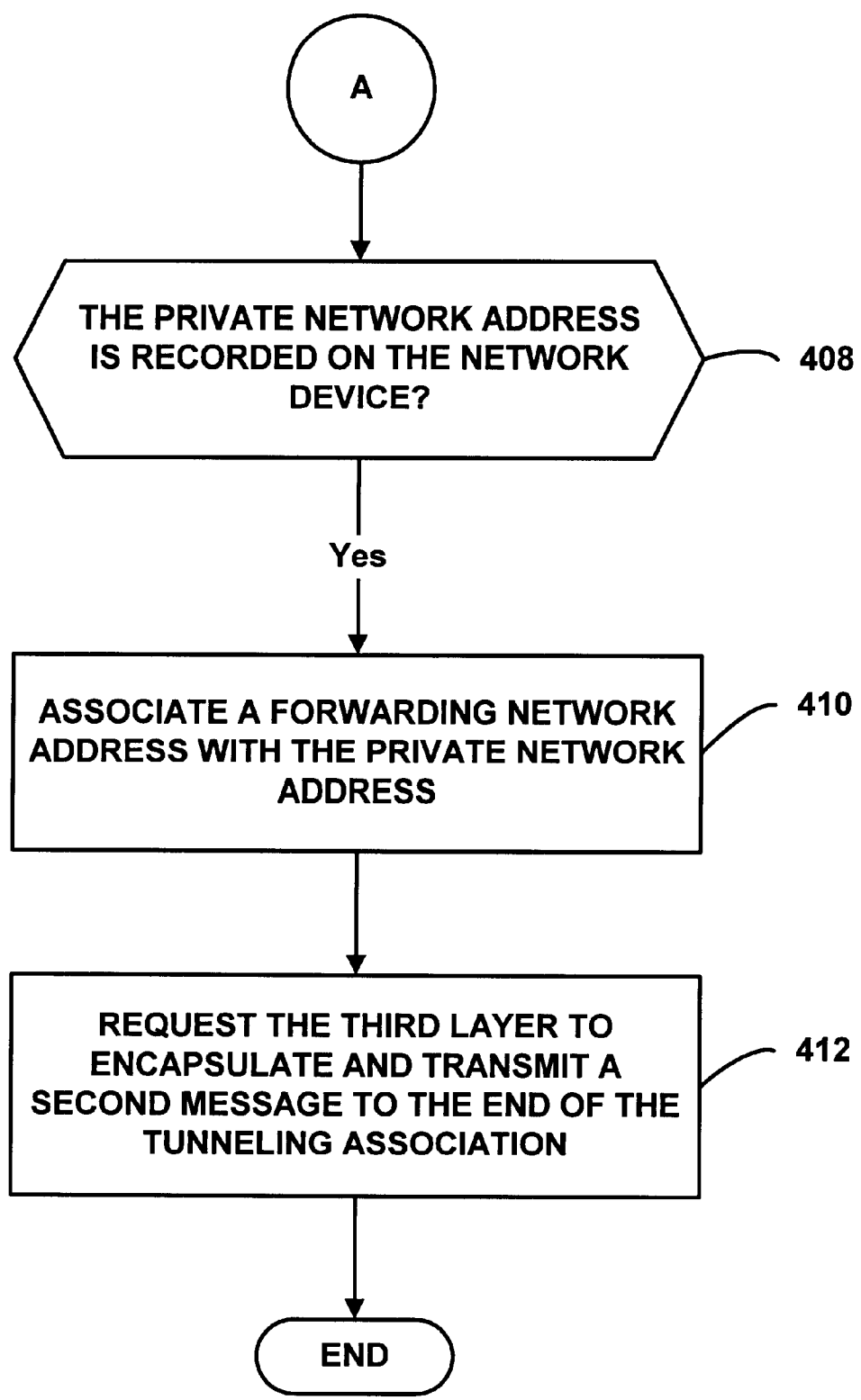

FIG. 18 is a flow diagram illustrating a Method 400 for processing a media flow at an end of a tunneling association through a network device. The network device is any of the first 14 or second 16 network devices. The Method 400 includes receiving a first message on the network device on a public network associated with a first layer of a protocol stack for the network device at Step 402. The first message includes a first payload. At Step 404 a determination is made as to whether the first message includes an indicator that the first payload is associated with a second layer of the protocol stack. In one exemplary preferred embodiment of the present invention, the first layer of the protocol stack for the network device is an IP 58 layer and the second layer of the protocol stack for the network device is the IP 58 layer. In another exemplary preferred embodiment of the present invention, the first layer of the protocol stack for the network device is an IP 58 layer and the second layer of the protocol stack for the network device is an application layer. However the first layer may be other than the IP 58 layer, the second layer may be other than the IP 58 or application layer, the protocol stack may be other than the OSI model of FIG. 2, and it should be understood that the present invention is not limited to these embodiments.

If the determination is made at Step 404 that the first payload includes an indicator that the first payload is associated with a second layer of the protocol stack, a private network address is obtained from the first payload in the second layer of the protocol stack at Step 406. The first payload includes the private network address and a second payload. In another exemplary preferred embodiment of the present invention, the private network address is a private IP 58 address. For example, the private IP 58 address may be the private IP 58 address associated with either the originating 24 or terminating 26 end of the tunneling association.

At Step 408, a determination is made as to whether the private network address is recorded on the network device. If this determination is positive, a forwarding network address is associated with the private network address at Step 410. The forwarding network address is associated with a third layer of the protocol stack and is associated with the end of the tunneling association. In yet another exemplary preferred embodiment of the present invention, the forwarding network address is a MAC 54 address and the third layer of the protocol stack is a MAC 54 layer. For example, the MAC 54 address may be the MAC 54 address associated with either the originating 24 or terminating 26 end of the tunneling association.

In yet another exemplary preferred embodiment of the present invention, the associating Step 410 includes searching a network address table on the network device for an entry containing the private network address and reading the forwarding network address from the entry. The private network address is recorded in the network address table and the entry includes the private network address and the forwarding network address. For example, the network address table may be in the form of the network address tables of Tables 4a, 4b, and 4c, and the private network address may be either of the first private IP 58 address or the second private IP 58 address of Tables 4a, 4b, or 4c. The network address table on the network device may have recorded the network addresses during the initiation of the tunneling association of Method 100 (FIG. 4) and associated them with the forwarding address.

At Step 412, the third layer is requested to encapsulate and transmit a second message to the end of the tunneling association. The second message includes the forwarding network address and the second payload. For example, the second layer of the protocol stack may submit a request instruction to an interface between the second layer and the third layer by methods known to those skilled in the art. The request passes the forwarding network address and the second payload to the third layer. In one exemplary preferred embodiment, the request also passes the private network address to the third layer. The third layer constructs the second message by encapsulating the second payload in a payload field for the second message and placing the forwarding network address in a destination address field for the second message.

Method 400 may result in a processing of a media flow through a tunneling association that hides the identity of the originating and terminating ends of the tunneling association from other users of the public network.

Exemplary Processing of a VoIP Flow

Figure 19A:
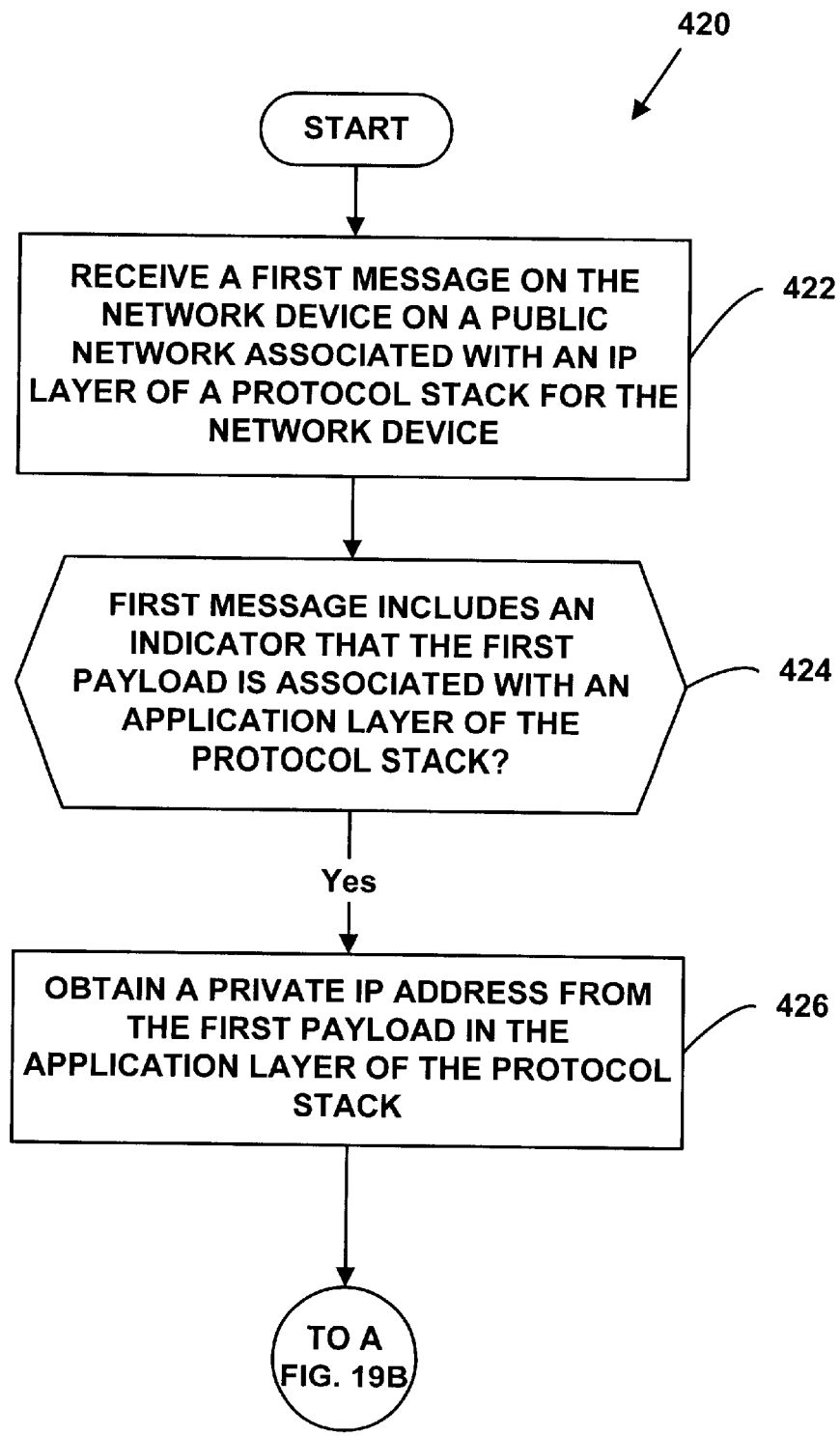
FIG. 19 is a flow diagram illustrating a method for processing a VoIP flow at an end of a tunneling association.
Figure 19B:
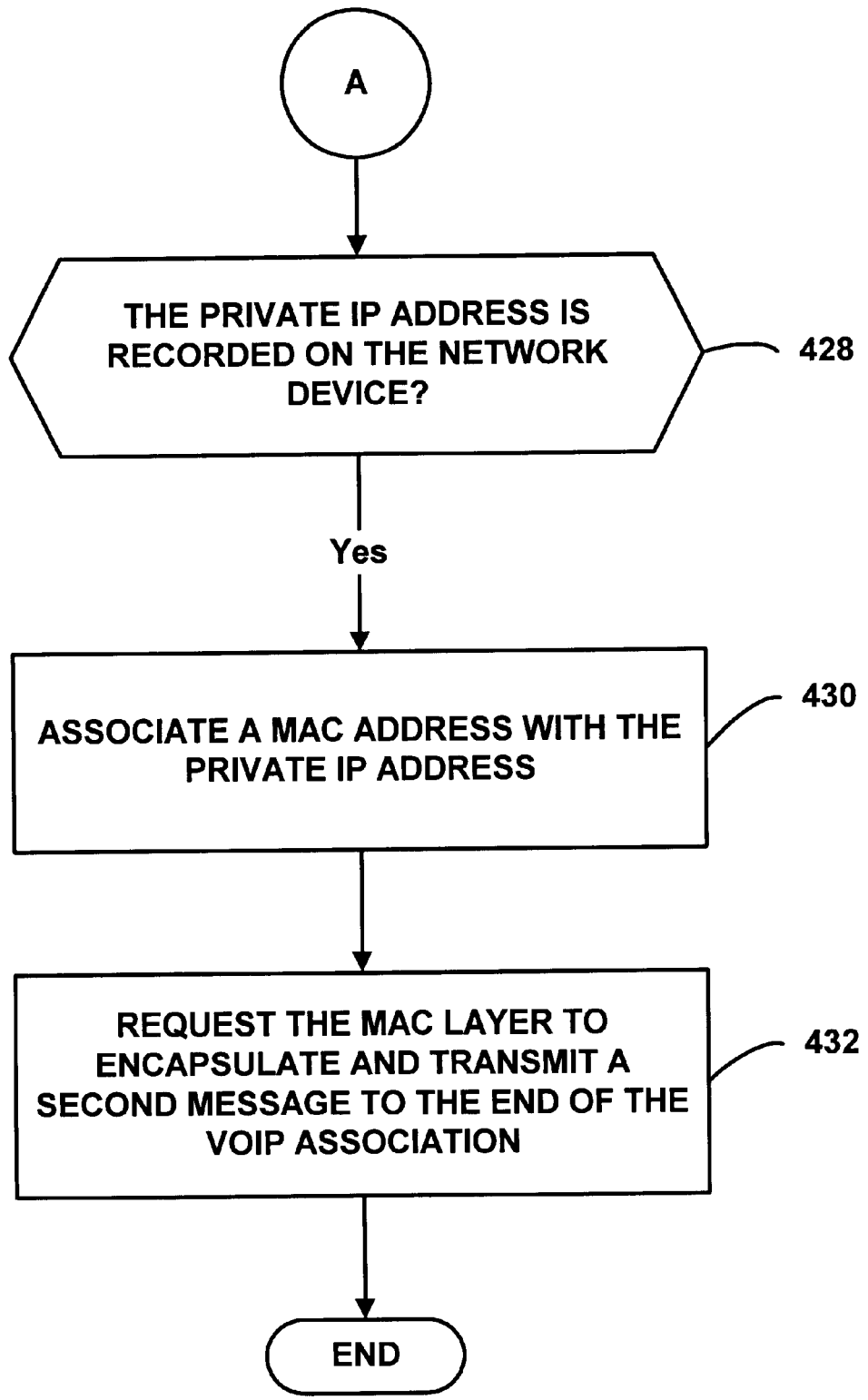
Figure 20:
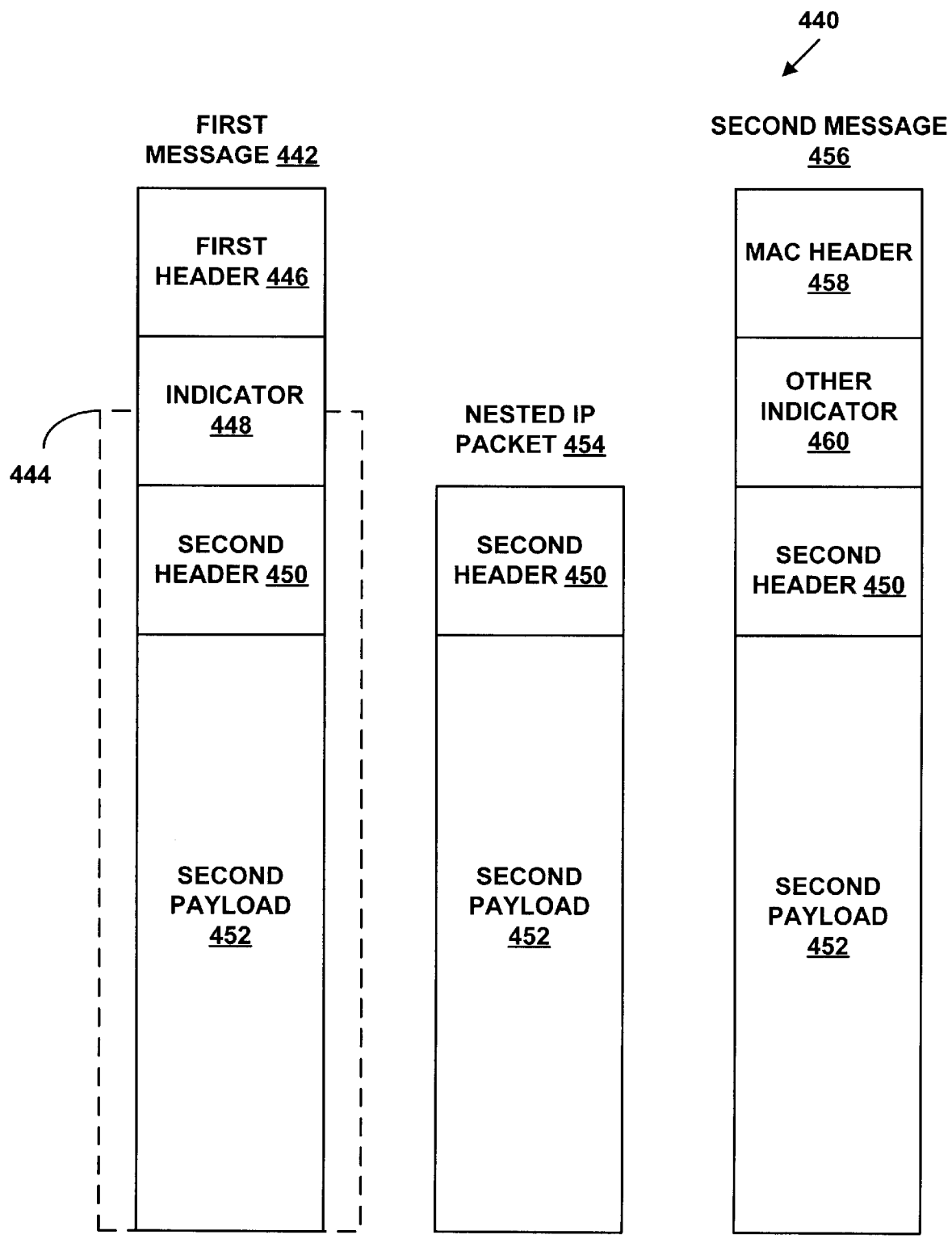
FIG. 20 is a block diagram illustrating a VoIP flow.

In yet another exemplary preferred embodiment of the present invention, the tunneling association is a VoIP association, the first layer is an IP 58 layer, the second layer is an application layer, the third layer is a MAC 54 layer, the private network address is a private IP 58 address, and the forwarding network address is a MAC 54 address. FIG. 19 is a flow diagram illustrating a Method 420 for processing a VoIP flow at an end of a VoIP association through a network device. FIG. 20 is a block diagram illustrating a VoIP flow 440 of the Method 420 illustrated in FIG. 19. With reference to FIG. 19 and FIG. 20, Method 420 includes receiving a first message 442 on the network device on a public network 12 associated with an IP 58 layer of a protocol stack 50 for the network device at Step 422. The first message 442 includes a first payload 444. For example, the first message 442 may have the form of an IP 58 packet 80 (FIG. 3). The first message 442 includes a first header 446 and the first payload 444. The public IP 58 address for the network device is in the destination address field 90 of the first header 446. The source address field 88 of the first header 446 may contain the public IP 58 address of another network device that sent the first message 442 to the network device on the public network 12.

At Step 424 it is determined whether the first message 442 includes an indicator 448 that the first payload 444 is associated with an application layer of the protocol stack 50. The IP 58 layer of the protocol stack 50 may strip the first header 446 off the first message 442 and pass the first payload 444 up to the application layer of the protocol stack 50 by way of the transport layer of the protocol stack 50. By methods known to those skilled in the art, the application layer may inspect the first payload 444 and determine whether the indicator 448 is present in the first payload 444. For example, the indicator 448 may be a distinctive sequence of bits in the first payload 444 that has been passed up from the IP 58 and transport layers. Alternatively, the indicator 448 may be included in the first header 446. For example, the indicator 448 may be included in the options field in the header end field 92 of an IP 58 packet 80. It should be understood that the indicator 448 may begin at any position in the first message 442 and that the present invention is not limited to the indicator 448 appearing after the first header 446.

If it is determined that the first message 442 includes such an indicator 448, a private IP 58 address is obtained from the first payload 444 in the application layer of the protocol stack 50 at Step 426 of Method 420. The first payload 444 includes the private IP 58 address and a second payload 452. For example, the first payload 444 may include a nested IP 58 packet 454 comprised of the second header 450 and the second payload 452. A VoIP application in the application layer has already recognized the presence of the indicator 448 at Step 424 and determines that this first payload 444 also contains the nested IP 58 packet 454. The VoIP application has the ability to process a datagram according to the IP 58 protocol. The advantage of running another IP 58 protocol in the application layer is that the format and the application code are already familiar to those skilled in the art. As the VoIP flow is inbound from the public network 12 to the end of the VoIP association, the network device is routing this VoIP flow to the destination. The VoIP application examines the nested IP packet 454 and extracts the private IP 58 address from the destination address field 90 of the second header 450. The private IP 58 address was assigned to the end of the VoIP association during initiation as described above. VoIP data destined to be processed by the end of the VoIP association is included in the second payload 452.

At Step 428, it is determined whether this private IP 58 address is recorded on the network device. For example, the VoIP application may search a network address table, such as those illustrated in Tables 4a to 4c, to determine whether the private IP 58 address is in an entry. In the illustrative table structure of the network address tables of Tables 4a to 4c, the application searches the column for the first private IP 58 address as this is the private IP 58 address for the end of the VoIP association that is associated with the network device. The application may also confirm that the private IP 58 address in the source address field 88 of the second header 450 agrees with the second private IP 58 address in the table entry as this is the private IP 58 address for the other end of the VoIP association.

If the private IP 58 address is contained in an entry, a MAC 54 address is associated with the private IP 58 address at Step 430. The MAC 54 address is associated with a MAC 54 layer of the protocol stack 50, and is associated with the end of the VoIP association. For example, the MAC 54 address may be read from the MAC 54 column for the above-mentioned entry in the network address table for the network device.

At Step 432 the MAC 54 layer is requested to encapsulate and transmit a second message 456 to the end of the VoIP association. The second message 456 includes the MAC 54 address and the second payload 452. For example, the VoIP application passes the nested IP 58 packet 454 or the second payload 452 down to the MAC 54 layer. The VoIP application also passes down the MAC 54 address of the end of the VoIP association. The MAC 54 layer constructs a MAC 54 packet with the MAC 54 address of the end of the VoIP association placed in a destination address field for the MAC 54 packet. Encapsulated in the MAC 54 packet of the second message 456 is the nested IP 58 packet 454 or the second payload 452.

The second header 450 may be included in the second message 456 when the end of the VoIP association has the capability of processing the nested IP 58 packets 454, e.g. if the end of the VoIP association has its own IP 58 layer. However, the end of the VoIP association may only have a MAC 54 layer, e.g. an Ethernet card, in which case the data that the end of the VoIP association needs to process is included in the second payload 452.

Additionally, the second message 456 may include another indicator 460 that the second message 456 encapsulates an IP 58 packet. For example, the other indicator 460 may be a distinctive sequence of bits in the MAC 54 header 458 or after the MAC 54 header 460. It should be understood that the other indicator 460 may begin at any position in the second message 456 and that the present invention is not limited to the other indicator 460 appearing after the MAC 54 header 458. The other indicator 460 may signal to the end of the VoIP association that the second message 456 is a VoIP message.

Figure 21A:
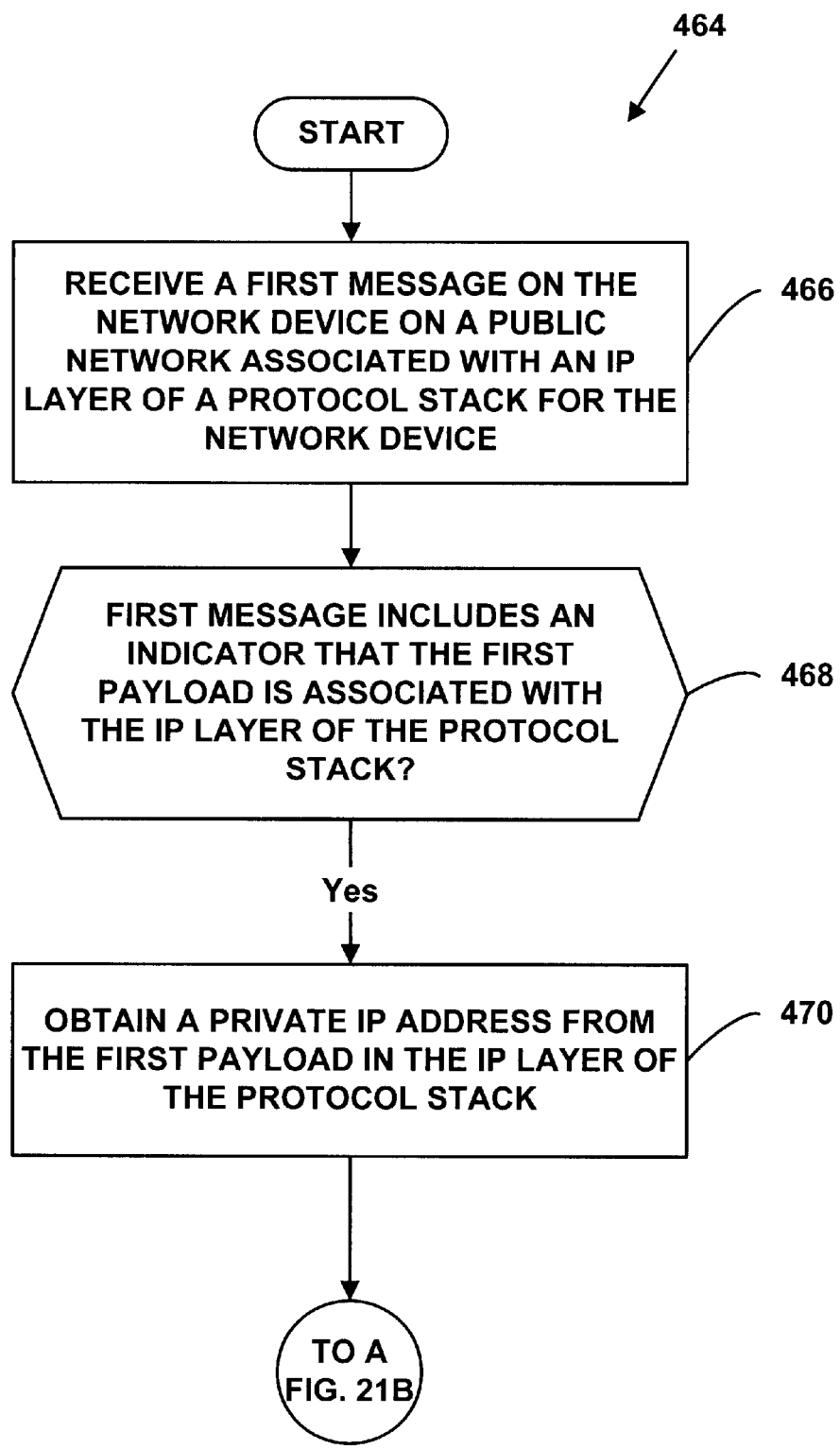
FIG. 21 is a flow diagram illustrating a method for processing a VoIP flow at an end of a tunneling association.
Figure 21B:
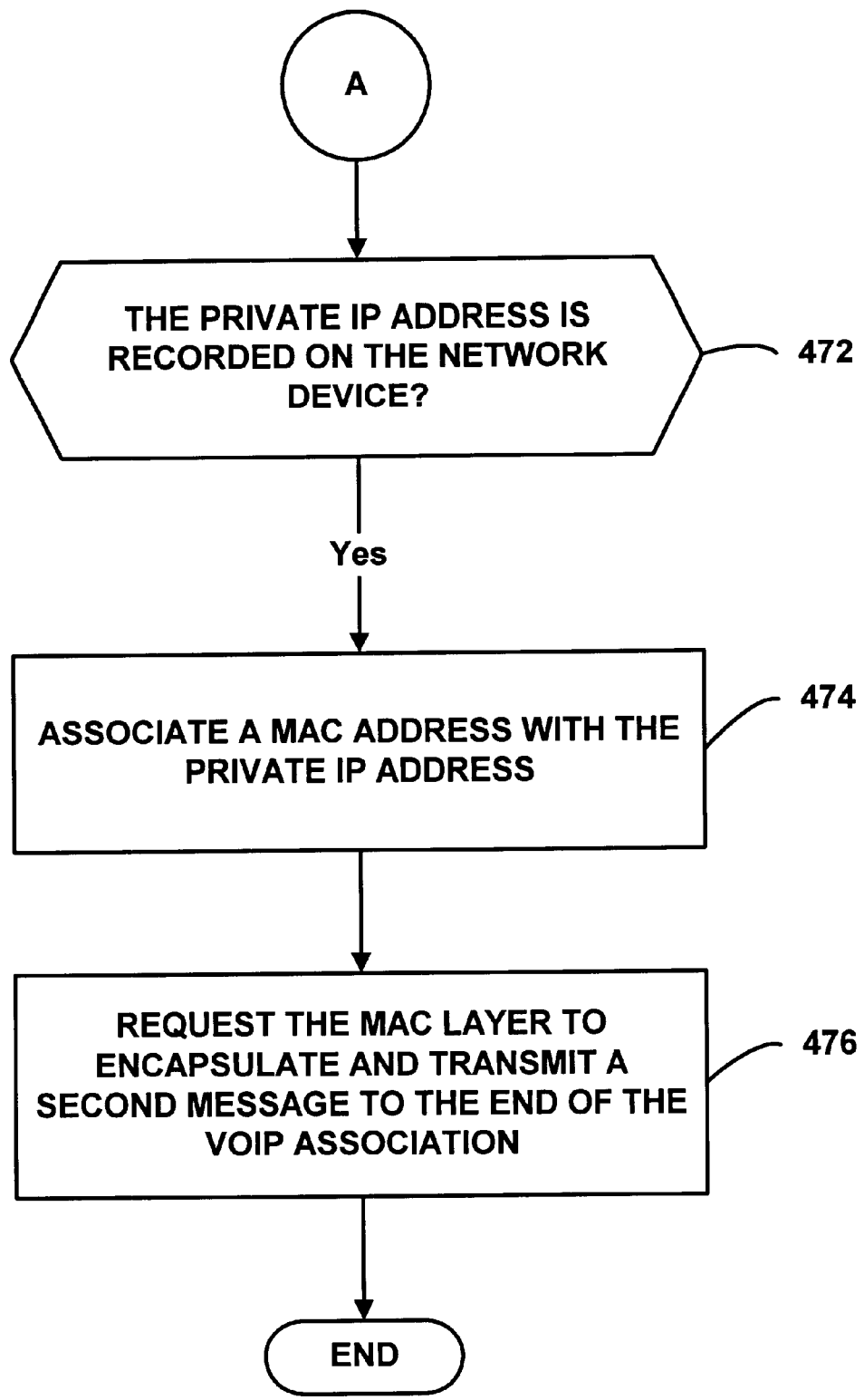

In yet another exemplary preferred embodiment of the present invention, the tunneling association is a VoIP association, the first layer is an IP 58 layer, the second layer is the IP 58 layer, the third layer is a MAC 54 layer, the private network address is a private IP 58 address, and the forwarding network address is a MAC 54 address. FIG. 21 is a flow diagram illustrating a Method 464 for processing a VoIP flow at an end of a VoIP association through a network device. With reference to FIG. 21 and the media flow of FIG. 20, Method 464 includes receiving a first message 442 on the network device on a public network 12 associated with an IP 58 layer of a protocol stack 50 for the network device at Step 466. The first message 442 includes a first payload 444. For example, the first message 442 may have the form of an IP 58 packet 80 (FIG. 3). The first message 442 includes a first header 446 and the first payload 444. The public IP 58 address for the network device is in the destination address field 90 of the first header 446. The source address field 88 of the first header 446 may contain the public IP 58 address of another network device that sent the first message 442 to the network device on the public network 12.

At Step 468 it is determined whether the first message 442 includes an indicator 448 that the first payload 444 is associated with the IP 58 layer of the protocol stack 50. The IP 58 layer of the protocol stack 50 may strip the first header 446 off the first message 442 and loop the first payload 444 back to the IP 58 layer of the protocol stack 50 for a second processing and stripping. By methods known to those skilled in the art, the IP 58 layer may inspect the first payload 444 and determine whether the indicator 448 is present in the first payload 444. For example, the indicator 448 may be a distinctive sequence of bits in the first payload 444 that is recognized by the IP 58 layer. Alternatively, the indicator 448 may be included in the first header 446. For example, the indicator 448 may be included in the options field in the header end field 92 of an IP 58 packet 80. It should be understood that the indicator 448 may begin at any position in the first message 442 and that the present invention is not limited to the indicator 448 appearing after the first header 446.

If it is determined that the first message 442 includes such an indicator 448, a private IP 58 address is obtained from the first payload 444 in the IP 58 layer of the protocol stack 50 at Step 470 of Method 464. The first payload 444 includes the private IP 58 address and a second payload 452. For example, the first payload 444 that is looped back to the IP 58 layer may be the nested IP 58 packet 454 comprised of the second header 450 and the second payload 452. The IP 58 layer has already recognized the presence of the indicator 448 at Step 466 and determines that this first payload 444 also contains the nested IP 58 packet 454. The IP 58 layer examines the nested IP packet 454 and extracts the private IP 58 address from the destination address field 90 of the second header 450. The private IP 58 address was assigned to the end of the VoIP association during initiation as described above. VoIP data destined to be processed by the end of the VoIP association is included in the second payload 452.

At Step 472, it is determined whether this private IP 58 address is recorded on the network device. For example, the IP 58 layer may initiate a search in a network address table, such as those illustrated in Tables 4a to 4c, to determine whether the private IP 58 address is in an entry. In the illustrative table structure of the network address tables of Tables 4a to 4c, the IP 58 layer initiates a search of the column for the first private IP 58 address as this is the private IP 58 address for the end of the VoIP association that is associated with the network device. The IP 58 layer may also initiate a confirmation that the private IP 58 address in the source address field 88 of the second header 450 agrees with the second private IP 58 address in the table entry as this is the private IP 58 address for the other end of the VoIP association.

If the private IP 58 address is contained in an entry, a MAC 54 address is associated with the private IP 58 address at Step 474. The MAC 54 address is associated with a MAC 54 layer of the protocol stack 50, and is associated with the end of the VoIP association. For example, the MAC 54 address may be read from the MAC 54 column for the above-mentioned entry in the network address table for the network device.

At Step 476 the MAC 54 layer is requested to encapsulate and transmit a second message 456 to the end of the VoIP association. The second message 456 includes the MAC 54 address and the second payload 452. For example, the IP 58 layer passes the nested IP 58 packet 454 or the second payload 452 down to the MAC 54 layer. It also passes down the MAC 54 address of the end of the VoIP association. The MAC 54 layer constructs a MAC 54 packet with the MAC 54 address of the end of the VoIP association placed in a destination address field for the MAC 54 packet. Encapsulated in the MAC 54 packet of the second message 456 is the nested IP 58 packet 454 or the second payload 452.

The second header 450 may be included in the second message 456 when the end of the VoIP association has the capability of processing the nested IP 58 packets 454, e.g. if the end of the VoIP association has its own IP 58 layer. However, the end of the VoIP association may only have a MAC 54 layer, e.g. an Ethernet card, in which case the data that the end of the VoIP association needs to process is included in the second payload 452.

Additionally, the second message 456 may include another indicator 460 that the second message 456 encapsulates an IP 58 packet. For example, the other indicator 460 may be a distinctive sequence of bits in the MAC 54 header 458 or after the MAC 54 header 460. It should be understood that the other indicator 460 may begin at any position in the second message 456 and that the present invention is not limited to the other indicator 460 appearing after the MAC 54 header 458. The other indicator 460 may signal to the end of the VoIP association that the second message 456 is a VoIP message.

Another Method of Processing a Media Flow

Figure 22A:
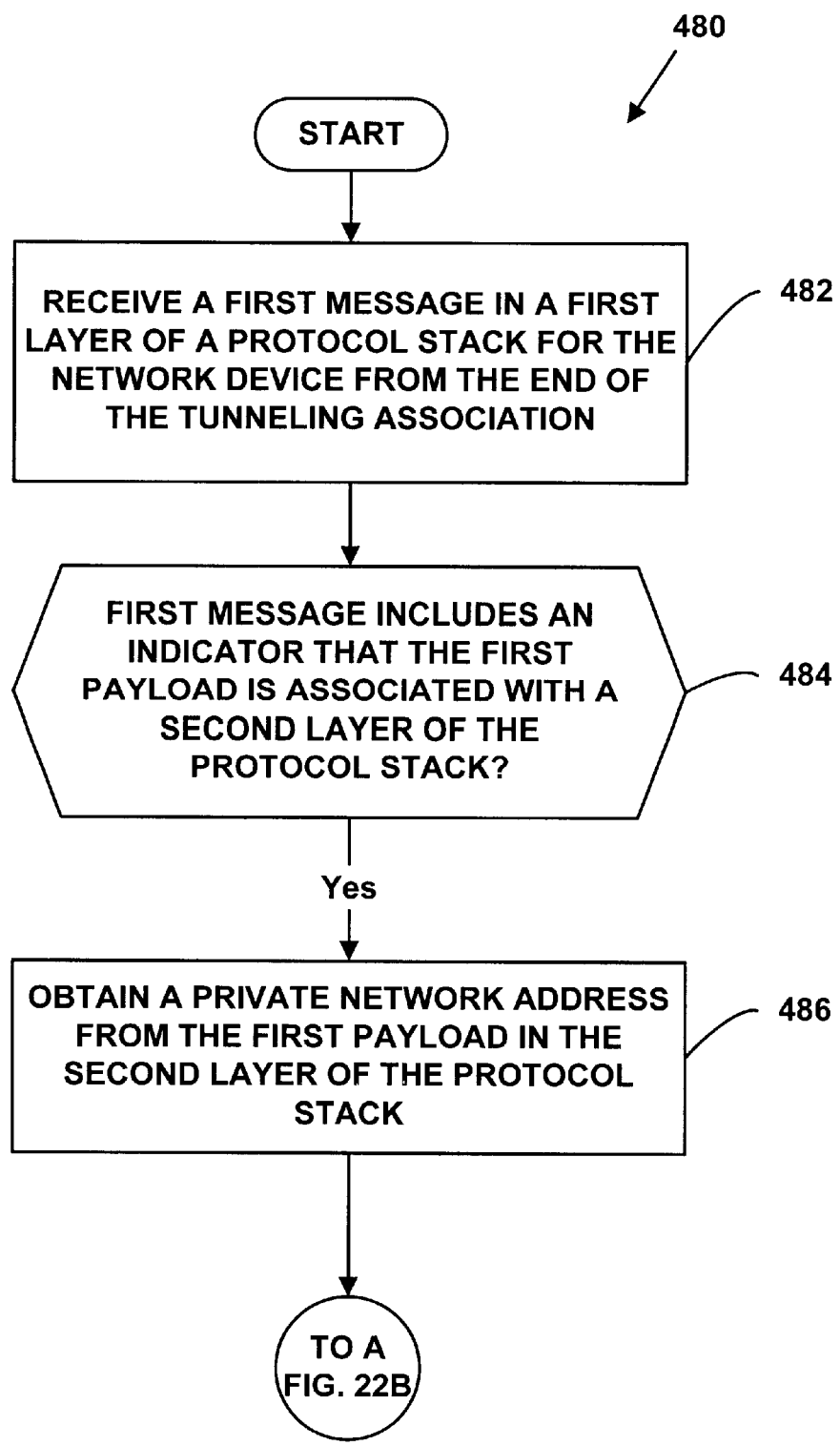
FIG. 22 is a flow diagram illustrating a method for processing a media flow at an end of a tunneling association.
Figure 22B:
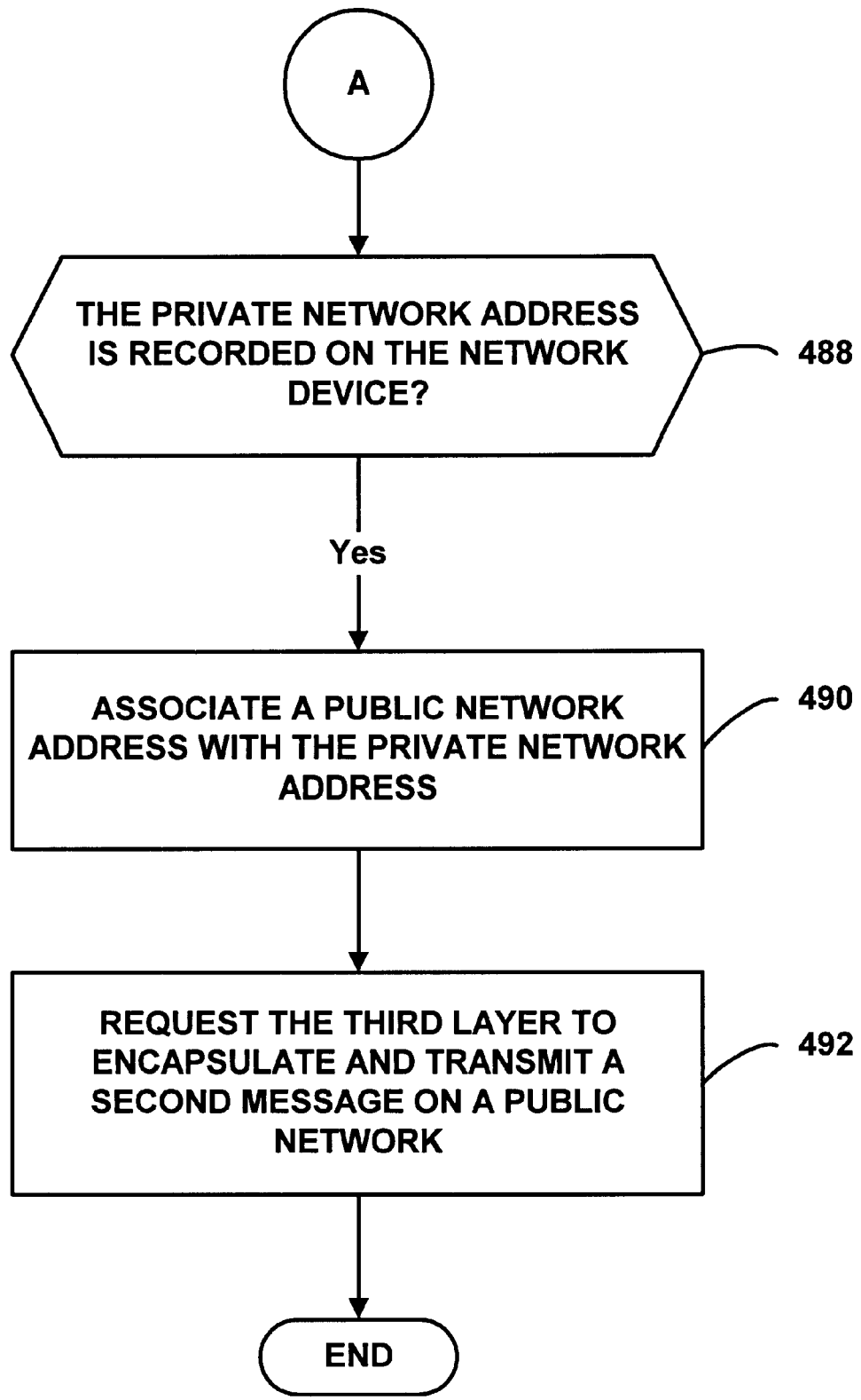

FIG. 22 is a flow diagram illustrating a Method 480 for processing a media flow at an end of a tunneling association through a network device. The network device is any of the first 14 or second 16 network devices. The Method 480 includes receiving a first message in a first layer of a protocol stack for the network device from the end of the tunneling association at Step 482. The first message includes a first payload. At Step 484 a determination is made as to whether the first message includes an indicator that the first payload is associated with a second layer of the protocol stack. In one exemplary preferred embodiment of the present invention, the first layer of the protocol stack for the network device is a MAC 54 layer and the second layer of the protocol stack for the network device is an IP 58 layer. In another exemplary preferred embodiment of the present invention, the first layer of the protocol stack for the network device is a MAC 54 layer and the second layer of the protocol stack for the network device is an application layer. However the first layer may be other than the MAC 54 layer, the second layer may be other than the IP 58 or application layer, the protocol stack may be other than the OSI model of FIG. 2, and it should be understood that the present invention is not limited to these embodiments.

If the determination is made at Step 484 that the first message includes an indicator that the first payload is associated with a second layer of the protocol stack, a private network address is obtained from the first payload in the second layer of the protocol stack at Step 486. The first payload includes the private network address and a second payload. In another exemplary preferred embodiment of the present invention, the private network address is a private IP 58 address. For example, the private IP 58 address may be the private IP 58 address associated with either the originating 24 or terminating 26 end of the tunneling association.

At Step 488, a determination is made as to whether the private network address is recorded on the network device. If this determination is positive, a public network address is associated with the private network address at Step 490. The public network address is associated with a third layer of the protocol stack. In yet another exemplary preferred embodiment of the present invention, the public network address is a public IP 58 address and the third layer of the protocol stack is an IP 58 layer. For example, the public IP 58 address may be the public IP 58 address of another network device. The other network device is any of the second 16 or first 14 network devices.

In yet another exemplary preferred embodiment of the present invention, the associating Step 490 includes searching a network address table on the network device for an entry containing the private network address and reading the public network address from the entry. The private network address is recorded in the network address table and the entry includes the private network address and the public network address. For example, the network address table may be in the form of the network address tables of Tables 4a, 4b, and 4c, and the private network address may be either of the first private IP 58 address or the second private IP 58 address of Tables 4a, 4b, or 4c. The network address table on the network device may have recorded the network addresses during the initiation of the tunneling association of Method 100 (FIG. 4) and associated them with the public network address.

At Step 492, the third layer is requested to encapsulate and transmit a second message on a public network associated with the third layer. The second message includes the public network address, the private network address, and the second payload. For example, the second layer of the protocol stack may submit a request instruction to an interface between the second layer and the third layer by methods known to those skilled in the art. The request passes the public network address, the private network address, and the second payload to the third layer. The third layer constructs the second message by encapsulating the second payload and the private network address in a payload field for the second message and placing the public network address in a destination address field for the second message.

Method 480 may result in a processing of a media flow through a tunneling association that hides the identity of the originating and terminating ends of the tunneling association from other users of the public network.

Another Exemplary Processing of a VoIP Flow

Figure 23A:
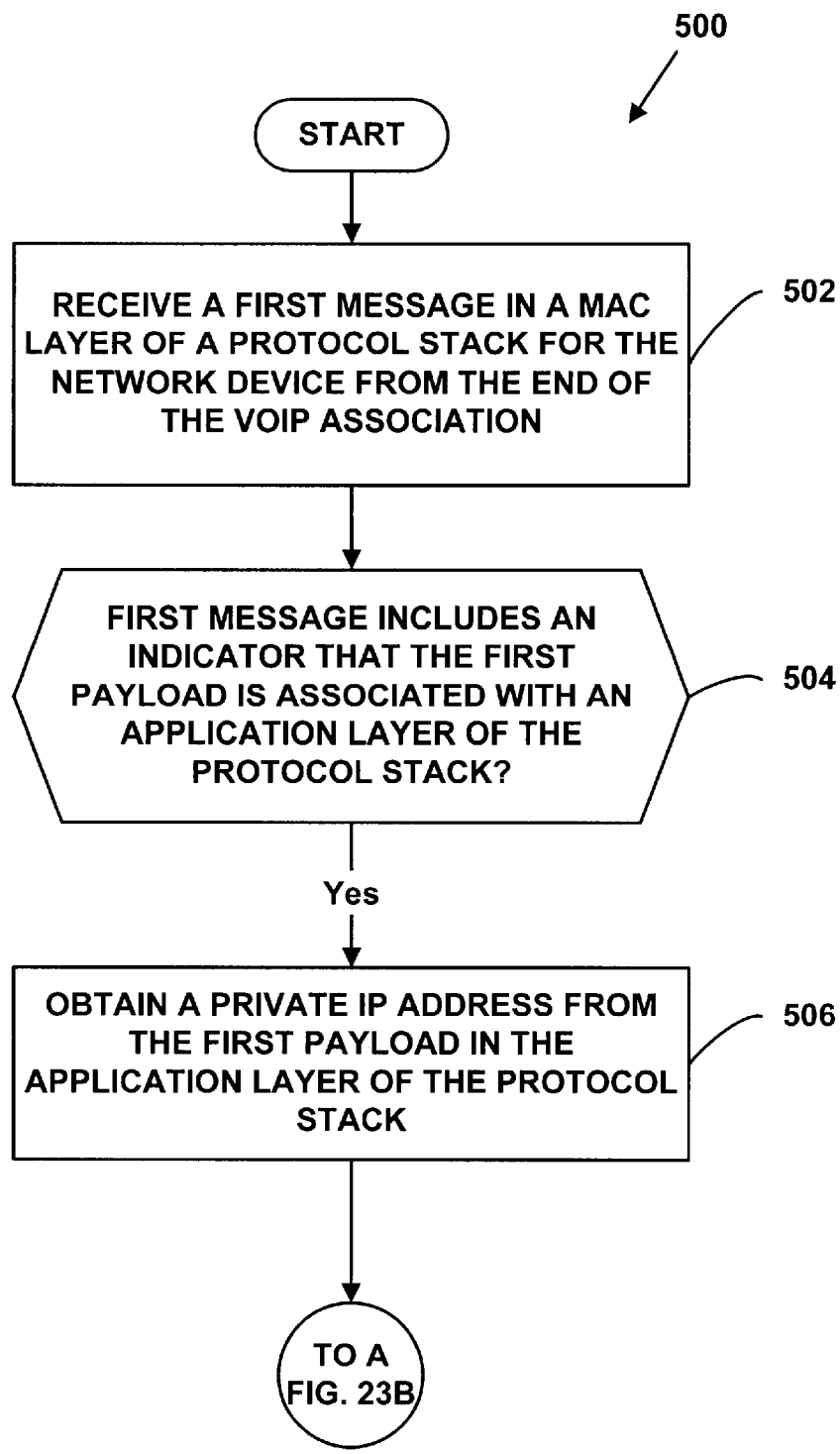
FIG. 23 is a flow diagram illustrating a method for processing a VoIP flow at an end of a tunneling association.
Figure 23B:
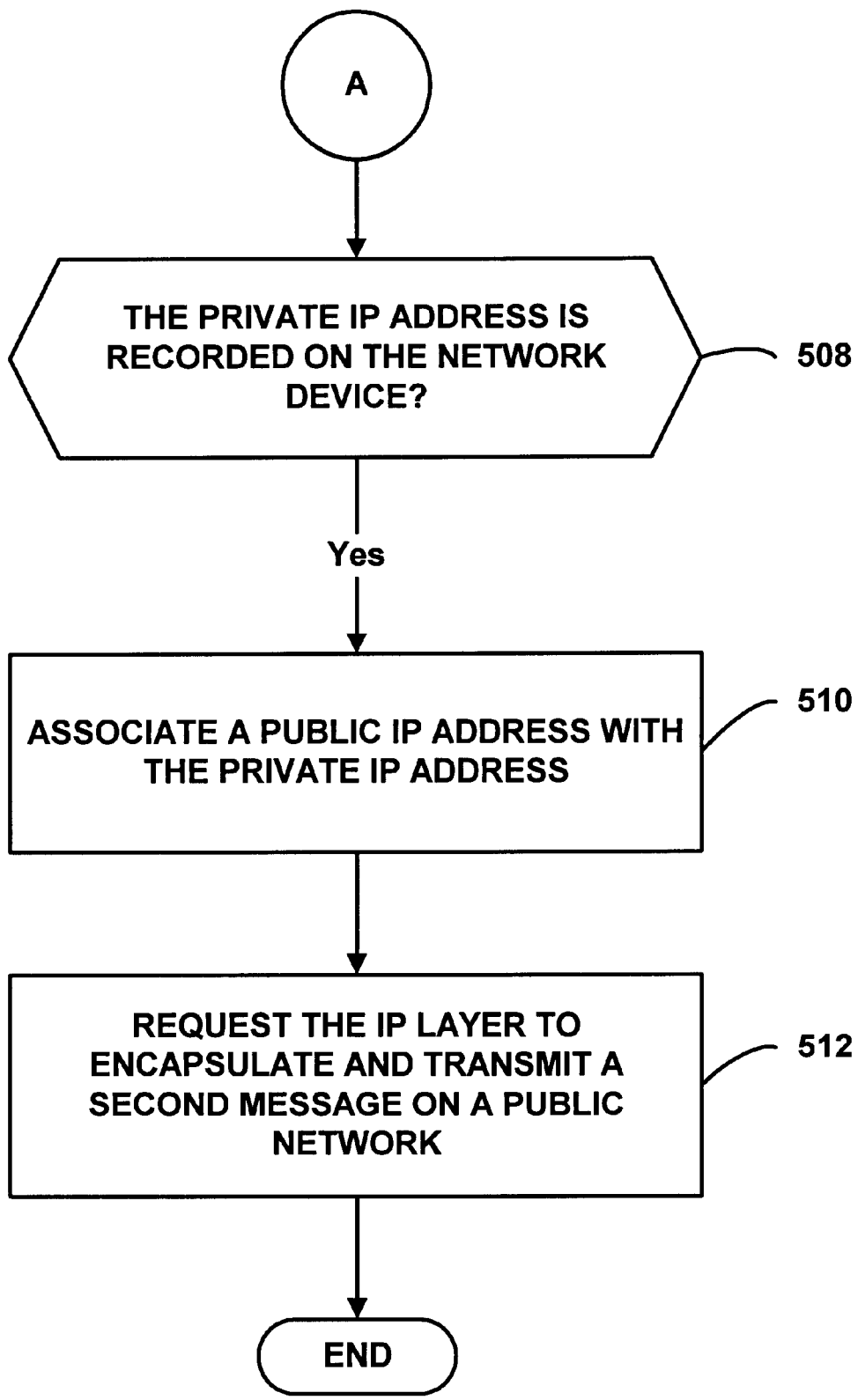
Figure 24:
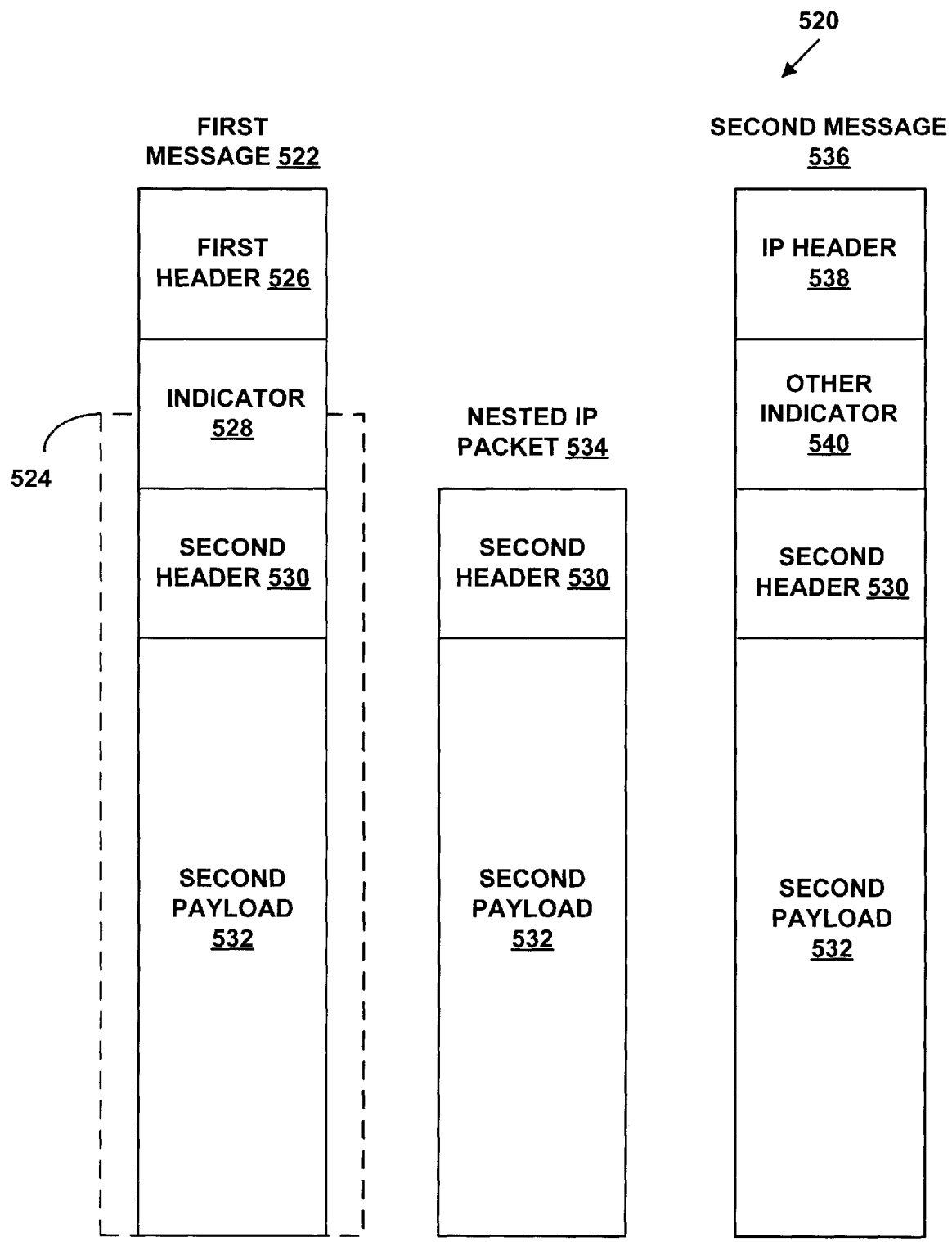
FIG. 24 is a block diagram illustrating a VoIP flow.

In yet another exemplary preferred embodiment of the present invention, the tunneling association is a VoIP association, the first layer is a MAC 54 layer, the second layer is an application layer, the third layer is an IP 58 layer, the private network address is a private IP 58 address, and the public network address is a public IP 58 address. FIG. 23 is a flow diagram illustrating a Method 500 for processing a VoIP flow at an end of a VoIP association through a network device. FIG. 24 is a block diagram illustrating a VoIP flow 520 of the Method 500 illustrated in FIG. 23. With reference to FIG. 23 and FIG. 24, Method 500 includes receiving a first message 522 in a MAC 54 layer of a protocol stack 50 for the network device from the end of the VoIP association at Step 502. The first message 522 includes a first payload 524. For example, the first message 522 may have the form of a MAC 54 packet. The first message 522 includes a first header 526 and the first payload 524. The MAC 54 address for the network device is in a destination address field of the first header 526. A source address field of the first header 526 may contain the MAC 54 address of the end of the VoIP association.

At Step 504 it is determined whether the first message 522 includes an indicator 528 that the first payload 524 is associated with an application layer of the protocol stack 50. The MAC 54 layer of the protocol stack 50 may strip the first header 526 off the first message 522 and pass the first payload 524 up to the application layer of the protocol stack 50 by way of the transport layer of the protocol stack 50. By methods known to those skilled in the art, the application layer may inspect the first payload 524 and determine whether the indicator 528 is present in the first payload 524. For example, the indicator 528 may be a distinctive sequence of bits in the first payload 524 that has been passed up from the MAC 54 and transport layers. Alternatively, the indicator 528 may be included in the first header 526. It should be understood that the indicator 528 may begin at any position in the first message 522 and that the present invention is not limited to the indicator 528 appearing after the first header 526.

If it is determined that the first message 522 includes such an indicator 528, a private IP 58 address is obtained from the first payload 524 in the application layer of the protocol stack 50 at Step 506 of Method 500. The first payload 524 includes the private IP 58 address and a second payload 532. For example, the first payload 524 may include a nested IP 58 packet 534 comprised of the second header 530 and the second payload 532. A VoIP application in the application layer has already recognized the presence of the indicator 528 at Step 504 and determines that this first payload 524 also contains the nested IP 58 packet 534. The VoIP application has the ability to process a datagram according to the IP 58 protocol. The advantage of running another IP 58 protocol in the application layer is that the format and the application code are already familiar to those skilled in the art. As the VoIP flow is outbound from the end of the VoIP association to the public network 12, the network device is routing this VoIP flow from the source. The VoIP application examines the nested IP packet 534 and extracts the private IP 58 address from the source address field 88 of the second header 530. The private IP Up 58 address was assigned to the end of the VoIP association during initiation as described above. VoIP data sent from the end of the VoIP association is included in the second payload 532.

At Step 508, it is determined whether this private IP 58 address is recorded on the network device. For example, the VoIP application may search a network address table, such as those illustrated in Tables 4a to 4c, to determine whether the private IP 58 address is in an entry. In the illustrative table structure of the network address tables of Tables 4a to 4c, the application searches the column for the first private IP 58 address as this is the private IP 58 address for the end of the VoIP association that is associated with the network device. The application may also confirm that the private IP 58 address in the destination address field 90 of the second header 530 agrees with the second private IP 58 address in the table entry as this is the private IP 58 address for the other end of the VoIP association.

If the private IP 58 address is contained in an entry, a public IP 58 address is associated with the private IP 58 address at Step 510. The public IP 58 address is associated with an IP 58 layer of the protocol stack 50, and is associated with another network device that will route the VoIP media to the other end of the VoIP association. For example, the public IP 58 address may be read from the public IP 58 column for the above-mentioned entry in the network address table for the network device.

At Step 512 the IP 58 layer is requested to encapsulate and transmit a second message 536 on the public network. The second message 536 includes the public IP 58 address, the private IP 58 address, and the second payload 532. For example, the VoIP application passes the nested IP 58 packet 534 down to the IP 58 layer. The VoIP application also passes down the public IP 58 address of the other network device. The IP 58 layer constructs an IP 58 packet with the public IP 58 address of the other network device placed in a destination address field 90 of the IP 58 header 538 for the IP 58 packet. Encapsulated in the IP 58 packet of the second message 536 is the nested IP 58 packet 534. Another indicator 540 may be included in the second message 536 to indicate to the other network device that the second message 536 is VoIP media flow.

Figure 25A:
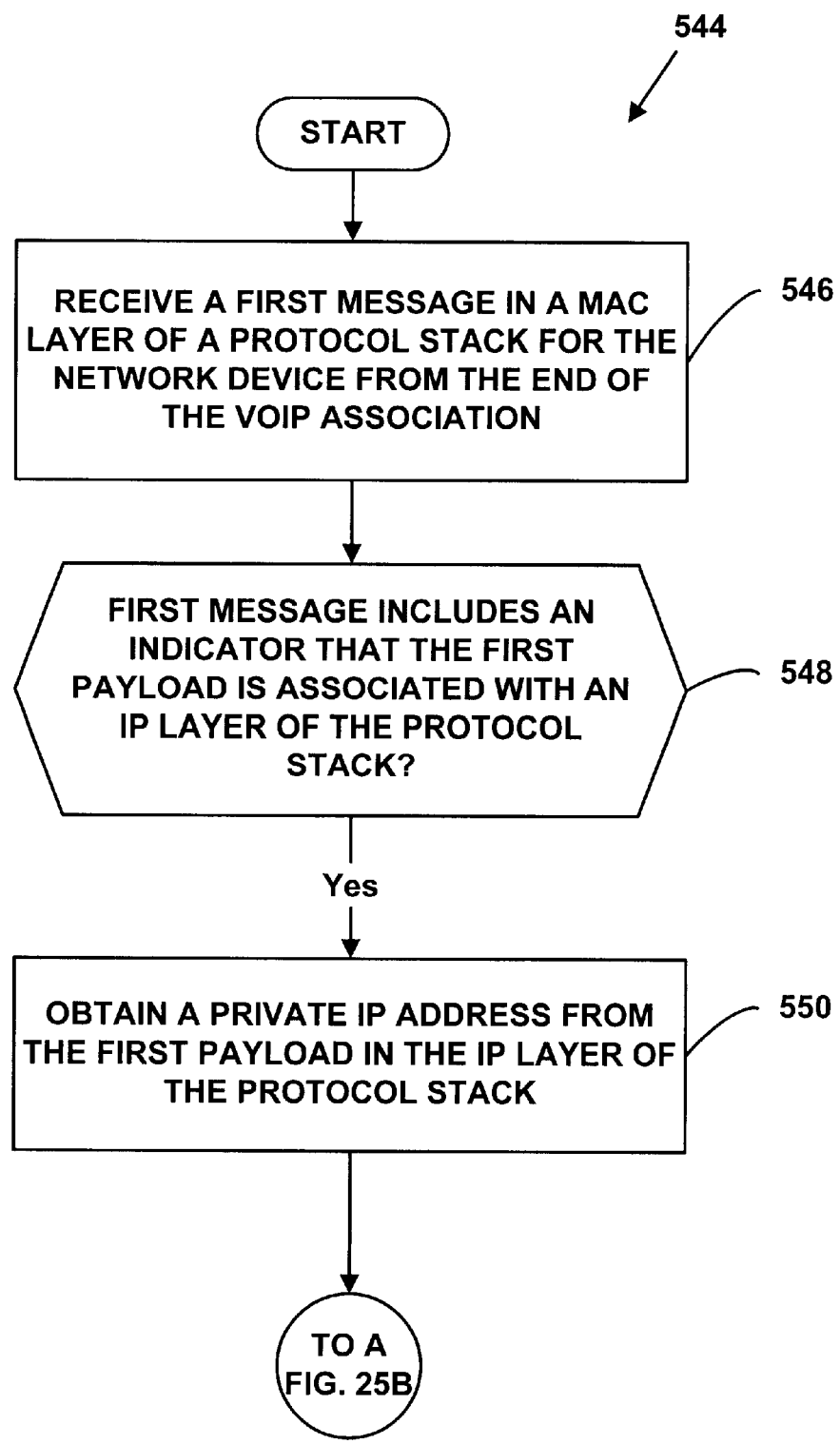
FIG. 25 is a flow diagram illustrating a method for processing a VoIP flow at an end of a tunneling association.
Figure 25B:
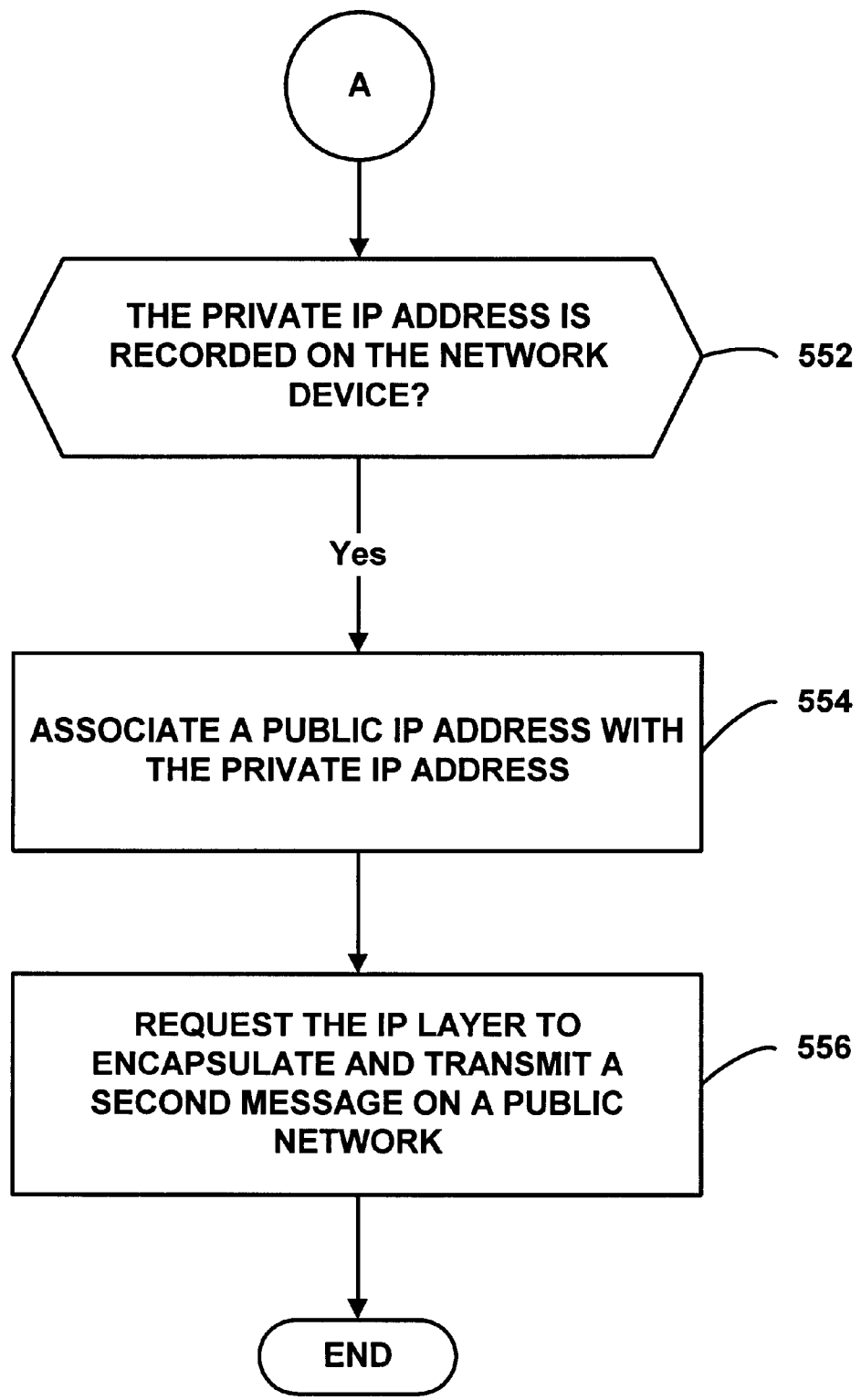

In yet another exemplary preferred embodiment of the present invention, the tunneling association is a VoIP association, the first layer is a MAC 54 layer, the second layer is an IP 58 layer, the third layer is the IP 58 layer, the private network address is a private IP 58 address, and the public network address is a public IP 58 address. FIG. 25 is a flow diagram illustrating a Method 544 for processing a VoIP flow at an end of a VoIP association through a network device. With reference to FIG. 25 and FIG. 24, Method 544 includes receiving a first message 522 in a MAC 54 layer of a protocol stack 50 for the network device from the end of the VoIP association at Step 546. The first message 522 includes a first payload 524. For example, the first message 522 may have the form of a MAC 54 packet. The first message 522 includes a first header 526 and a first payload 524. The MAC 54 address for the network device is in a destination address field of the first header 526. A source address field of the first header 526 may contain the MAC 54 address of the end of the VoIP association.

At Step 548 it is determined whether the first message 522 includes an indicator 528 that the first payload 524 is associated with an IP 58 layer of the protocol stack 50. The MAC 54 layer of the protocol stack 50 may strip the first header 526 off the first message 522 and pass the first payload 524 up to the IP 58 layer of the protocol stack 50. By methods known to those skilled in the art, the IP 58 layer may inspect the first payload 524 and determine whether the indicator 528 is present in the first payload 524. For example, the indicator 528 may be a distinctive sequence of bits in the first payload 524 that has been passed up from the MAC 54 layer. Alternatively, the indicator 528 may be included in the first header 526. It should be understood that the indicator 528 may begin at any position in the first message 522 and that the present invention is not limited to the indicator 528 appearing after the first header 526.

If it is determined that the first message 522 includes such an indicator 528, a private IP 58 address is obtained from the first payload 524 in the application layer of the protocol stack 50 at Step 550 of Method 544. The first payload 524 includes the private IP 58 address and a second payload 532. For example, the first payload 524 may include a nested IP 58 packet 534 comprised of the second header 530 and the second payload 532. The IP 58 layer has already recognized the presence of the indicator 528 at Step 504 and determines that this first payload 524 also contains the nested IP 58 packet 534. As the VoIP flow is outbound from the end of the VoIP association to the public network 12, the network device is routing this VoIP flow from the source. The VoIP application examines the nested IP packet 534 and extracts the private IP 58 address from the source address field 88 of the second header 530. The private IP 58 address was assigned to the end of the VoIP association during initiation as described above. VoIP data sent from the end of the VoIP association is included in the second payload 532.

At Step 552, it is determined whether this private IP 58 address is recorded on the network device. For example, the IP 58 layer may initiate a search of a network address table, such as those illustrated in Tables 4a to 4c, to determine whether the private IP 58 address is in an entry. In the illustrative table structure of the network address tables of Tables 4a to 4c, the application initiates a search of the column for the first private IP 58 address as this is the private IP 58 address for the end of the VoIP association that is associated with the network device. The IP 58 layer may also initiate a confirmation that the private IP 58 address in the destination address field 90 of the second header 530 agrees with the second private IP 58 address in the table entry as this is the private IP 58 address for the other end of the VoIP association.

If the private IP 58 address is contained in an entry, a public IP 58 address is associated with the private IP 58 address at Step 554. The public IP 58 address is associated with an IP 58 layer of the protocol stack 50, and is associated with another network device that will route the VoIP media to the other end of the VoIP association. For example, the public IP 58 address may be read from the public IP 58 column for the above-mentioned entry in the network address table for the network device.

At Step 556 the IP 58 layer is requested to encapsulate and transmit a second message 536 on the public network. The second message 536 includes the public IP 58 address, the private IP 58 address, and the second payload 532. For example, the IP 58 layer may loop the nested IP 58 packet 534 back to the IP 58 layer to be encapsulated inside another IP 58 packet by methods known to those skilled in the art. The IP 58 layer constructs an IP 58 packet with the public IP 58 address of the other network device placed in a destination address field 90 of the IP 58 header 538 for the IP 58 packet. Encapsulated in the IP 58 packet of the second message 536 is the nested IP 58 packet 534. Another indicator 540 may be included in the second message 536 to indicate to the other network device that the second message 536 is VoIP media flow.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a data network having a plurality of private networks and public networks, and a plurality of network devices, a method for processing a media flow at an end of a tunneling association through a network device, the method comprising the following steps:

receiving a first message on the network device on a public network associated with a first layer of a protocol stack for the network device, wherein the first message includes a first payload;

determining whether the first message includes an indicator that the first payload is associated with a second layer of the protocol stack, and if so, obtaining a private network address from the first payload in the second layer of the protocol stack, wherein the first payload includes the private network address and a second payload, determining whether the private network address is recorded on the network device, and if so, associating a forwarding network address with the private network address, wherein the forwarding network address is associated with a third layer of the protocol stack and is associated with the end of the tunneling association, and requesting the third layer to encapsulate and transmit a second message to the end of the tunneling association, wherein the second message includes the forwarding network address and the second payload.

2. A computer readable medium having stored therein instructions for causing a central processing unit to execute the method of claim 1.

3. The method of claim 1 wherein the associating step further comprises:

searching a network address table on the network device for an entry containing the private network address, wherein the private network address is recorded in the network address table; and reading the forwarding network address from the entry, wherein the entry includes the private network address and the forwarding network address.

4. The method of claim 1 wherein the first layer of the protocol stack for the network device is an Internet Protocol layer and the second layer of the protocol stack for the network device is the Internet Protocol layer.

5. The method of claim 1 wherein the first layer of the protocol stack for the network device is an Internet Protocol layer and the second layer of the protocol stack for the network device is an application layer.

6. The method of claim 1 wherein the third layer of the protocol stack for the network device is a Media Access Control layer.

7. The method of claim 1 wherein the end of the tunneling association is any of a multimedia device or a telephony device, and wherein the network device is any of an edge router, a cable modem for a data-over-cable system, or a cable modem termination system for a data-over-cable system.

8. In a data network having a plurality of private networks and public networks, and a plurality of network devices, a method for processing a media flow at an end of a tunneling association through a network device, the method comprising the following steps:

receiving a first message in a first layer of a protocol stack for the network device from the end of the tunneling association, wherein the first message includes a first payload;

determining whether the first message includes an indicator that the first payload is associated with a second layer of the protocol stack, and if so, obtaining a private network address from the first payload in the second layer of the protocol stack, wherein the first payload includes the private network address and a second payload, determining whether the private network address is recorded on the network device, and if so, associating a public network address with the private network address, wherein the public network address is associated with a third layer of the protocol stack, and requesting the third layer to encapsulate and transmit a second message on a public network associated with the third layer, wherein the second message includes the public network address, the private network address, and the second payload.

9. A computer readable medium having stored therein instructions for causing a central processing unit to execute the method of claim 8.

10. The method of claim 8 wherein the associating step further comprises:

searching a network address table on the network device for an entry containing the private network address, wherein the private network address is recorded in the network address table; and reading the public network address from the entry, wherein the entry includes the private network address and the public network address.

11. The method of claim 8 wherein the first layer of the protocol stack for the network device is a Media Access Control layer and the second layer of the protocol stack for the network device is an Internet Protocol layer.

12. The method of claim 8 wherein the first layer of the protocol stack for the network device is a Media Access Control layer and the second layer of the protocol stack for the network device is an application layer.

13. The method of claim 8 wherein the third layer of the protocol stack for the network device is an Internet Protocol layer.

14. The method of claim 8 wherein the end of the tunneling association is any of a multimedia device or a telephony device, and wherein the network device is any of an edge router, a cable modem for a data-over-cable system, or a cable modem termination system for a data-over-cable system.

15. In a data network having a plurality of private networks and public networks, and a plurality of network devices, a method for processing a media flow at an end of a tunneling association through a network device, the method comprising the following steps:

receiving a first payload in a first layer of a protocol stack for the network device from a second layer of the protocol stack, wherein the first payload includes a private network address and a second payload;

searching a network address table on the network device for an entry containing the private network address;

reading a forwarding network address associated with a third layer of the protocol stack for the end of the tunneling association from the entry, wherein the entry includes the private network address and the forwarding network address; and requesting the third layer to encapsulate and transmit a message to the end of the tunneling association, wherein the message includes the forwarding network address and the second payload.

16. A computer readable medium having stored therein instructions for causing a central processing unit to execute the method of claim 15.

17. The method of claim 15 wherein the first layer of the protocol stack for the network device is an Internet Protocol layer, the second layer of the protocol stack is the Internet Protocol layer, and the third layer of the protocol stack is a Media Access Control layer.

18. The method of claim 15 wherein the first layer of the protocol stack for the network device is an application layer, the second layer of the protocol stack is an Internet Protocol layer, and the third layer of the protocol stack is a Media Access Control layer.

19. In a data network having a plurality of private networks and public networks, and a plurality of network devices, a method for processing a media flow at an end of a tunneling association through a network device, the method comprising the following steps:

receiving a first payload in a first layer of a protocol stack for the network device from a second layer of the protocol stack, wherein the first payload includes a private network address and a second payload;

searching a network address table on the network device for an entry containing the private network address;

reading a public network address associated with a third layer of the protocol stack from the entry, wherein the entry includes the private network address and the public network address; and requesting the third layer to encapsulate and transmit a message on a public network, wherein the message includes the public network address, the private network address, and the second payload.

20. A computer readable medium having stored therein instructions for causing a central processing unit to execute the method of claim 19.

21. The method of claim 19 wherein the first layer of the protocol stack for the network device is an Internet Protocol layer, second layer of the protocol stack is a Media Access Control layer, and the third layer of the protocol stack is the Internet Protocol layer.

22. The method of claim 19 wherein the first layer of the protocol stack for the network device is an application layer, the second layer of the protocol stack is a Media Access Control layer, and the third layer of the protocol stack is an Internet Protocol layer.

23. In a data network having a plurality of private networks and public networks, and a plurality of network devices, a method for processing a Voice-over-Internet-Protocol flow at an end of a Voice-over-Internet-Protocol association through a network device, the method comprising the following steps:

receiving a first message on the network device on a public network associated with an Internet Protocol layer of a protocol stack for the network device, wherein the first message includes a first payload;

determining whether the first message includes an indicator that the first payload is associated with the Internet Protocol layer of the protocol stack, and if so, obtaining a private Internet Protocol address from the first payload in the Internet Protocol layer of the protocol stack, wherein the first payload includes the private Internet Protocol address and a second payload, determining whether the private Internet Protocol address is recorded on the network device, and if so, associating a Medium Access Control address with the private Internet Protocol address, wherein the Medium Access Control address is associated with a Medium Access Control layer of the protocol stack and is associated with the end of the Voice-over-internet-Protocol association, and requesting the Medium Access Control layer to encapsulate and transmit a second message to the end of the Voice-over-Internet-Protocol association, wherein the second message includes the Medium Access Control address and the second payload.

24. A computer readable medium having stored therein instructions for causing a central processing unit to execute the method of claim 23.

25. The method of claim 23 wherein the end of the Voice-over-Internet-Protocol association is a telephony device, and wherein the network device is any of an edge router, a cable modem for a data-over-cable system, or a cable modem termination system for a data-over-cable system.

26. In a data network having a plurality of private networks and public networks, and a plurality of network devices, a method for processing a Voice-over-Internet-Protocol flow at an end of a Voice-over-Internet-Protocol association through a network device, the method comprising the following steps:

receiving a first message in a Media Access Control layer of a protocol stack for the network device from the end of the Voice-over-Internet-Protocol association, wherein the first message includes a first payload;

determining whether the first message includes an indicator that the first payload is associated with an Internet Protocol layer of the protocol stack, and if so, obtaining a private Internet Protocol address from the first payload in the Internet Protocol layer of the protocol stack, wherein the first payload includes the private Internet Protocol address and a second payload, determining whether the private Internet Protocol address is recorded on the network device, and if so, associating a public Internet Protocol address with the private Internet Protocol address, wherein the public Internet Protocol address is associated with an Internet Protocol layer of the protocol stack, and requesting the Internet Protocol layer to encapsulate and transmit a second message on a public network associated with the Internet Protocol layer, wherein the second message includes the public Internet Protocol address, the private Internet Protocol address, and the second payload.

27. A computer readable medium having stored therein instructions for causing a central processing unit to execute the method of claim 26.

28. The method of claim 26 wherein the end of the Voice-over-Internet-Protocol association is a telephony device, and wherein the network device is any of an edge router, a cable modem for a data-over-cable system, or a cable modem termination system for a data-over-cable system.

* * * * *